(12) United States Patent  
Nishio et al.

(10) Patent No.: US 12,515,500 B2  
(45) Date of Patent: Jan. 6, 2026

(54) VEHICLE INTERIOR PURIFICATION DEVICE

(71) Applicant: Panasonic Intellectual Property Management Co., Ltd., Osaka (JP)

(72) Inventors: Tsuyoshi Nishio, Chiba Ken (JP); Hwayoung Kang, Tokyo To (JP); Nao Yanai, Tokyo To (JP); Yuki Nishida, Kanagawa Ken (JP); Toshihiro Miyamichi, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 374 days.

(21) Appl. No.: 18/137,727

(22) Filed: Apr. 21, 2023

(65) Prior Publication Data  
US 2023/0339295 A1 Oct. 26, 2023

(30) Foreign Application Priority Data

Apr. 26, 2022 (JP) .................. 2022-072409  
Apr. 26, 2022 (JP) .................. 2022-072634  
Sep. 22, 2022 (JP) .................. 2022-151387

(51) Int. Cl.  
*B60H 3/00* (2006.01)  
*A61L 9/015* (2006.01)  
*A61L 9/22* (2006.01)

(52) U.S. Cl.  
CPC ............ *B60H 3/0078* (2013.01); *A61L 9/015* (2013.01); *A61L 9/22* (2013.01); *A61L 2209/111* (2013.01)

(58) Field of Classification Search  
CPC ......... B60H 3/0078; A61L 9/015; A61L 9/22; A61L 2209/111

(Continued)

(56) References Cited

U.S. PATENT DOCUMENTS 2,211,568 A * 8/1940 Henney ........................ 62/414  
2,923,223 A * 2/1960 Fall ......................... F24F 7/007  
454/99

(Continued)

FOREIGN PATENT DOCUMENTS

JP 59-122915 8/1984  
JP 62-56314 4/1987

(Continued)

OTHER PUBLICATIONS

Office Action issued in Corresponding JP Patent Application No. 2022-151387, dated Nov. 7, 2023, along with an English translation thereof.

(Continued)

*Primary Examiner* — Vivek K Shirsat  
(74) *Attorney, Agent, or Firm* — Greenblum & Bernstein, P.L.C.

(57) ABSTRACT

A vehicle interior purification device includes: first and second outlets disposed in a housing; first and second blower fans corresponding to the first and second outlets and disposed inside the housing; and a predetermined generation device for an airflow delivered from the first outlet and the second outlet, the predetermined generation device being disposed inside the housing. The predetermined generation device includes at least one of an electrostatic atomization device that generates a mist containing charged water particles and an ozone/ion generation device that generates ozone and negative ions by corona discharge. The first outlet and the second outlet are set to be disposed along a direction of travel of the vehicle. The first rotational speed of the first blower fan and a second rotational speed of the second blower fan are settable to different rotational speeds.

14 Claims, 35 Drawing Sheets

(58) Field of Classification Search
USPC ............ 454/140, 136, 83, 100, 99, 104, 103
See application file for complete search history.

(56) References Cited

U.S. PATENT DOCUMENTS

| | | | |
|---|---|---|---|
| 5,702,507 A * | 12/1997 | Wang | B03C 3/32 96/97 |
| 7,013,656 B2 | 3/2006 | Yanagimachi et al. | |
| 8,211,374 B2 * | 7/2012 | Hallam | C01B 13/11 422/186.18 |
| 2010/0241306 A1 | 9/2010 | Akisada et al. | |
| 2011/0274600 A1 * | 11/2011 | Steffens | C01B 13/02 423/210 |

FOREIGN PATENT DOCUMENTS

| | | |
|---|---|---|
| JP | 5-76821 | 10/1993 |
| JP | 11-005440 | 1/1999 |
| JP | 2003-290326 | 10/2003 |
| JP | 2004-314720 | 11/2004 |
| JP | 2005-233589 | 9/2005 |
| JP | 2007-045185 | 2/2007 |
| JP | 2008-084802 | 4/2008 |
| JP | 2008-260391 | 10/2008 |
| JP | 2011-237107 | 11/2011 |
| JP | 2016-68675 | 5/2016 |
| JP | 2016-135631 | 7/2016 |
| WO | 2008/018283 | 2/2008 |
| WO | 2022/123888 | 6/2022 |

OTHER PUBLICATIONS

Office Action issued in Corresponding JP Patent Application No. 2022-072634, dated Feb. 27, 2024, along with an English translation thereof.

* cited by examiner

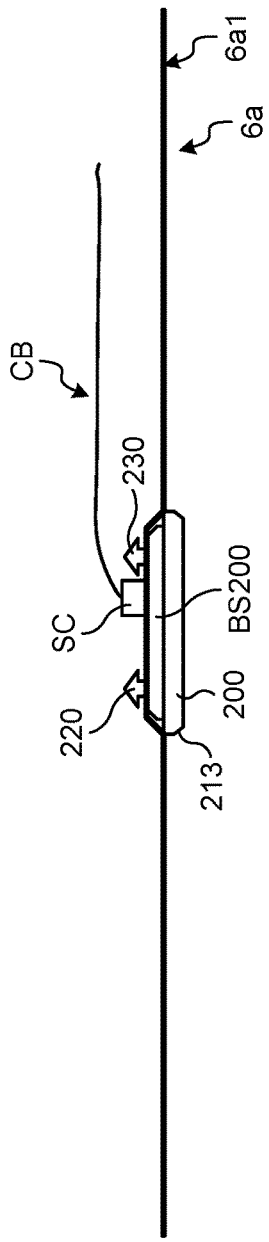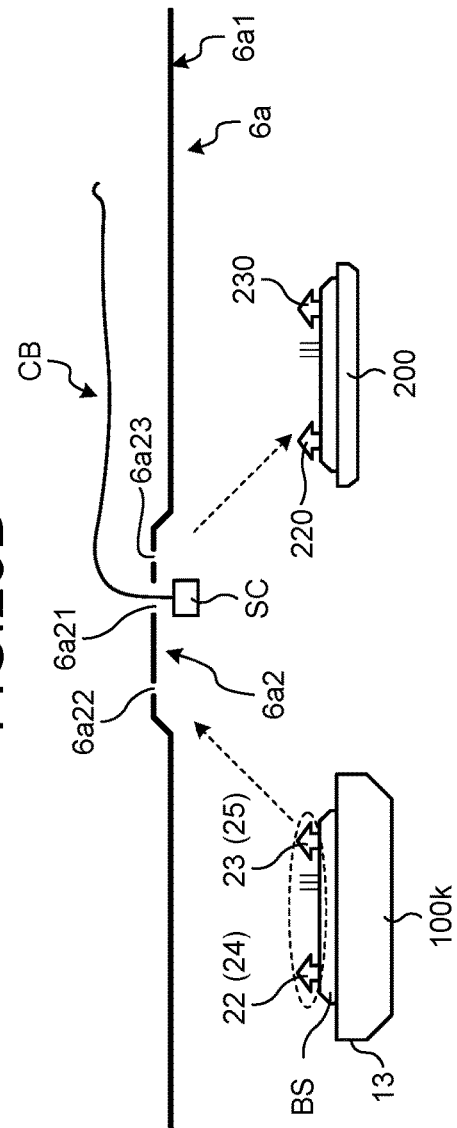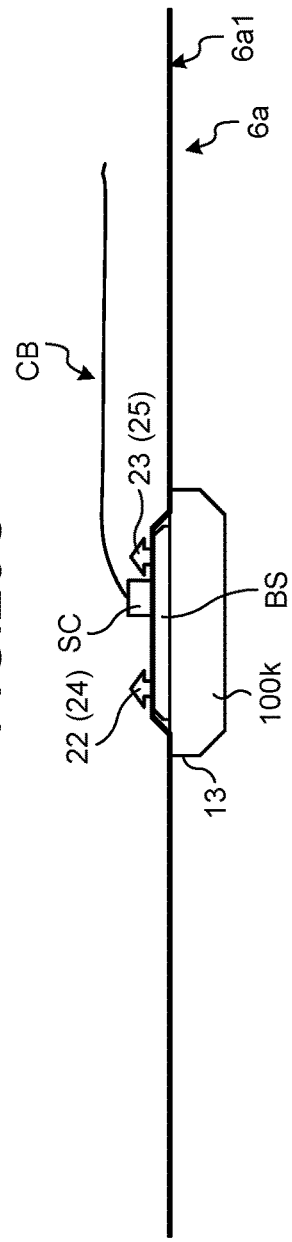

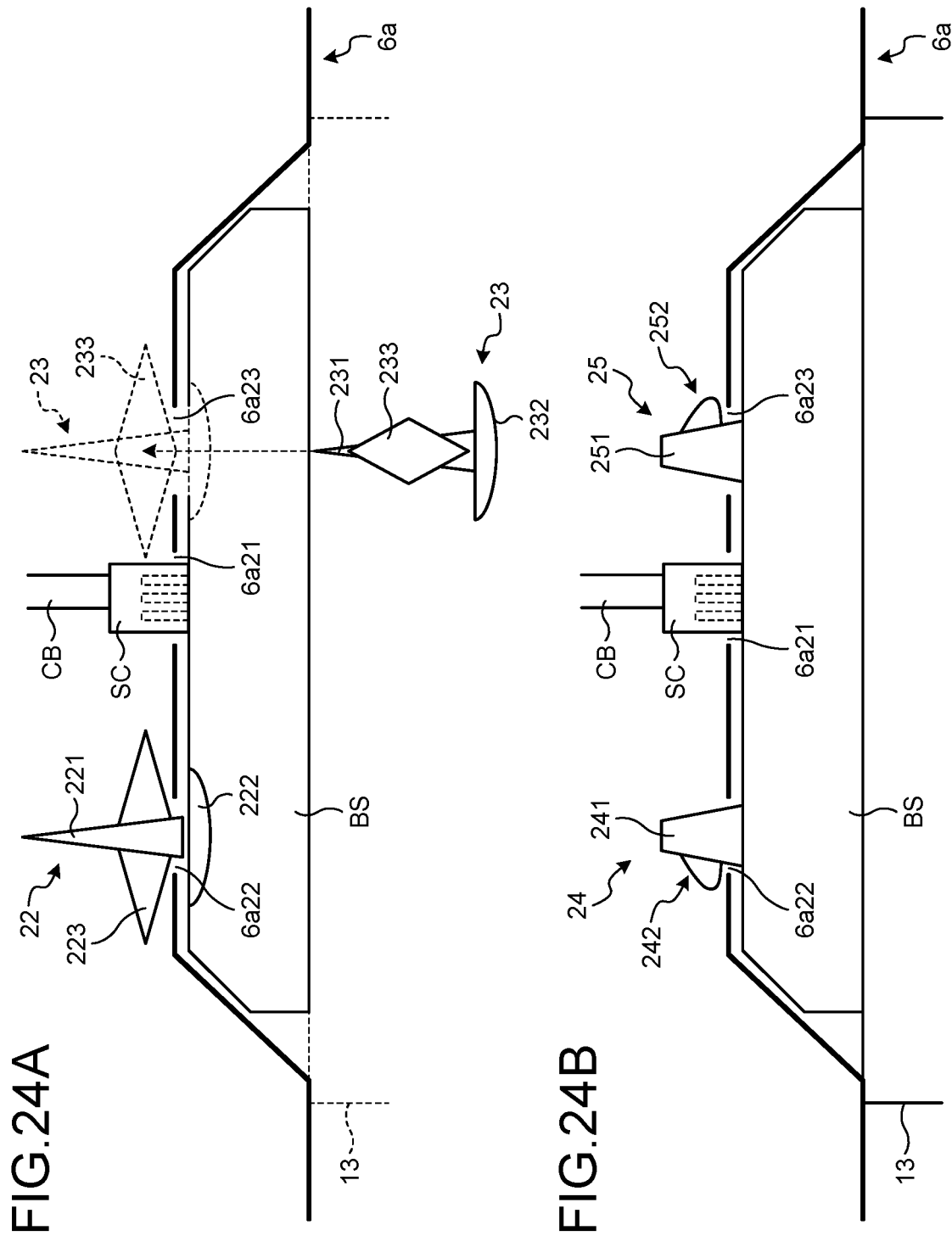

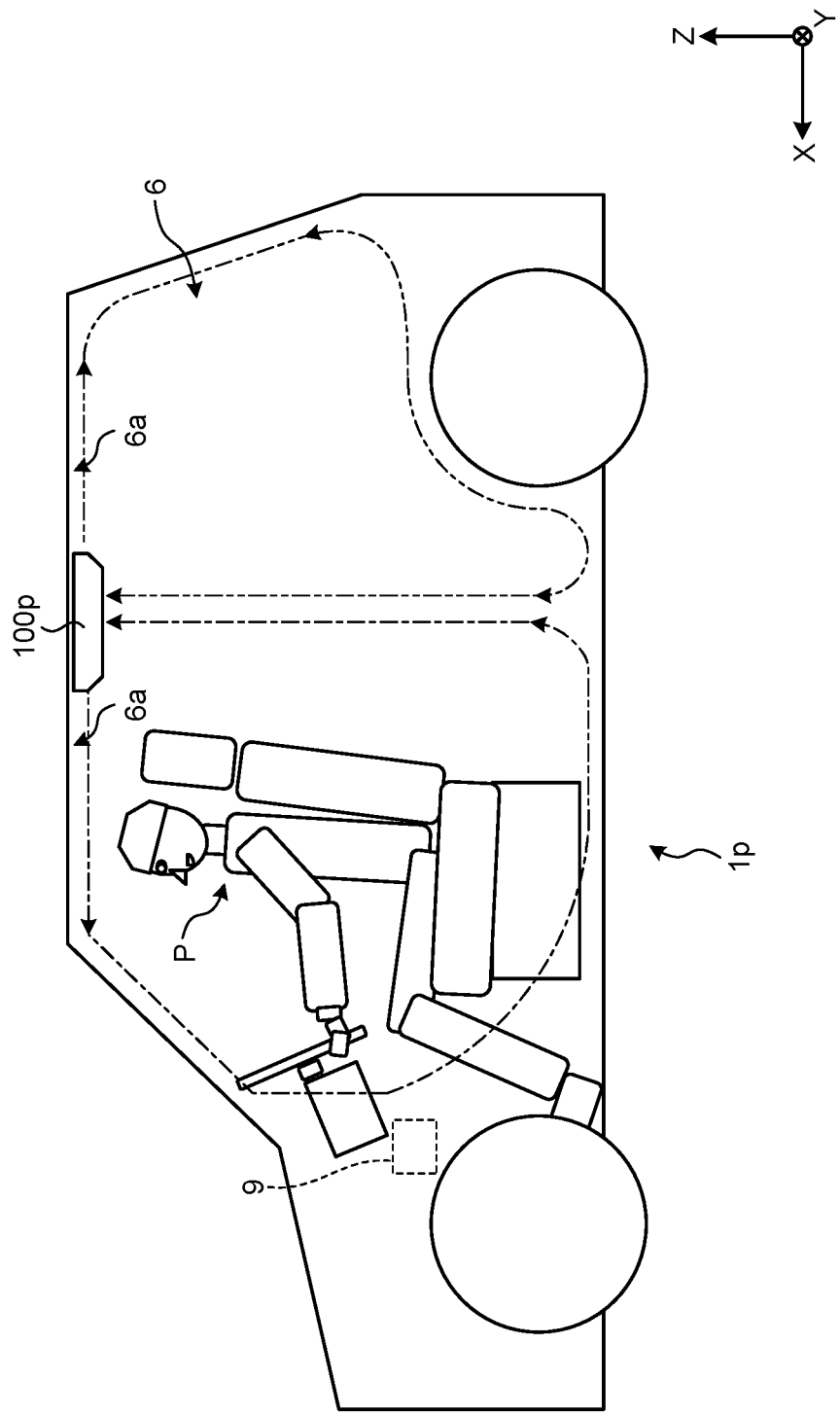

| SWITCH | USE | OFF | ON |
|--------|-----|-----|-----|
| SW1 | BLOWER FAN 14a_1 | LOW | HIGH |
| SW2 | BLOWER FAN 14a_2 | LOW | HIGH |
| SW3 | IN-USE LINKAGE | NO (OFF) | YES (ON) |

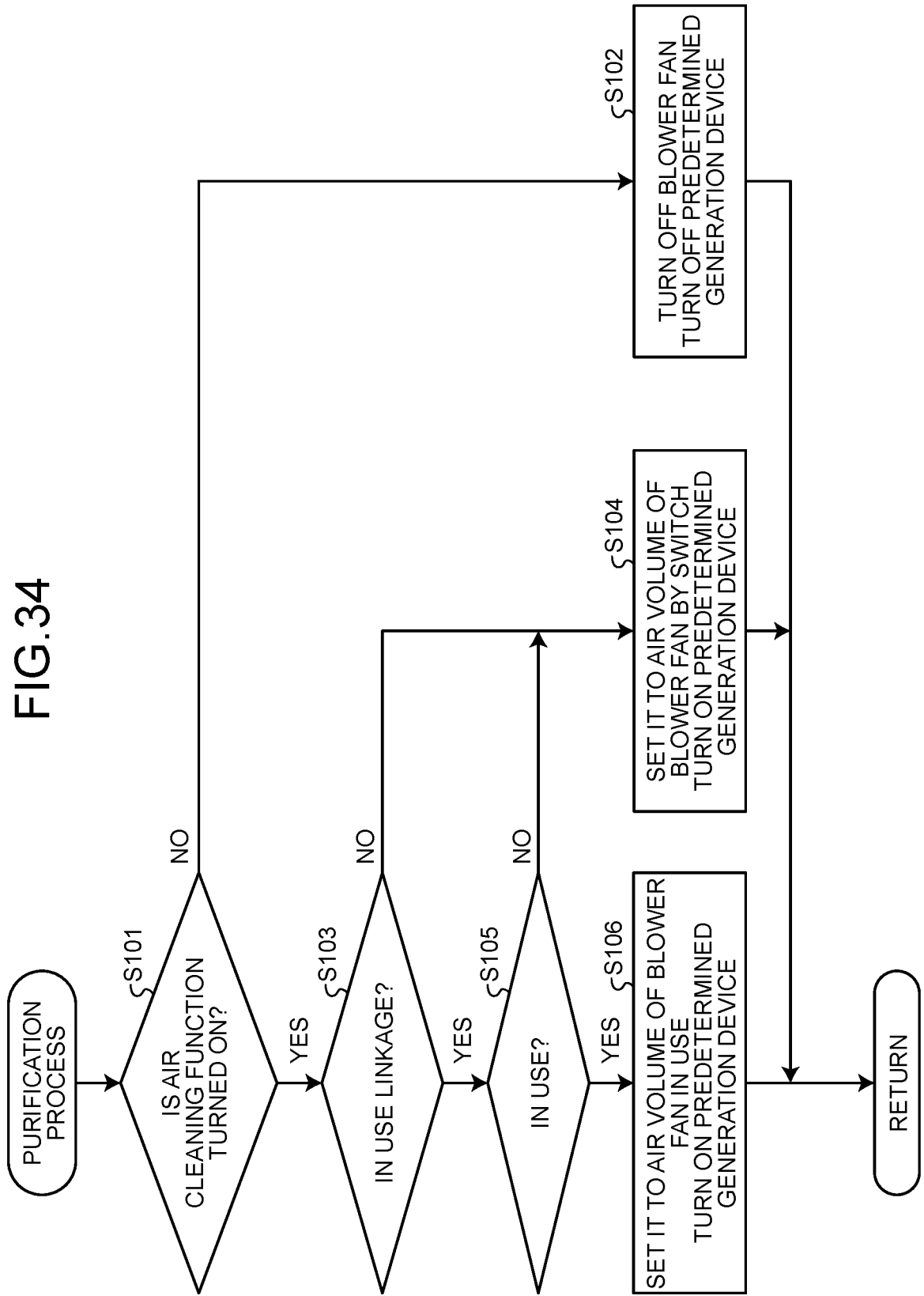

FIG.37

| TARGET | SWITCH SW11 SETTING VALUE | | ROTATIONAL SPEED SETTING | |
|---|---|---|---|---|
| | IN-USE LINKAGE NO (OFF) | IN-USE LINKAGE YES (ON) | BLOWER FAN 14a 1 ROTATIONAL SPEED CN1 | BLOWER FAN 14a 2 ROTATIONAL SPEED CN2 |
| SMALL CAR | 0 | 8 | LOW | LOW |
| SEDAN | 1 | 9 | LOW | LOW |
| SMALL ONE BOX | 2 | A | LOW | LOW |
| MEDIUM ONE BOX, INSTALLATION POSITION IS CENTER OF VEHICLE | 3 | B | MEDIUM | MEDIUM |
| LARGE ONE BOX, INSTALLATION POSITION IS REAR OF VEHICLE | 4 | C | HIGH | MEDIUM |
| LARGE ONE BOX, INSTALLATION POSITION IS CENTER OF VEHICLE | 5 | D | MEDIUM | MEDIUM |
| LARGE ONE BOX, INSTALLATION POSITION IS FRONT OF VEHICLE | 6 | E | MEDIUM | HIGH |

VEHICLE INTERIOR PURIFICATION DEVICE

CROSS-REFERENCE TO RELATED APPLICATIONS

This application is based upon and claims the benefit of priority from Japanese Patent Application No. 2022-072634, filed on Apr. 26, 2022, Japanese Patent Application No. 2022-072409, filed on Apr. 26, 2022, Japanese Patent Application No. 2022-151387, filed on Sep. 22, 2022, the entire contents of which are incorporated herein by reference.

FIELD

The present disclosure relates to a vehicle interior purification device.

BACKGROUND

In vehicles, a vehicle interior purification device may be installed on the ceiling in the interior. In this case, it is desirable that the vehicle interior purification device appropriately purifies the air in the interior of the vehicle. The conventional techniques are described in Japanese Patent Application Laid-open No. 2007-45185, Japanese Patent Application Laid-open No. 2005-233589, Japanese Patent Application Laid-open No. 2011-237107, WO2008/018283, Japanese Patent Application Laid-open No. 2004-314720, Japanese Patent Application Laid-open No. H11-5440, Japanese Patent Application Laid-open No. 2008-84802, and Japanese Patent Application Laid-open No. 2016-135631.

The present disclosure provides a vehicle interior purification device capable of appropriately purifying the air in the interior of a vehicle.

SUMMARY

A vehicle interior purification device is set to be installed at a ceiling in an interior of a vehicle. The vehicle interior purification device includes a housing, a first outlet, a second outlet, a first blower fan, a second blower fan, and a predetermined generation device. The first outlet is disposed in the housing. The second outlet is disposed in the housing. The first blower fan corresponds to the first outlet and is disposed inside the housing. The second blower fan corresponds to the second outlet and is disposed inside the housing. The predetermined generation device is for an airflow delivered from the first outlet and the second outlet, and disposed inside the housing. The predetermined generation device includes at least one of an electrostatic atomization device and an ozone/ion generation device. The electrostatic atomization device generates a mist containing charged water particles. The ozone/ion generation device generates ozone and negative ions by corona discharge. The first outlet and the second outlet are set to be disposed along a direction of travel of the vehicle. A first rotational speed of the first blower fan and a second rotational speed of the second blower fan are settable to different rotational speeds.

BRIEF DESCRIPTION OF THE DRAWINGS

FIG. 23A to FIG. 23C are diagrams illustrating an installation sequence of the vehicle interior device according to a fifth modification of the first embodiment;

FIG. 24A and FIG. 24B are diagrams illustrating a structure of a locking part of the vehicle interior device in the fifth modification of the first embodiment;

FIG. 25 is a diagram illustrating a configuration of a vehicle in which a vehicle interior device according to a second embodiment is installed;

FIG. 34 is a flowchart illustrating a purification process according to the second embodiment;

FIG. 37 is a table illustrating the settings of rotational speed of the blower fans in a modification of the second embodiment;

DETAILED DESCRIPTION

Embodiments of a vehicle interior device according to the present disclosure will be described below with reference to the drawings.

First Embodiment

A vehicle interior device according to a first embodiment can be installed on the ceiling in the interior of a vehicle and designed to appropriately purify the air in the interior of the vehicle or appropriately illuminate the interior of the vehicle.

Figure 1:
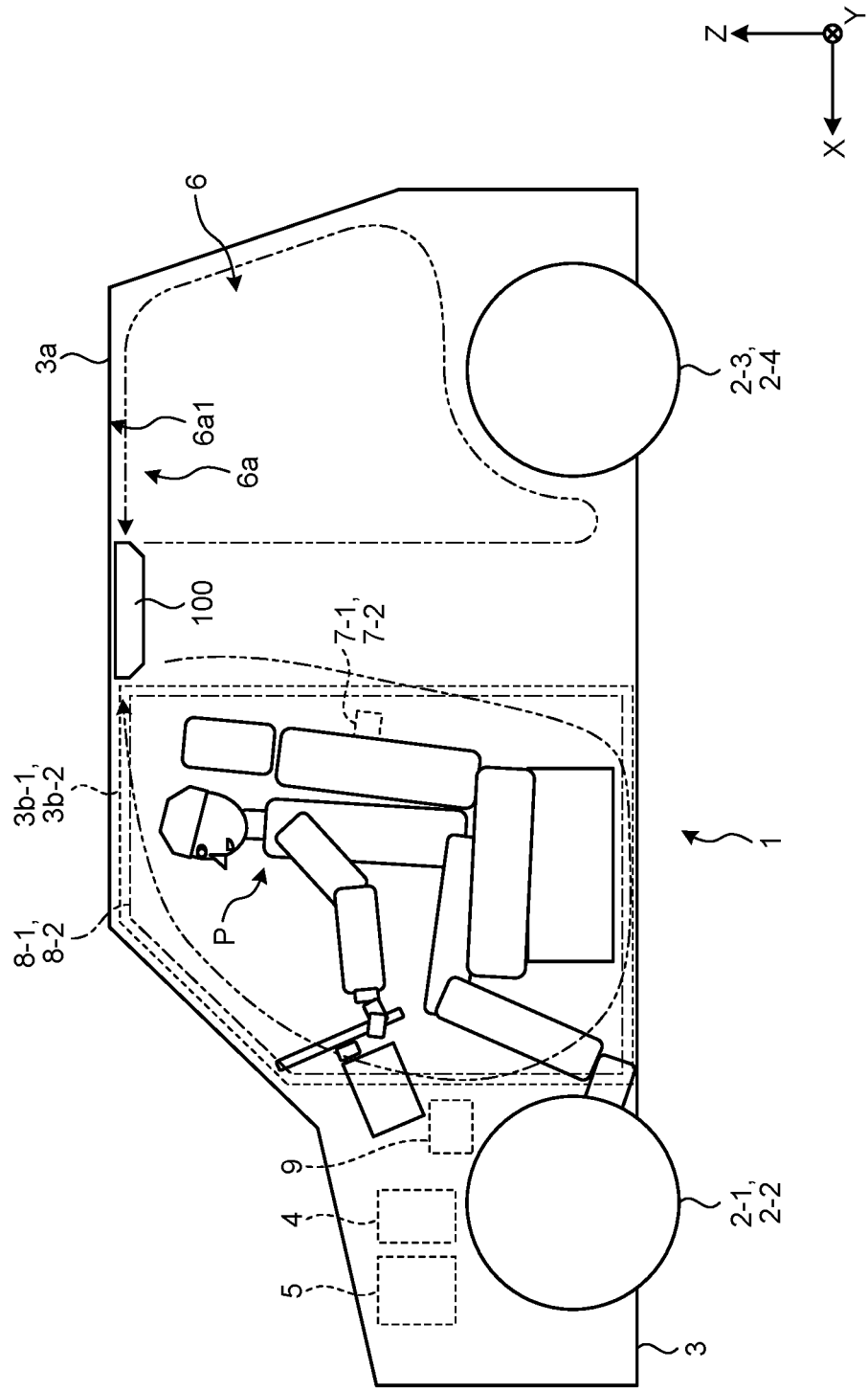
FIG. 1 is a diagram illustrating a configuration of a vehicle in which a vehicle interior device according to a first embodiment is installed.

FIG. 1 is a diagram illustrating a configuration of a vehicle 1 in which a vehicle interior device 100 is installed. The vehicle interior device 100 can be retrofitted to the ceiling in the interior of the vehicle 1 as illustrated in FIG. 1, instead of an existing device (e.g., room lamp) already installed. In the following, the direction of travel of the vehicle 1 is defined as the X direction, the vehicle width direction is defined as the Y direction, and the direction orthogonal to the X direction and the Y direction is defined as the Z direction.

The vehicle 1 includes a vehicle control device 5, a plurality of wheels 2-1 to 2-4, a body 3, doors 8-1 and 8-2, door switches 7-1 and 7-2, a battery 4, an air conditioning device 9, and the vehicle interior device 100.

The vehicle control device 5 can centrally monitor and control each unit in the vehicle 1.

The wheels 2-1 to 2-4 are each rotatable around the Y axis. The wheels 2-3 and 2-4 are disposed on the −X side of the wheels 2-1 and 2-2, and an axle on the +X side and an axle on the −X side (not illustrated) are disposed correspondingly. The wheels 2-1 and 2-2 are coupled to the ends on the +Y side and the −Y side, respectively, of the axle on the +X side extending in the Y direction. The wheels 2-3 and 2-4 are coupled to the ends on the +Y side and the −Y side, respectively, of the axle on the −X side extending in the Y direction. In FIG. 1, a configuration in which the vehicle 1 has four wheels 2 is illustrated, but the number of wheels 2 may be three or less, or five or more.

The body 3 supports the axles rotatably, and the wheels 2-1 to 2-4 are joined to the body 3 through the axles. The body 3 can move in the X direction with rotation of the wheels 2-1 and 2-2 and the wheels 2-3 and 2-4. The body 3 forms a cabin 6. In other words, the cabin 6 is the interior of the vehicle 1. The body 3 has a roof 3a. The roof 3a extends in the XY direction and covers the cabin 6 from the +Z side. The roof 3a has a surface on the +Z side as an outer surface and a surface on the −Z side as an inner surface. The surface on the −Z side of the roof 3a forms a ceiling 6a of the cabin 6. The ceiling 6a is also called a roof lining. The ceiling 6a extends in the XY direction. The ceiling 6a is covered with an insulating sheet 6a1 as an interior decoration. The body 3 thus can be connected to the vehicle interior device 100 through a ground voltage line L2 (see FIGS. 3 and 4). While being connected to the vehicle interior device 100 through the ground voltage line L2, the body 3 can supply a ground voltage $V_{GND}$ to the vehicle interior device 100. The body 3 has openings 3b-1 and 3b-2 on the +Y side and the −Y side, respectively, through which an occupant P can pass.

The doors 8-1 and 8-2 are installed on the +Y side and the −Y side, respectively, of the body 3 such that they can be opened and closed. The door 8-1 is installed on an edge on the +X side of the opening 3b on the +Y side such that it can be opened and closed. The door 8-2 is installed on an edge on the +X side of the opening 3b on the −Y side such that it can be opened and closed.

In the closed state, a door 8 can generally close the opening 3b to make the cabin 6 generally sealed from the outside. In the open state, the door 8 can open the opening 3b to make the cabin 6 open to the outside.

The door switches 7-1 and 7-2 correspond to the doors 8-1 and 8-2, respectively. The door switch 7-1 may be installed near a grip of the door 8-1 on the +Y side. The door switch 7-2 may be installed near a grip of the door 8-2 on the −Y side.

Each of the door switches 7-1 and 7-2 detects the open/closed state of the corresponding door 8 and outputs a door open/closed signal $D_{OOR}$. For example, a door switch 7 can be connected to the vehicle interior device 100 through a door open/closed signal line L3 (see FIGS. 3 and 4). While being connected to the vehicle interior device 100 through the door open/closed signal line L3, the door switch 7 outputs the door open/closed signal $D_{OOR}$ to the vehicle interior device 100. The door open/closed signal $D_{OOR}$ may, for example, indicate "open" at H level (or value "1") and "closed" at L level (or value "0"). The logical OR of the door open/closed signals $D_{OOR}$ of a plurality of door switches 7-1 and 7-2 may appear on the door open/closed signal line L3. H level (or value "1") may appear on the door open/closed signal line L3 if at least one of the door open/closed signals $D_{OOR}$ of the door switches 7-1 and 7-2 is at H level (or value "1"). L level (or value "0") may appear on the door open/closed signal line L3 if both of the door open/closed signals $D_{OOR}$ of the door switches 7-1 and 7-2 are at L level (or value "0").

When it is detected that the door 8-1 is open, the door switch 7-1 outputs a door open/closed signal $D_{OOR}$ indicating "open" to the vehicle control device 5 and the vehicle interior device 100. When it is detected that the door 8-1 is closed, the door switch 7-1 outputs a door open/closed signal $D_{OOR}$ indicating "closed" to the vehicle control device 5 and the vehicle interior device 100. Similarly, when it is detected that the door 8-2 is open, the door switch 7-2 outputs a door open/closed signal DOOR indicating "open" to the vehicle control device 5 and the vehicle interior device 100. When it is detected that the door 8-2 is closed, the door switch 7-2 outputs a door open/closed signal DOOR indicating "closed" to the vehicle control device 5 and the vehicle interior device 100.

The battery 4 is disposed inside the body 3. The battery 4 can be charged with electric power. The battery 4 can be charged in the traveling state of the vehicle 1. The battery 4 can be discharged in the non-traveling state (e.g., parked state) of the vehicle 1. The battery 4 is connected to electrical components in the vehicle 1 and can supply electric power to the electrical components. For example, the battery 4 can be connected to the vehicle interior device 100 through a +B voltage line L1 (see FIGS. 3 and 4). While being connected to the vehicle interior device 100 through the +B voltage line L1, the battery 4 can supply a +B voltage $V_{+B}$ to the vehicle interior device 100.

The air conditioning device 9 is disposed inside the body 3. The air conditioning device 9 has an inlet and an outlet communicatively connected to the cabin 6. With this configuration, the air conditioning device 9 sucks the air in the cabin 6 through the inlet, performs a predetermined air conditioning process on the sucked air, and blows out the processed air into the cabin 6 through the outlet. With this process, the air in the cabin 6 can be conditioned. The air conditioning device 9 can be operated when the vehicle 1 is in use and stopped when the vehicle 1 is parked.

The vehicle interior device 100 can be retrofitted to the ceiling 6a of the cabin 6. FIG. 1 illustrates a state in which the vehicle interior device 100 is installed on the ceiling 6a of the cabin 6. The vehicle interior device 100 has an air cleaning function and an illumination function. The vehicle interior device 100 is connected to the battery 4 while being installed on the ceiling 6a of the cabin 6 and can be supplied with electric power from the battery 4. The vehicle interior device 100 is disposed at any position in the ceiling 6a of the cabin 6 to provide the air cleaning function and the illumination function. FIG. 1 illustrates a configuration in which the vehicle interior device 100 is installed near the center in the XY direction on the ceiling 6a of the cabin 6.

Figure 2:
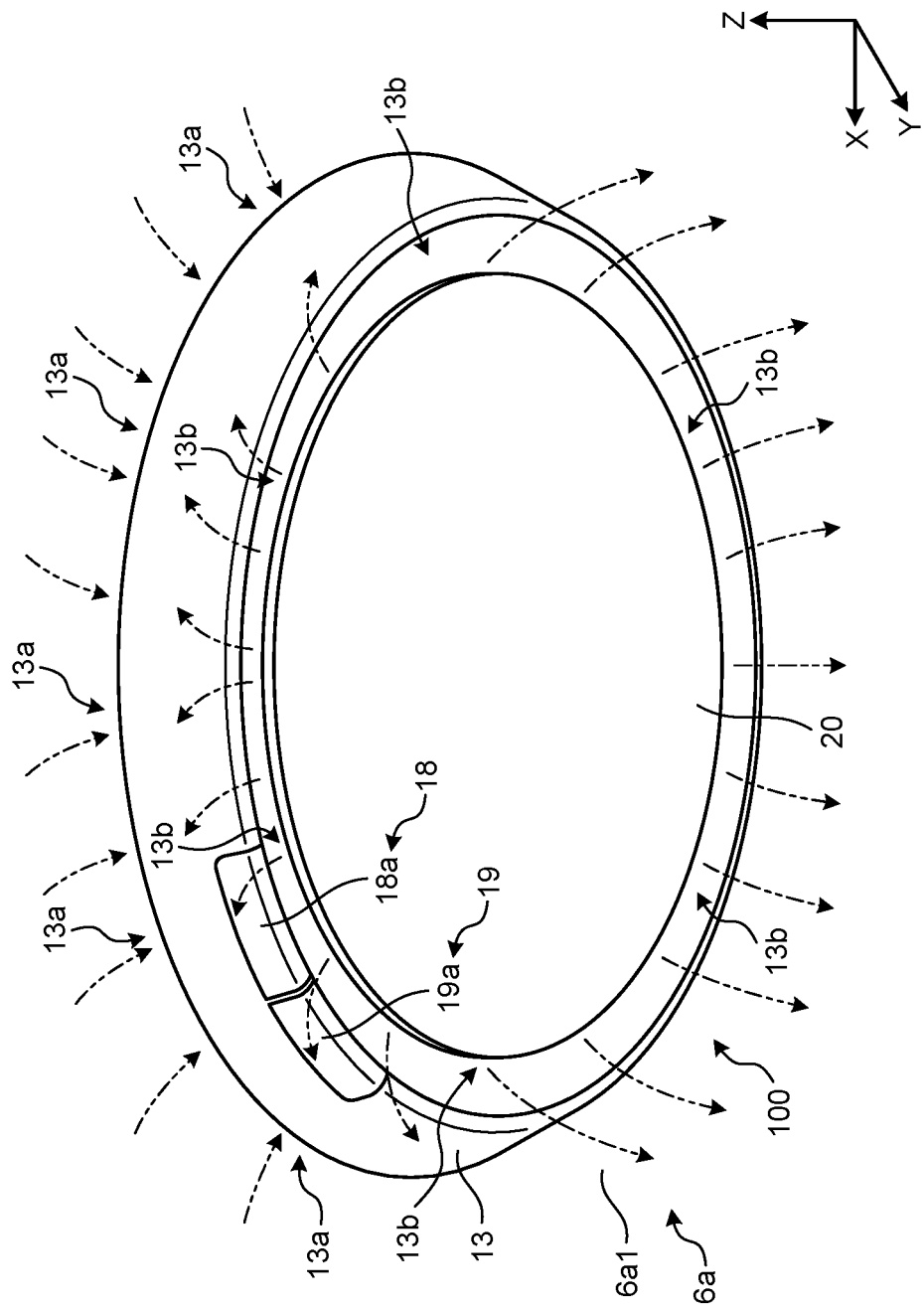
FIG. 2 is a diagram illustrating an external configuration of the vehicle interior device according to the first embodiment.

FIG. 2 is a diagram illustrating an external configuration of the vehicle interior device 100. The vehicle interior device 100 can have any shape that can provide the air cleaning function and the illumination function, but may have a flat shape in the XY direction, as illustrated in FIG. 2.

For example, as indicated by dashed-two dotted lines in FIG. 1 and FIG. 2, the flat shape in the XY direction enables formation of an airflow that is blown out from the vehicle interior device 100 generally in the −Z direction, circulates in the cabin 6, and returns to the vehicle interior device 100 in the XY direction along the ceiling 6a, thereby effectively purifying the air inside the cabin 6. Further, this shape enables illumination in the −Z direction and at an inclined direction thereto from the vehicle interior device 100, thereby effectively illuminating the interior of the cabin 6. Further, the contact area can be easily ensured when the vehicle interior device 100 is installed on the ceiling 6a of the cabin 6, whereby the installation strength of the vehicle interior device 100 can be easily ensured.

The vehicle interior device 100 has a housing 13, an optical member 20, an operation unit 18, and an operation unit 19. The housing 13 may have a shape, such as substantially prismatic shape, substantially cylindrical shape, or substantially truncated cone shape, having an axis along the Z direction and being open on the −Z side. FIG. 2 illustrates a configuration of the housing 13 having a substantially truncated cone shape that is open on the −Z side. The housing 13 has an opening on the −Z side. The optical member 20 has an XY planar shape (e.g., a substantially disk-like shape) corresponding to the opening on the −Z side of the housing 13 and substantially closes the opening on the −Z side of the housing 13. The edge on the −Z side of the housing 13 may cover near the edge on the +Z side of the optical member 20 at a distance therefrom and may be connected slightly inside in the XY direction of the edge on the +Z side. The housing 13 can be made of a light-shielding material. The optical member 20 can be formed of a light-transmitting material.

The operation unit 18 is disposed at an operable position in the housing 13, and a part of its configuration is exposed. The operation unit 18 can accept an instruction to turn on or off the air cleaning function. For example, the operation unit 18 has a button 18a, and the button 18a is disposed in proximity to the edge on the −Z side in the housing 13. The operation unit 18 may be disposed at a position adjacent to the operation unit 19 in the circumferential direction at the edge on the −Z side of the housing 13.

The operation unit 19 is disposed at an operable position in the housing 13, and a part of its configuration is exposed. The operation unit 19 can accept an instruction to turn on or off the illumination function. For example, the operation unit 19 has a button 19a, and the button 19a is disposed in proximity to the edge on the −Z side in the housing 13. The operation unit 19 may be disposed at a position adjacent to the operation unit 18 in the circumferential direction at the edge on the −Z side of the housing 13.

Figure 3:
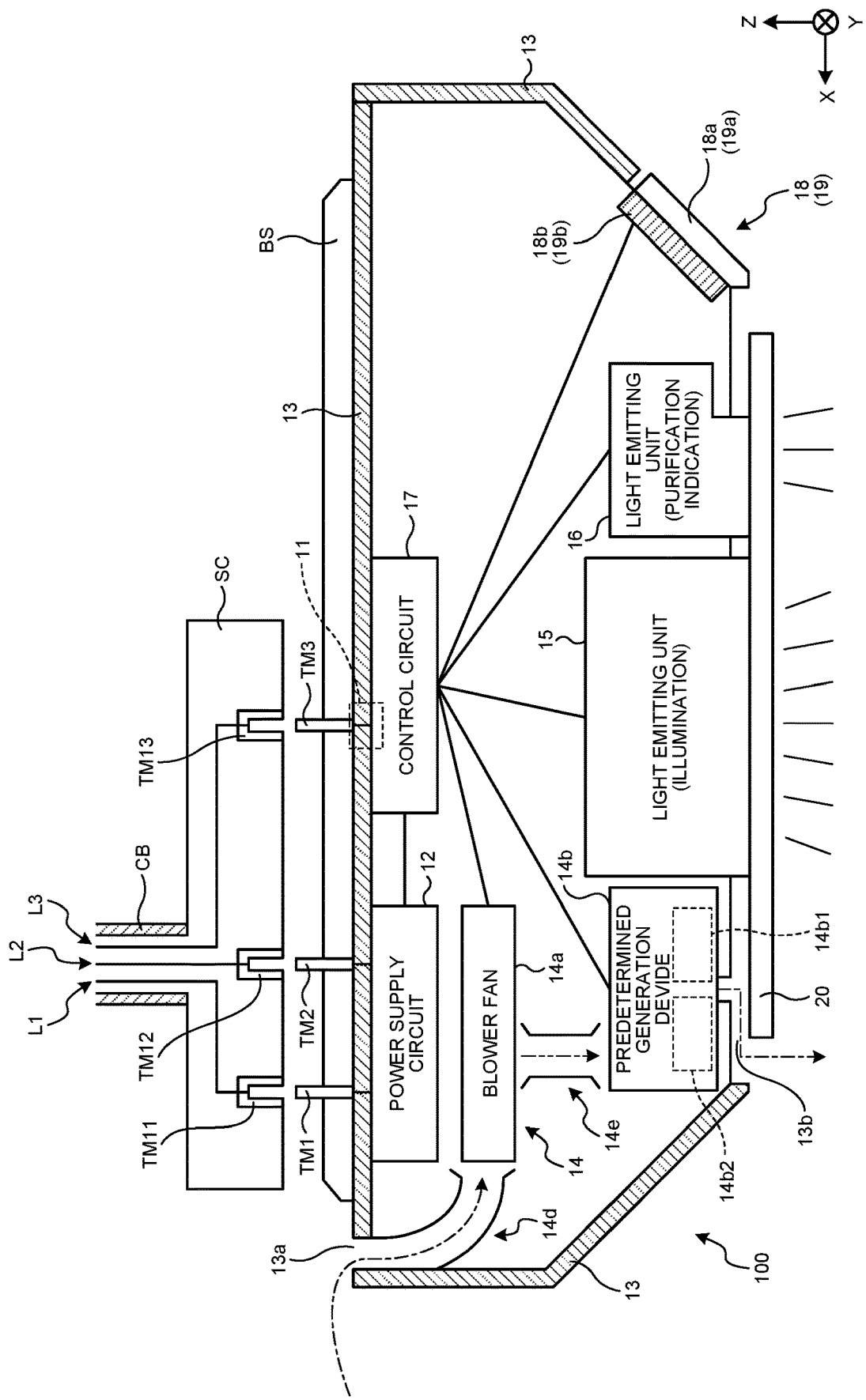
FIG. 3 is a diagram illustrating a configuration of the vehicle interior device according to the first embodiment.
Figure 4:
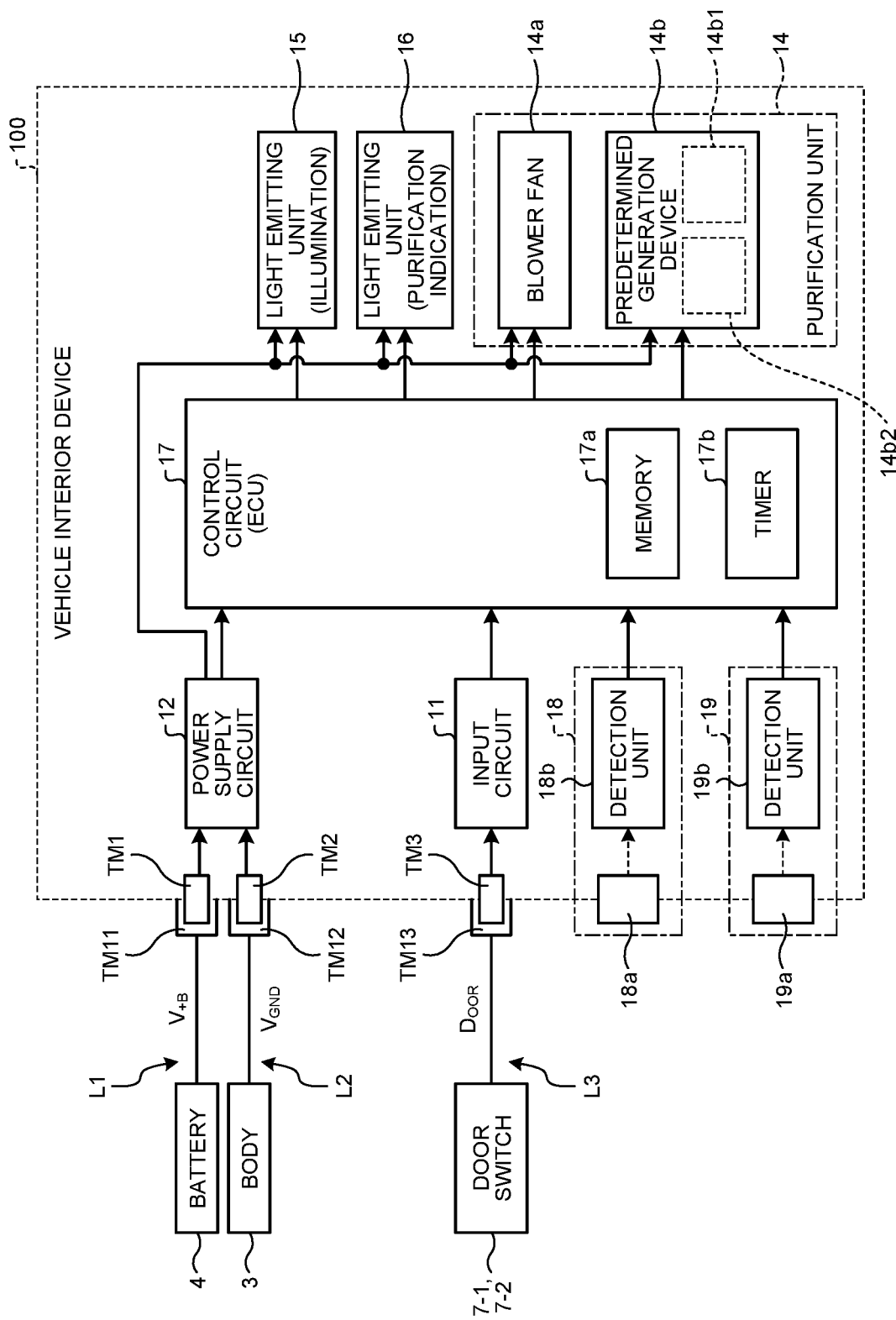
FIG. 4 is a block diagram illustrating a configuration of the vehicle interior device according to the first embodiment.

FIG. 3 is an XZ cross-sectional view illustrating a configuration of the vehicle interior device 100. FIG. 4 is a block diagram illustrating a configuration of the vehicle interior device 100. In FIG. 3, the hardware configuration of the vehicle interior device 100 is schematically illustrated, and the size and position of each component in the XZ cross section may differ from the actual one. This is applicable to cross sections in other directions (e.g., YZ cross section) in the same way as in the XZ cross section. In FIG. 4, the functional configuration of the vehicle interior device 100 is illustrated.

As illustrated in FIG. 3 and FIG. 4, the vehicle interior device 100 further includes terminals TM1, TM2, and TM3, an input circuit 11, a power supply circuit 12, a purification unit 14, a light emitting unit 15, a light emitting unit 16, and a control circuit 17. In the vehicle interior device 100, the air cleaning function is mainly provided by the purification unit 14. The illumination function is mainly provided by the light emitting unit 15.

The terminal TM1 is connected to the power supply circuit 12 and can be connected to the battery 4 through a terminal TM11 and the +B voltage line L1. The terminal TM1 protrudes from a base BS to the +Z side. The base BS is a part disposed on a surface on the +Z side of the housing 13 and raised like a pedestal from the surface on the +Z side of the housing 13. The base BS may be fixed to the surface on the +Z side of the housing 13. The terminal TM11 is disposed at a position corresponding to the terminal TM1 in a socket SC and has a shape corresponding to the terminal TM1. The terminal TM11 may be shaped to mate with the terminal TM1. With this configuration, when the socket SC is attached to the base BS, the terminal TM1 mates with the terminal TM11 and the terminal TM1 can be connected to the battery 4 through the terminal TM11 and the +B voltage line L1.

The terminal TM2 is connected to the power supply circuit 12 and can be connected to the body 3 through a terminal TM12 and the ground voltage line L2. The terminal TM2 protrudes to the +Z side from the base BS disposed on the surface on the +Z side of the housing 13. The terminal TM12 is disposed at a position corresponding to the terminal TM2 in the socket SC and has a shape corresponding to the terminal TM2. The terminal TM12 may be shaped to mate with the terminal TM2. With this configuration, when the socket SC is attached to the base BS, the terminal TM2 mates with the terminal TM12 and the terminal TM2 can be connected to the body 3 through the terminal TM12 and the ground voltage line L2.

The terminal TM3 is connected to the input circuit 11 and can be connected to the door switches 7-1 and 7-2 through a terminal TM13 and the door open/closed signal line L3. The terminal TM13 protrudes to the +Z side from the base BS disposed on the surface on the +Z side of the housing 13. The terminal TM13 is disposed at a position corresponding to the terminal TM3 in the socket SC and has a shape corresponding to the terminal TM3. The terminal TM13 may be shaped to mate with the terminal TM3. With this configuration, when the socket SC is attached to the base BS, the terminal TM3 mates with the terminal TM13 and the terminal TM3 can be connected to the door switch 7 through the terminal TM13 and the door open/closed signal line L3.

The +B voltage line L1, the ground voltage line L2, and the door open/closed signal line L3 can be insulated and covered at a portion extending outward from the socket SC, and mounted as a cable CB.

The input circuit 11 is connected to the control circuit 17, and the door open/closed signal line L3 can be connected through the terminals TM3 and TM13. With the door open/closed signal line L3 connected through the terminals TM3 and TM13, the input circuit 11 inputs the door open/closed signal $D_{OOR}$ transmitted through the door open/closed signal line L3, to the control circuit 17. The input circuit 11 may include a line connected between the terminal TM3 and the control circuit 17 or may further include an element for potential adjustment (e.g., a resistor element) in addition to the line.

The power supply circuit 12 is installed inside the housing 13. The power supply circuit 12 is connected to the control circuit 17, the light emitting unit 15, the light emitting unit 16, a blower fan 14a, and a predetermined generation device 14b. The +B voltage line L1 can be connected to the power supply circuit 12 through the terminals TM1 and TM11, and the ground voltage line L2 can be connected to the power supply circuit 12 through the terminals TM2 and TM12. With the +B voltage line L1 connected through the terminals TM1 and TM11 and the ground voltage line L2 connected through the terminals TM2 and TM12, the power supply circuit 12 supplies electric power based on the difference between a potential $V_{GND}$ on the ground voltage line L2 and a potential $V_{+B}$ on the +B voltage line L1 to the control circuit 17, the light emitting unit 15, the light emitting unit 16, the blower fan 14a, and the predetermined generation device 14b. For example, the power supply circuit 12 may supply a +B voltage $V_{+B}$ transmitted through the +B voltage line L1 and a ground voltage $V_{GND}$ transmitted through the ground voltage line L2 to the control circuit 17, the light emitting unit 15, the light emitting unit 16, the blower fan 14a, and the predetermined generation device 14b. Alternatively, the power supply circuit 12 may generate a differential voltage $\Delta V = V_{+B} - V_{GND}$ between the ground voltage $V_{GND}$ and the +B voltage $V_{+B}$ and supply the generated differential voltage $\Delta V$ to the control circuit 17, the light emitting unit 15, the light emitting unit 16, the blower fan 14a, and the predetermined generation device 14b.

The purification unit 14 is installed inside the housing 13. The purification unit 14 sucks the air in the cabin 6, purifies the sucked air, and blows out the purified air to the cabin 6. The purification unit 14 includes the blower fan 14a, the predetermined generation device 14b, a ventilation channel 14d, and a ventilation channel 14e. The blower fan 14a is installed inside the housing 13. The predetermined generation device 14b is installed inside the housing 13. The inlet of the blower fan 14a is communicatively connected to an inlet 13a through the ventilation channel 14d. The inlet 13a is provided near the edge on the +Z side of the housing 13. A plurality of inlets 13a may be provided at predetermined intervals in the circumferential direction at the edge on the +Z side of the housing 13 (see FIG. 2). The outlet of the blower fan 14a is communicatively connected to an air inlet port of the predetermined generation device 14b through the ventilation channel 14e. A discharge port of the predetermined generation device 14b is communicatively connected to an outlet 13b. The outlet 13b is provided near the edge on the −Z side of the housing 13. The outlet 13b is the outlet for an airflow delivered by the blower fan 14a. A plurality of outlets 13b may be provided at predetermined intervals in the circumferential direction at the edge on the −Z side of the housing 13 (see FIG. 2). Alternatively, the outlets 13b may be arranged along the direction of travel of the vehicle 1 at the edge on the −Z side of the housing 13 and may be arranged on the +X side and the −X side of the housing 13.

The blower fan 14a includes a drive circuit, a fan motor, and a fan. The drive circuit receives the differential voltage $\Delta V$ from the power supply circuit 12 and receives a control signal (e.g., PWM control signal) from the control circuit 17. The drive circuit converts the differential voltage $\Delta V$ in accordance with the control signal to generate a drive signal and supplies the drive signal to the fan motor. The fan motor has a shaft coupled to the fan and rotates the shaft at a rotational speed in accordance with the drive signal. In response, the fan rotates at the rotational speed.

The blower fan 14a has at least an air blow mode with a first intensity and an air blow mode with a second intensity. The second intensity is higher than the first intensity. The blower fan 14a can achieve the air blow mode with the first intensity when the fan rotates at a first rotational speed, and can achieve the air blow mode with the second intensity when the fan rotates at a second rotational speed. The second rotational speed is faster than the first rotational speed.

The predetermined generation device 14b can electrically charge the air by performing a discharge operation in the air based on the electric power supplied from the power supply circuit 12. The predetermined generation device 14b can generate at least either of positive ions and negative ions for the airflow delivered by the blower fan 14a and include the generated ions in the air.

The predetermined generation device 14b may include at least one of an electrostatic atomization device 14b1 and an ozone/ion generation device 14b2.

The electrostatic atomization device 14b1 generates predetermined particles and adds the predetermined particles to the airflow delivered by the blower fan 14a. The predetermined particles may be a mist containing charged water particles. The charged water particles may contain at least either of positive ions and negative ions. The electrostatic atomization device 14b1 can cool the airflow delivered by the blower fan 14a, discharge electricity to moisture generated by condensation to generate a mist of charged water particles, and include the generated mist into the air.

The ozone/ion generation device 14b2 generates predetermined particles by corona discharge and adds the predetermined particles to the airflow delivered by the blower fan 14a. The predetermined particles may be ozone and negative ions. The ozone/ion generation device 14b2 can oxidize oxygen molecules in the airflow delivered by the blower fan 14a to generate ozone, generate negative ions by electric discharge, and include the ozone and negative ions into the air.

The operation unit 18 has a detection unit 18b in addition to the button 18a. The detection unit 18b can detect an operation of the button 18a (e.g., press operation, touch operation). When the detection unit 18b detects an operation of the button 18a, the detection unit 18b transmits an operation signal to the control circuit 17. The control circuit 17 may manage the on/off state of the air cleaning function (i.e., the active/inactive state of the purification unit 14). The vehicle interior device 100 changes at least one of the operation of the blower fan 14a and the operation of the predetermined generation device 14b (electrostatic atomization unit 14b1) by an operation of the operation unit 18.

For example, with the air cleaning function off, the control circuit 17 receives an operation signal of the button 18a to receive an instruction to turn on the air cleaning function and makes a transition from the inactive state to the active state of the purification unit 14. In the active state of the purification unit 14, the control circuit 17 can control the blower fan 14a and the predetermined generation device 14b.

In response to the control of the control circuit 17, the blower fan 14a rotates at a rotational speed in accordance with the control based on the electric power supplied from the power supply circuit 12 and delivers the air sucked from the cabin 6 through the inlet 13a and the ventilation channel 14d to the predetermined generation device 14b via the ventilation channel 14e. In response to the control of the control circuit 17, the predetermined generation device 14b performs a discharge operation in the air based on the electric power supplied from the power supply circuit 12 and electrically charges the air. With this operation, the predetermined generation device 14b generates predetermined particles and includes them into the air of the airflow delivered by the blower fan 14a. The predetermined generation device 14b delivers the air containing the generated predetermined particles to the cabin 6 through the outlet 13b.

With the air cleaning function on, the control circuit 17 receives an operation signal of the button 18a to receive an instruction to turn off the air cleaning function and makes a transition from the active state to the inactive state of the purification unit 14. In response to a transition to the inactive state of the purification unit 14, the blower fan 14a and the predetermined generation device 14b stop.

The light emitting unit 15 is installed in the housing 13. The light emitting unit 15 is, for example, a room lamp and emits light based on the electric power supplied from the power supply circuit 12 to illuminate the cabin 6 through the optical member 20. The light emitting unit 15 can emit light at a first emission intensity. The light emitting unit 15 has a first number of light emission diodes (LEDs) corresponding to the first emission intensity. The light emitting unit 15 can emit light at the first emission intensity by turning on the first number of LEDs.

The operation unit 19 has a detection unit 19b in addition to the button 19a. The detection unit 19b can detect an operation of the button 19a (e.g., press operation, touch operation). When the detection unit 19b detects an operation of the button 19a, the detection unit 19b transmits an operation signal to the control circuit 17. The control circuit 17 may manage the on/off state of the illumination function (i.e., the active/inactive state of the light emitting unit 15). The vehicle interior device 100 changes the light emission by the light emitting unit 15 through an operation of the operation unit 19.

For example, with the illumination function off, the control circuit 17 receives an operation signal of the button 19a to receive an instruction to turn on the illumination function and makes a transition from the inactive state to the active state of the light emitting unit 15. In the active state of the light emitting unit 15, the control circuit 17 can control the light emitting unit 15.

In response to the control of the control circuit 17, the light emitting unit 15 converts the differential voltage $\Delta V = V_{+B} - V_{GND}$ between the +B voltage $V_{+B}$ and the ground voltage $V_{GND}$ supplied from the power supply circuit 12 into a predetermined voltage and feeds current in the forward direction of the first number of LEDs to emit light. With this operation, the light emitting unit 15 can emit light at the first emission intensity and illuminate the cabin 6.

With the illumination function on, the control circuit 17 receives an operation signal of the button 19a to receive an instruction to turn off the illumination function and makes a transition from the active state to the inactive state of the light emitting unit 15. In response to a transition to the inactive state of the light emitting unit 15, the light emitting unit 15 stops light emission.

The light emitting unit 15 may have a door-linked mode and a continuous mode as light emission modes. The operation unit 19 can detect another operation of the button 19a (e.g., long-press operation) as an instruction to switch the light emission modes. When the detection unit 19b detects another operation of the button 19a, the detection unit 19b transmits another operation signal to the control circuit 17. The control circuit 17 may manage the light emission modes (i.e., door-linked mode, continuous mode) of the light emitting unit 15. The vehicle interior device 100 changes the light emission modes of the light emitting unit 15 through an operation of the operation unit 19.

For example, in response to a transition to the active state of the light emitting unit 15, the control circuit 17 sets the light emission mode of the light emitting unit 15 to the door-linked mode. Alternatively, in the continuous mode of the light emission modes, the control circuit 17 receives another operation signal of the button 19a to receive an instruction to switch the light emission modes and makes a transition from the continuous mode to the door-linked mode of the light emitting unit 15. In the door-linked mode, when the door open/closed signal DOOR indicates open, the control circuit 17 may cause the light emitting unit 15 to continuously emit light and thereafter may turn off the light such that the emission intensity gradually decreases over time $t_{r1}$ from the timing when the door open/closed signal $D_{OOR}$ changes from open to closed.

Alternatively, in the door-linked mode of the light emission modes, the control circuit 17 receives another operation signal of the button 19a to receive an instruction to switch the light emission modes and makes a transition from the door-linked mode to the continuous mode of the light emitting unit 15. In the continuous mode, the control circuit 17 may cause the light emitting unit 15 to emit light continuously regardless of the door open/closed signal $D_{OOR}$.

The light emitting unit 16 is installed in the housing 13. The light emitting unit 16 is, for example, a lamp indicating purification and emits light based on the electric power supplied from the power supply circuit 12 to give a notification that the purification unit 14 is in operation through the optical member 20. The light emitting unit 16 can emit light at a second emission intensity. The second emission intensity is smaller than the first emission intensity. The light emitting unit 16 has a second number of LEDs corresponding to the second emission intensity. The second number is smaller than the first number. The light emitting unit 16 can emit light at the second emission intensity by turning on the second number of LEDs.

The control circuit 17 is installed inside the housing 13. The control circuit 17 centrally controls each unit in the vehicle interior device 100. The control circuit 17 can be implemented as an engineering control unit (ECU). The control circuit 17 includes a memory 17a and a timer 17b.

For example, the control circuit 17 may control the light emitting unit 15 in accordance with the door open/closed signal $D_{OOR}$ input through the input circuit 11. When the signal $D_{OOR}$ on the door open/closed signal line L3 is open, the control circuit 17 controls the light emitting unit 15 to emit light with a predetermined color temperature. With this control, the light emitting unit 15 emits light with a predetermined color temperature. When the signal $D_{OOR}$ on the door open/closed signal line L3 is closed, the control circuit 17 controls the light emitting unit 15 to stop. With this control, the light emitting unit 15 does not emit light.

When the potential difference ΔV of the +B voltage line L1 relative to the potential $V_{GND}$ on the ground voltage line L2 is greater than a threshold voltage Vth1 and when the door open/closed signal $D_{OOR}$ indicates closed, the control circuit 17 controls the blower fan 14a to operate in the air blow mode with the first intensity. With this control, the blower fan 14a is set to the air blow mode with the first intensity and the fan is rotated at the first rotational speed in the air blow mode with the first intensity. When the potential difference ΔV of the +B voltage line L1 relative to the potential $V_{GND}$ on the ground voltage line L2 is smaller than the threshold voltage Vth1 and greater than a threshold voltage Vth2 within time $t_d$ after the door open/closed signal $D_{OOR}$ indicates open and then indicates closed, and when the door open/closed signal $D_{OOR}$ indicates closed, the control circuit 17 controls the blower fan 14a to operate in the air blow mode with the second intensity. The threshold voltage Vth2 is smaller than the threshold voltage Vth1. The second intensity is higher than the first intensity. With this control, the blower fan 14a is set to the air blow mode with the second intensity and the fan is rotated at the second rotational speed in the air blow mode with the second intensity. The second rotational speed is faster than the first rotational speed. When the potential difference ΔV of the +B voltage line L1 relative to the potential $V_{GND}$ on the ground voltage line L2 becomes smaller than the threshold voltage Vth2 and when the door open/closed signal $D_{OOR}$ indicates closed, the control circuit 17 controls the blower fan 14a to stop. With this control, the blower fan 14a stops.

In other words, the purification unit 14 is operated from when the vehicle 1 is in use to when it is parked. When the potential difference ΔV is stable at a level greater than the threshold voltage Vth1, the vehicle 1 is considered to be in use. When the vehicle 1 is in use (e.g., when the vehicle 1 is traveling), the control circuit 17 operates the blower fan 14a in the air blow mode with the relatively weak first intensity, because the predetermined particles (e.g., charged water particles containing ions) are diffused by the air from the air conditioning device 9. When the potential difference ΔV is stable at a level smaller than the threshold voltage Vth1, the vehicle 1 is considered to be parked. When the vehicle 1 is stopped, the air conditioning device 9 is often not operated. The control circuit 17 therefore causes the blower fan 14a to operate in the air blow mode with the stronger second intensity. With this operation, the predetermined particles (e.g., charged water particles containing ions, or ozone and negative ions) can spread throughout the cabin 6, thereby effectively purifying the cabin 6.

The control circuit 17 may control the purification unit 14 and the light emitting unit 16 in accordance with the door open/closed signal $D_{OOR}$ input through the input circuit 11. When the potential difference ΔV of the +B voltage line L1 relative to the potential $V_{GND}$ on the ground voltage line L2 becomes smaller than the threshold voltage Vth1 within time $t_d$ after the door open/closed signal $D_{OOR}$ indicates open and then indicates closed, and when the door open/closed signal $D_{OOR}$ indicates closed, the control circuit 17 subsequently controls the purification unit 14 and the light emitting unit 16 as follows. The control circuit 17 controls the light emitting unit 16 to emit light for time $t_{lamp}$ and controls the purification unit 14 to operate for time $t_w$. Time $t_w$ is longer than time $t_{lamp}$. With this control, the light emitting unit 16 emits light for time $t_{lamp}$, the blower fan 14a operates for time $t_w$, and the predetermined generation device 14 generates predetermined particles for time $t_w$. For example, since the light emitting unit 16 needs to emit light when the occupant P gets off and leaves the vehicle 1, time $t_{lamp}$ in which the light emitting unit 16 emits light can be shorter than time $t_w$ in which the purification unit 14 operates. This control can notify the occupant P of the operation of the purification unit 14 and can save power consumption of the vehicle interior device 100.

The control circuit 17 may control the light emitting unit 15 and the light emitting unit 16 in accordance with the door open/closed signal $D_{OOR}$ input through the input circuit 11. For example, it is assumed that the light emission mode of the light emitting unit 15 is switched to the door-linked mode. In this case, when the potential difference ΔV of the +B voltage line L1 relative to the potential $V_{GND}$ on the ground voltage line L2 becomes smaller than the threshold voltage Vth1 within time $t_d$ after the door open/closed signal $D_{OOR}$ indicates open and then indicates closed, and when the door open/closed signal $D_{OOR}$ indicates closed, the control circuit 17 subsequently controls the light emitting unit 15 and the light emitting unit 16 as follows. The control circuit 17 controls the light emitting unit 15 to emit light for time $t_{r1}$ and controls the light emitting unit 16 to emit light for time $t_{lamp}$. Time $t_{r1}$ is longer than time $t_{lamp}$. With this control, the light emitting unit 15 stops emitting light before the light emitting unit 16 stops emitting light.

In other words, light emission by the light emitting unit 16 for purification indication can be kept even after light emission by the light emitting unit 15 for illumination. The emission intensity of light emission by the light emitting unit 15 is stronger than that of the light emitting unit 16. Therefore, although the light emitting unit 16 emits light while the light emitting unit 15 is emitting light, it is difficult to recognize light emission by the light emitting unit 16 when the inside of the cabin 6 is viewed from the outside of the vehicle 1. When the light emission mode of the light emitting unit 15 is switched to the door-linked mode, light emission by the light emitting unit 16 is kept at least even after light emission by the light emitting unit 15 linked to the doors is stopped, thereby ensuring that the occupant P getting out of the vehicle 1 can recognize light emission by the light emitting unit 16 for purification indication.

Figure 5:
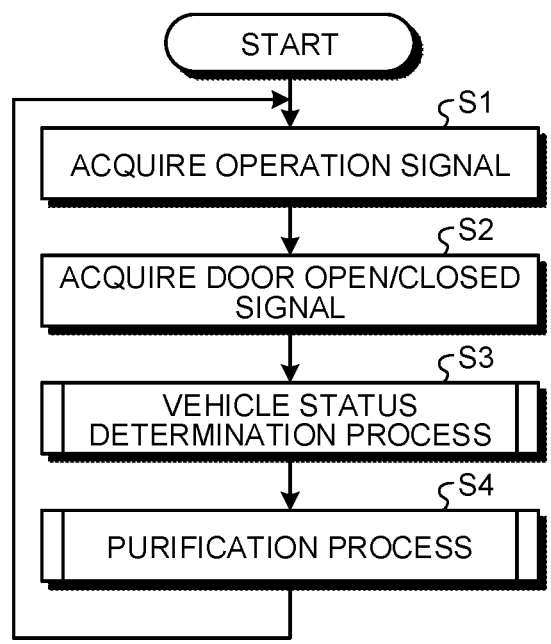
FIG. 5 is a flowchart illustrating the operation of the vehicle interior device according to the first embodiment.

FIG. 5 is a flowchart illustrating the operation of the vehicle interior device 100. When the operation unit 18, 19 is operated, the control circuit 17 acquires an operation signal from the operation unit 18, 19 in the vehicle interior device 100 (S1). When the door 8-1, 8-2 is opened or closed, the control circuit 17 acquires a door open/closed signal DOOR from the door switch 7-1, 7-2 (S2). S1 and S2 may be performed in parallel.

The vehicle interior device 100 performs a vehicle status determination process to determine a status of the vehicle 1 (S3). For example, the vehicle interior device 100 is installed on the ceiling 6a in exchange for an existing device (e.g., room lamp) already installed on the ceiling 6a. This allows for smart installation, such as an installation state with wiring not exposed. However, the wiring for the operation of the existing device (room lamp), such as the +B power line L1, the door open/closed signal line L3, and the ground voltage line L2, extends at the installation area of the existing device in the roof 3a of the body 3. The control circuit 17 therefore determines a vehicle status (e.g., in use or parked) from the +B voltage $V_{+B}$ transmitted through the +B power line L1. The detail of the vehicle status determination process (S3) will be described later.

The vehicle interior device 100 performs a purification process to purify the air in the cabin 6 (S4). For example, the purification unit 14 can purify the inside of the cabin 6 by diffusing the generated predetermined particles (e.g., charged water particles) to various locations in the cabin 6. Since the air conditioning device 9 operates when the vehicle 1 is in use, the blower fan 14a can diffuse the predetermined particles to various locations in the cabin 6 even when operating in the air blow mode with the relatively weak first intensity. On the other hand, since the air conditioning device 9 often does not operate while the vehicle 1 is parked, the blower fan 14a is operated in the air blow mode with the relatively strong second intensity to diffuse the predetermined particles. In this case, the control circuit 17 controls the light emitting unit 16 to indicate to the occupant P (user) that the operation of the purification unit 14 is carried out while the vehicle 1 is parked. This control enables the user to visually experience that purification is being carried out. The control circuit 17 performs control such that light emission by the light emitting unit 16 for purification indication is visible after the door is closed and the light emitting unit 15 for illumination is turned off, and the light is turned off after a certain period of time. This control can visualize the operation of the purification unit 14 while saving power consumption of the vehicle interior device 100. The detail of the purification process (S4) will be described later.

Figure 6:
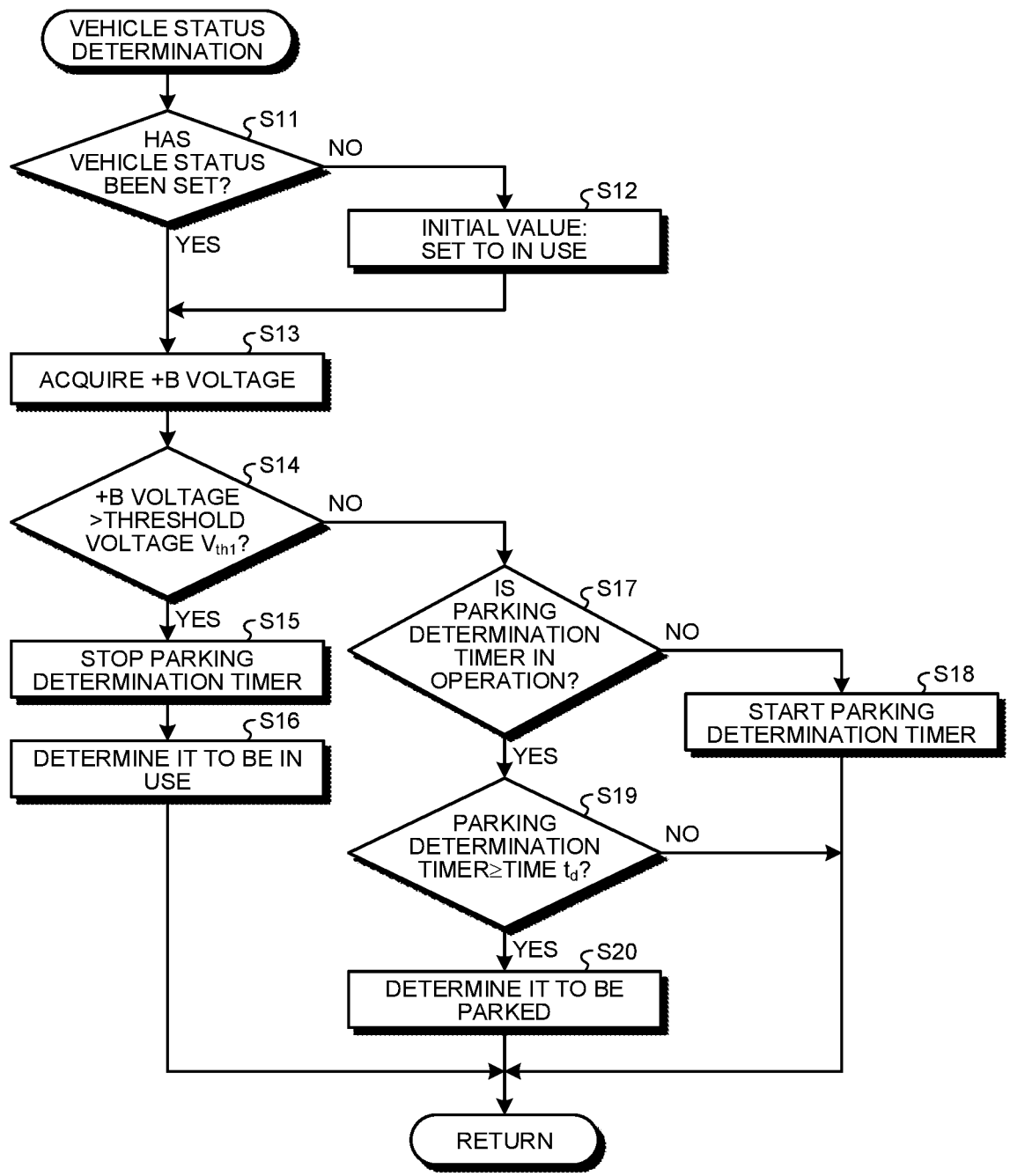
FIG. 6 is a flowchart illustrating a vehicle status determination process in the first embodiment.

FIG. 6 is a flowchart illustrating the vehicle status determination process (S3). In the vehicle interior device 100, the control circuit 17 determines whether a vehicle status has been set (S11). The vehicle status includes "in use" and "parked". In use includes traveling of the vehicle 1. In use may further include a status in which the air conditioning device 9 is operating with the vehicle 1 not traveling but stopped. The control circuit 17 refers to the memory 17a, determines that the vehicle status has not been set if vehicle status information indicating a vehicle status is not stored in the memory 17a (No at S11), sets the vehicle status to an initial value "in use", and stores the vehicle status information indicating "in use" into the memory 17a (S12). If the vehicle status information is stored in the memory 17a, the control circuit 17 determines that the vehicle status has been set (Yes at S11) and skips S12.

The control circuit 17 acquires the +B voltage $V_{+B}$ through the +B power line L1 (S13), compares the +B voltage V+B with the threshold voltage Vth1, and determines whether the +B voltage $V_{+B}$ is greater than the threshold voltage Vth1 (S14). The threshold voltage Vth1 can be experimentally determined in advance as a value between the average value of the +B voltage while the vehicle 1 is in use and the average value of the +B voltage while the vehicle 1 is parked. The threshold voltage Vth1 is, for example, 13.2 V.

If the +B voltage $V_{+B}$ is greater than the threshold voltage Vth1 (Yes at S14), the control circuit 17 stops and initializes a parking determination timer (S15). The parking determination timer is a timer used to determine whether the vehicle is parked, and can be implemented by counting the time since the +B voltage $V_{+B}$ becomes smaller than the threshold voltage Vth1 with the timer 17b. Then, the control circuit 17 determines that the vehicle status is in use (determines and sets it to be "in use") and stores the vehicle status information indicating "in use" into the memory 17a (S16).

If the +B voltage $V_{+B}$ is smaller than the threshold voltage Vth1 (No at S14), the control circuit 17 determines whether the parking determination timer is in operation (S17).

If the parking determination timer is not in operation (No at S17), the control circuit 17 starts the parking determination timer (S18) and starts counting the time since the +B voltage $V_{+B}$ becomes smaller than the threshold voltage Vth1.

If the parking determination timer is in operation (Yes at S17), the control circuit 17 compares the count time of the parking determination timer with time $t_d$ and determines whether the count time of the parking determination timer is equal to or longer than time $t_d$ (S19). Time $t_d$ can be determined experimentally in advance as a time period from when the vehicle 1 is parked to when the +B voltage $V_{+B}$ reaches the average value of the +B voltage during parking. Time $t_d$ is, for example, five minutes.

If the count time of the parking determination timer is equal to or longer than time $t_d$ (Yes at S19), the control circuit 17 can consider that the +B voltage $V_{+B}$ is stably smaller than the threshold voltage Vth1 and the vehicle 1 is parked. The control circuit 17 determines that the vehicle status is parked (determines and sets it to be "parked") and stores the vehicle status information indicating "parked" into the memory 17a (S20). If the count time of the parking determination timer is shorter than time $t_d$ (No at S19), the control circuit 17 skips S20.

In the vehicle status determination process (S3), the vehicle interior device 100 uses the +B voltage $V_{+B}$ to determine the vehicle status, as illustrated in FIG. 6. Through the process S14→S17→S19→S20, the vehicle interior device 100 can determine that the vehicle is parked if the +B voltage $V_{+B}$ is lower than the threshold voltage Vth1 and stable for time $t_d$. Through the process S14→S15→S16, the vehicle interior device 100 can determine that the vehicle is in use if the +B voltage $V_{+B}$ is higher than the threshold voltage Vth1.

Figure 7:
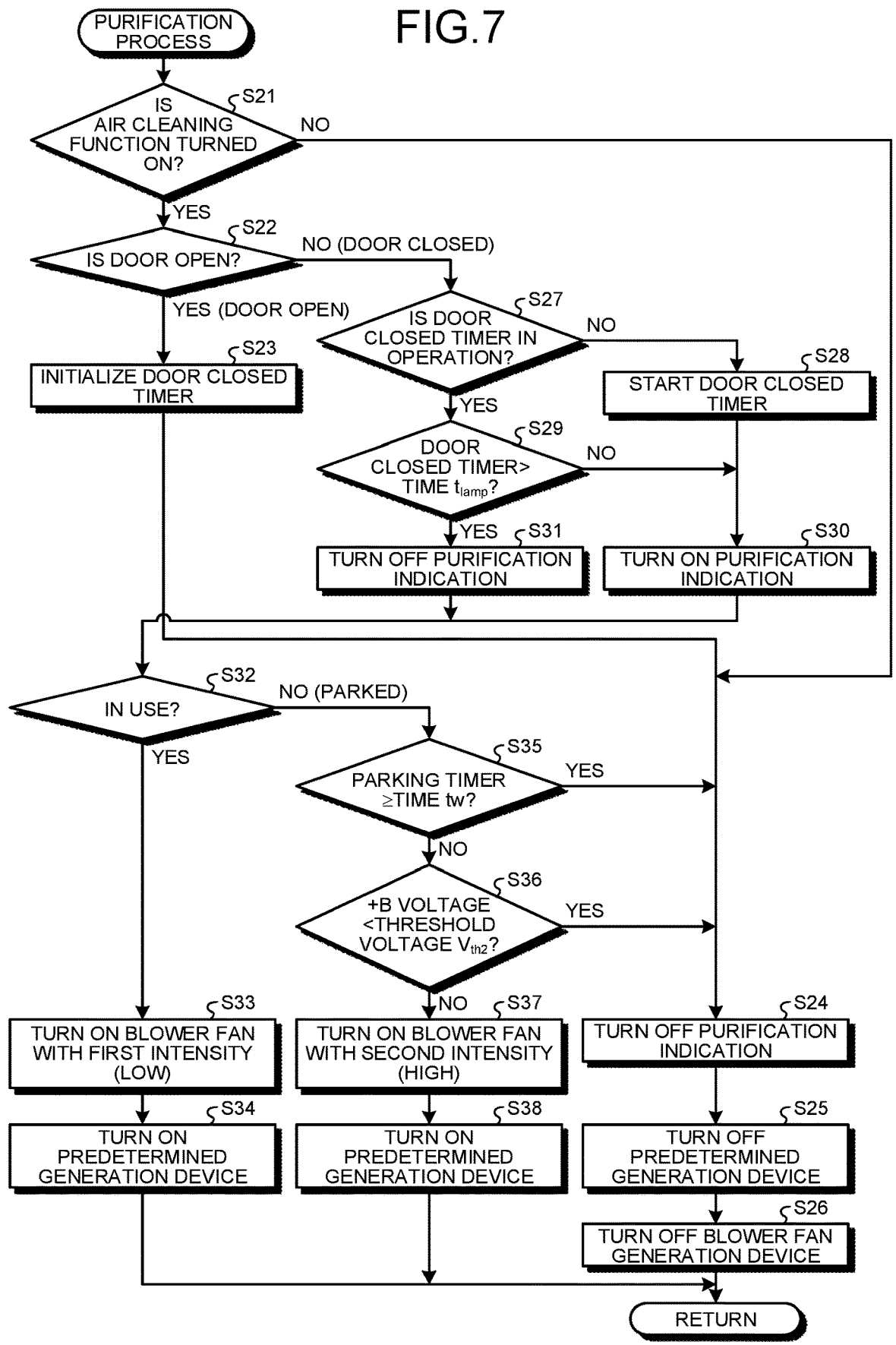
FIG. 7 is a flowchart illustrating a purification process in the first embodiment.

FIG. 7 is a flowchart illustrating the purification process (S4). In the vehicle interior device 100, the control circuit 17 determines whether the air cleaning function is turned on in accordance with the operation signal acquired at S1 (S21).

If the air cleaning function is not turned on and is kept off (No at S21), the control circuit 17 turns off the light emitting unit 16 for purification indication (S24), turns off the predetermined generation device 14b (S25), and turns off the blower fan 14a (S26).

If the air cleaning function is turned on (Yes at S21), the control circuit 17 determines whether the door 8 is open (S22) in accordance with the door open/closed signal $D_{OOR}$ acquired at S2.

If the door 8 is open (Yes at S22), the control circuit 17 initializes a door closed timer (S23). The door closed timer is a timer for counting the time in which the door 8 is closed and can be implemented by counting the time since both doors 8-1 and 8-2 are closed with the timer 17b. The control circuit 17 turns off the light emitting unit 16 for purification indication (S24), turns off the predetermined generation device 14b (S25), and turns off the blower fan 14a (S26).

If the door 8 is closed (No at S22), the control circuit 17 determines whether the door closed timer is in operation (S27).

If the door closed timer is not in operation (No at S27), the control circuit 17 starts the door closed timer (S28) and starts counting the time since the door 8 is closed.

If the door closed timer is in operation (Yes at S27), the control circuit 17 compares the count time of the door closed timer with time $t_{lamp}$ to determine whether the count time of the door closed timer exceeds time $t_{lamp}$ (S29). Time $t_{lamp}$ is the time for the light emitting unit 16 for purification indication to emit light after the door 8 is closed, and is longer than time $t_{r1}$. Time $t_{r1}$ is a time period from when the door 8 is closed to when the light emitting unit 15 turns off in the door-linked mode.

If the count time of the door closed timer does not exceed time $t_{lamp}$ (No at S29), the control circuit 17 keeps the light emitting unit 16 for purification indication on (S30) and proceeds to S32.

If the count time of the door closed timer exceeds time $t_{lamp}$ (Yes at S29), the control circuit 17 turns off the light emitting unit 16 for purification indication (S31) and proceeds to S32.

The control circuit 17 determines whether the vehicle 1 is in use (S32). The control circuit 17 refers to the vehicle status information stored in the memory 17a and determines that the vehicle 1 is in use if the vehicle status information indicates "in use" and determines that the vehicle 1 is parked if the vehicle status information indicates "parked".

If the vehicle 1 is in use (Yes at S32), the control circuit 17 turns on the blower fan 14a at the first intensity (e.g., intensity "low") or continues the on state at the first intensity (S33). The control circuit 17 turns on the predetermined generation device 14b or continues the on state (S34).

If the vehicle 1 is parked (No at S32), the control circuit 17 compares the count time of a parking timer with time $t_w$ and determines whether the count time of the parking timer is longer than time $t_w$ (S35). Time $t_w$ can be experimentally determined in advance as the time for the blower fan 14a to be operated at the second intensity (e.g., intensity "high") after the vehicle 1 is parked.

If the count time of the parking timer is longer than time $t_w$ (Yes at S35), the control circuit 17 determines that the time for the purification unit 14 to operate has elapsed, and turns off the light emitting unit 16 for purification indication (S24), turns off the predetermined generation device 14b (S25), and turns off the blower fan 14a (S26).

If the count time of the parking timer is shorter than time $t_w$ (No at S35), the control circuit 17 compares the +B voltage $V_{+B}$ with the threshold voltage Vth2 to determine whether the +B voltage $V_{+B}$ is smaller than the threshold voltage Vth2 (S36). The threshold voltage Vth2 can be experimentally determined in advance as the lower limit of a voltage range in which the use of the battery 4 is recommended. The threshold voltage Vth2 is, for example, 12.4 V.

If the +B voltage $V_{+B}$ is smaller than the threshold voltage Vth2 (Yes at S36), the control circuit 17 determines that the use of the battery 4 by the purification unit 14 should be stopped, and turns off the light emitting unit 16 for purification indication (S24), turns off the predetermined generation device 14b (S25), and turns off the blower fan 14a (S26). With this process, the electric power of the battery 4 can be preserved until the vehicle 1 is started next time.

If the +B voltage $V_{+B}$ is equal to or greater than the threshold voltage Vth2 (No at S36), the control circuit 17 turns on the blower fan 14a at the second intensity (e.g., intensity "high") or continues the on state at the second intensity (S37). The control circuit 17 turns on the predetermined generation device 14b or continues the on state (S38).

Figure 8:
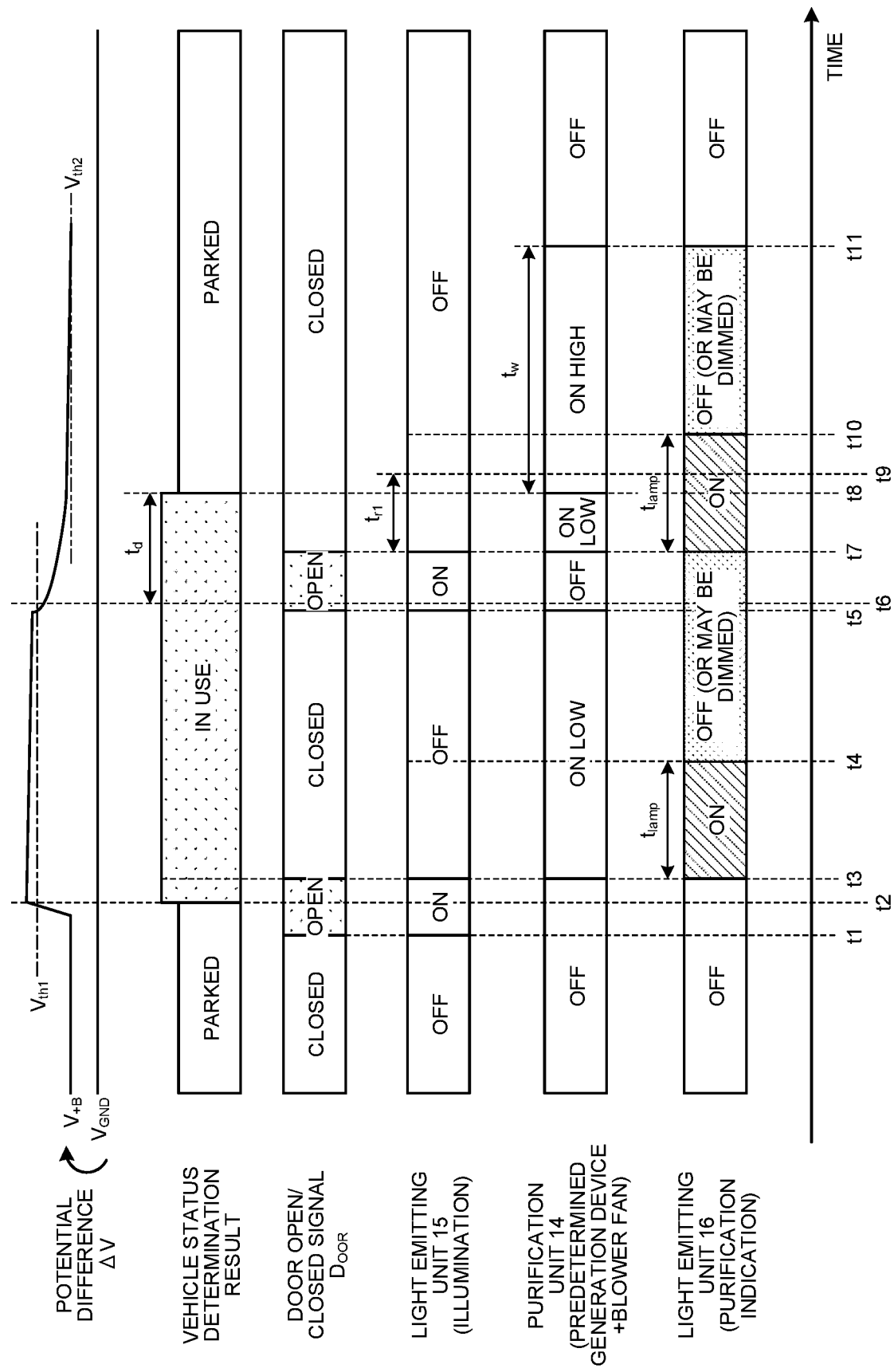
FIG. 8 is a timing chart illustrating the operation of the vehicle interior device according to the first embodiment.

FIG. 8 is a timing chart illustrating the operation of the vehicle interior device 100. FIG. 8 illustrates an example of the operation in a case where the vehicle 1 parked is started, travels, and is parked again. In FIG. 8, it is assumed that the light emitting unit 15 is switched to the door-linked mode.

Immediately before timing t1, the +B voltage $V_{+B}$ is stable at the threshold voltage Vth1 or lower, and the control circuit 17 determines that the vehicle status is "parked". In response to the determination result "parked" and the door open/closed signal $D_{OOR}$ indicating closed, the control circuit 17 turns off the light emitting unit 15 for illumination, turns off (inactivates) the purification unit 14, and turns off the light emitting unit 16 for purification indication.

At timing t1, in response to a transition of the door open/closed signal $D_{OOR}$ from closed to open, the control circuit 17 turns on the light emitting unit 15 for illumination to emit light. At this timing, both the purification unit 14 and the light emitting unit 16 are off.

At timing t2, when the vehicle 1 is started, the +B voltage $V_{+B}$ rises and exceeds the threshold voltage Vth1, for example, because the battery 4 is charged as the vehicle 1 travels. In response to the +B voltage $V_{+B}$ being stable at a level greater than the threshold voltage Vth1, the control circuit 17 determines the status of the vehicle 1 to be "in use" and stores the vehicle status information indicating that the vehicle is in use into the memory 17a.

At timing t3, in response to a transition of the door open/closed signal $D_{OOR}$ from open to closed, the control circuit 17 turns off the light emitting unit 15 for illumination to turn off the light. In addition, the control circuit 17 turns on and activates the purification unit 14, operates the blower fan 14a at the first intensity (e.g., intensity "low"), causes the predetermined generation device 14b to operate, turns on the indication unit 16 for purification indication to emit light, and starts the door closed timer.

At timing t4, when the count time of the door closed timer reaches time $t_{lamp}$, the control circuit 17 turns off the indication unit 16 for purification indication to turn off the light. The control circuit 17 may dim the light at a relatively low illuminance instead of turning off the indication unit 16 for purification indication. At this time, the control circuit 17 keeps the purification unit 14 in the active state, operates the blower fan 14a at the first intensity (e.g., intensity "low"), and causes the predetermined generation device 14b to operate.

At timing t5, in response to a transition of the door open/closed signal $D_{OOR}$ from closed to open, the control circuit 17 turns on the light emitting unit 15 for illumination to emit light. In addition, the control circuit 17 makes a transition of the purification unit 14 to the inactive state and stops the blower fan 14a and the predetermined generation device 14b. At this timing, the light emitting unit 16 for purification indication is off or dimmed.

At timing t6, in response to the +B voltage $V_{+B}$ becoming equal to or lower than the threshold voltage Vth1, the control circuit 17 starts the parking determination timer.

At timing t7, in response to a transition of the door open/closed signal $D_{OOR}$ from open to closed, the control circuit 17 turns off the light emitting unit 15 for illumination and starts turning off the light such that the emission intensity gradually decreases. In addition, the control circuit 17 turns on and activates the purification unit 14, operates the blower fan 14a at the first intensity (e.g., intensity "low"), causes the predetermined generation device 14b to operate, turns on the indication unit 16 for purification indication to emit light, and starts the door closed timer.

At timing t8, when the count time of the parking determination timer reaches time $t_d$, the control circuit 17 determines that the status of the vehicle 1 is "parked", stores the vehicle status information indicating parked into the memory 17a, and starts the parking timer. In addition, the control circuit 17 changes the operating intensity of the blower fan 14a from the first intensity to the stronger second intensity (e.g., intensity "high"). The control circuit 17 operates the blower fan 14a at the second intensity (e.g., intensity "high") after the change and causes the predetermined generation device 14b to continuously operate.

At timing t9, time $t_{r1}$ since the light emitting unit 15 turns off the light (timing t7) elapses, and the turning-off of the light emitting unit 15 is completed. At this timing, the count time of the door closed timer has not reached time $t_{lamp}$, and the light emitting unit 16 continues light emission. The count time of the parking timer has not reached time $t_w$, the purification unit 14 is kept in the active state, the blower fan 14a is operated at the second intensity (e.g., intensity "high"), and the predetermined generation device 14b is operating.

At timing t10, when the count time of the door closed timer reaches time $t_{lamp}$, the control circuit 17 turns off the indication unit 16 for purification indication to turn off the light. The control circuit 17 may dim the light at a relatively low illuminance instead of turning off the indication unit 16 for purification indication. At this timing, the count time of the parking timer has not reached time $t_w$, the purification unit 14 is kept in the active state, the blower fan 14a is operated at the second intensity (e.g., intensity "high"), and the predetermined generation device 14b is operating.

At timing t11, when the count time of the parking timer reaches time $t_w$, the control circuit 17 makes a transition to the inactive state of the purification unit 14, turns off the blower fan 14a, and turns off the predetermined generation device 14b.

Although not illustrated in the drawing, if the +B voltage $V_{+B}$ becomes equal to or lower than the threshold voltage Vth2 before the count time of the parking timer reaches time $t_w$, the control circuit 17 makes a transition to the inactive state of the purification unit 14, turns off the blower fan 14a, and turns off the predetermined generation device 14b. With this control, the electric power of the battery 4 can be preserved until the vehicle 1 is started next time.

As described above, in the present embodiment, in the vehicle interior device 100, when the potential difference ΔV of the +B voltage line L1 relative to the potential $V_{GND}$ on the ground voltage line L2 becomes smaller than the threshold voltage Vth1 within time $t_d$ after the $D_{OOR}$ on the door open/closed signal line L3 indicates open and then indicates closed, and when the signal $D_{OOR}$ on the door open/closed signal line L3 indicates closed, the light emitting unit 16 subsequently emits light for time $t_{lamp}$, and the blower fan 14a operates for time $t_w$ longer than time $t_{lamp}$. This configuration ensures the purification of the air in the cabin 6 while limiting the purification indication time to the time period in which the occupant P is presumably near the vehicle 1, thereby achieving both reduction of power consumption and effective purification of the air in the cabin 6.

Further, in the present embodiment, in the vehicle interior device 100, the light emitting unit 15 emits light when the signal $D_{OOR}$ on the door open/closed signal line L3 indicates open. When the signal $D_{OOR}$ on the door open/closed signal line L3 indicates open and then indicates closed, in the door-linked mode, the light emitting unit 15 for illumination stops light emission before the light emitting unit 16 for purification indication stops light emission. In other words, the light emitting unit 16 for purification indication emits light even after the light emitting unit 15 for illumination stops emitting light, thereby ensuring that the occupant P getting out of the vehicle 1 can recognize light emission for purification indication.

Further, in the present embodiment, in the vehicle interior device 100, when the potential difference ΔV of the +B voltage line L1 relative to the potential $V_{GND}$ on the ground voltage line L2 is greater than the threshold voltage Vth2 and when the signal $D_{OOR}$ on the door open/closed signal line L3 indicates closed, the blower fan 14a is set to the air blow mode with the first intensity. When the potential difference ΔV of the +B voltage line L1 relative to the potential $V_{GND}$ on the ground voltage line L2 becomes smaller than the threshold voltage Vth1 within time $t_d$ after the signal $D_{OOR}$ on the door open/closed signal line L3 indicates open and then indicates closed, and when the signal $D_{OOR}$ on the door open/closed signal line L3 indicates closed, the blower fan 14a is set to the air blow mode with the second intensity. The threshold voltage Vth2 is smaller than the threshold voltage Vth1. The second intensity is higher than the first intensity. With this configuration, during parking in which the air conditioning device 9 is often not operated, the blower fan 14a is operated at an intensity higher than usual, so that the predetermined particles (e.g., charged water particles containing ions) can spread throughout the cabin 6, thereby effectively purifying the cabin 6.

Figure 9:
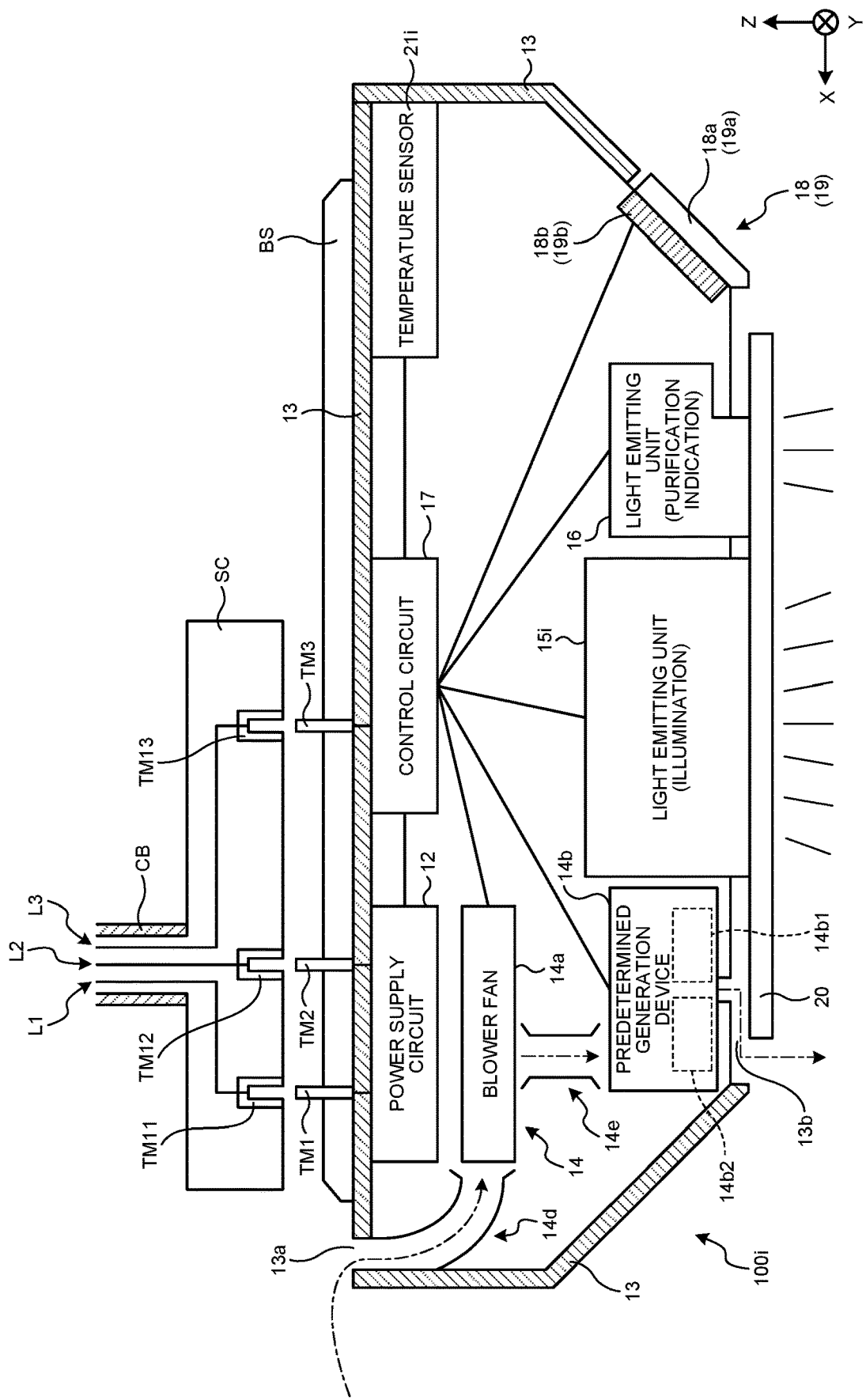
FIG. 9 is a diagram illustrating a configuration of the vehicle interior device according to a first modification of the first embodiment.
Figure 10:
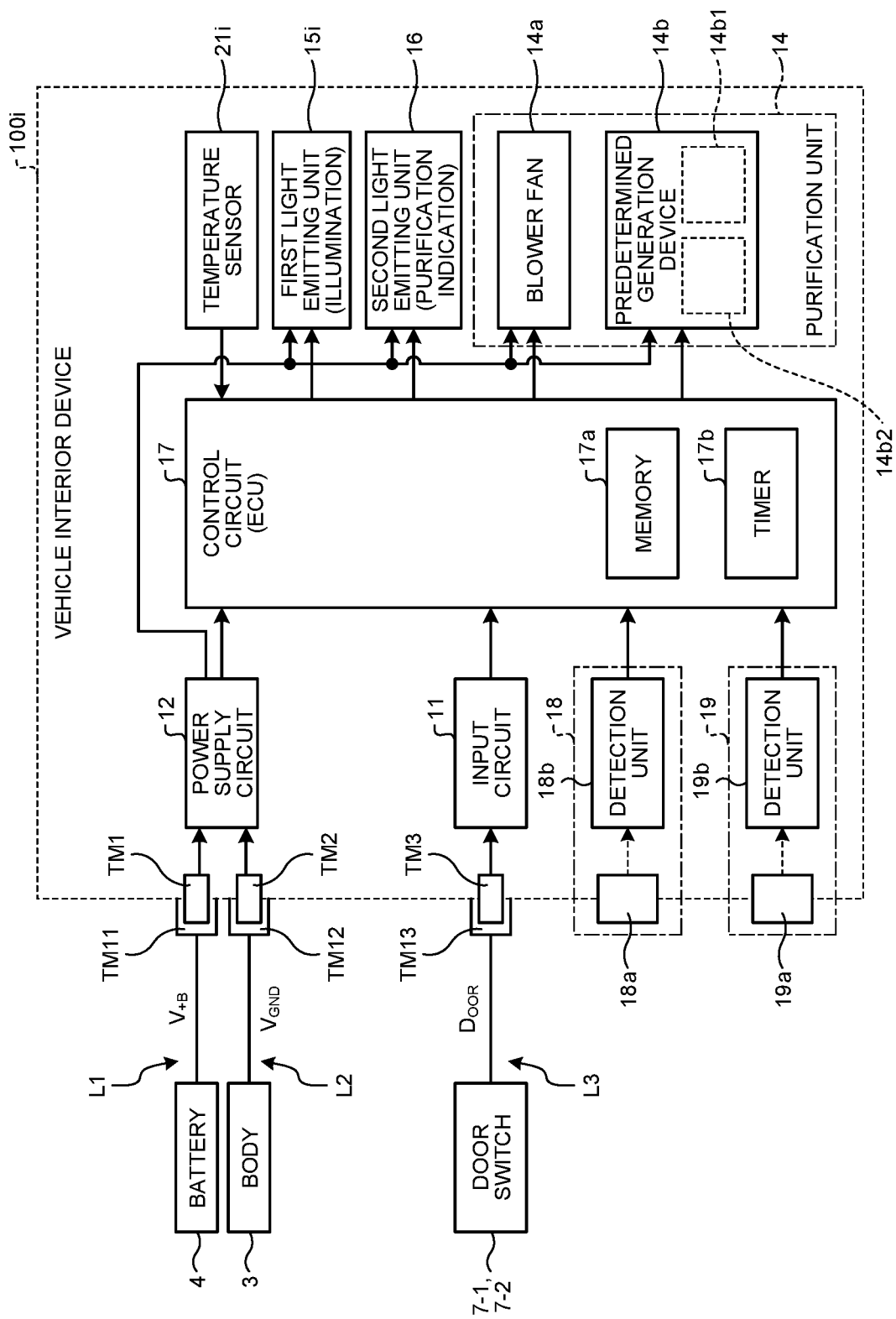
FIG. 10 is a block diagram illustrating a configuration of the vehicle interior device according to the first modification of the first embodiment.

As a first modification of the first embodiment, as illustrated in FIG. 9 and FIG. 10, a vehicle interior device 100i may be configured to measure the temperature of the cabin 6. FIG. 9 is an XZ cross-sectional view illustrating a configuration of the vehicle interior device 100i according to the first modification of the first embodiment. FIG. 10 is a block diagram illustrating a configuration of the vehicle interior device 100i according to the first modification of the first embodiment. In FIG. 9, the hardware configuration of the vehicle interior device 100i is schematically illustrated, and the size and position of each component in the XZ cross section may differ from the actual one. This is applicable to cross sections in other directions (e.g., YZ cross section) in the same way as in the XZ cross section. In FIG. 10, the functional configuration of the vehicle interior device 100i is illustrated.

The vehicle interior device 100i further includes a light emitting unit 15i instead of the light emitting unit 15 (see FIG. 3 and FIG. 4) and further includes a temperature sensor 21i.

The temperature sensor 21i is installed inside the housing 13. The temperature sensor 21i is connected to the control circuit 17. The temperature sensor 21i measures the temperature of the cabin 6 and supplies the measurement result to the control circuit 17. The control circuit 17 may detect the lowest temperature of the cabin 6 in accordance with the measurement result of the temperature sensor 21i.

For example, the control circuit 17 uses the temperature sensor 21i to detect a period lowest temperature that is the lowest in a predetermined period. The predetermined period may be at least 24 hours and may be two or more days. The predetermined period includes a plurality of measurement cycles. The measurement cycles each include, for example, one hour. The control circuit 17 may measure the temperature of the cabin 6 in each measurement cycle, accumulate it for a predetermined period, and detect the period lowest temperature. Alternatively, the control circuit 17 may measure the temperature of the cabin 6 in each measurement cycle, accumulate it for a day, determine a daily lowest temperature, and use the average in multiple days as the period lowest temperature. The multiple days may be two or more days and, for example, includes a week. The control circuit 17 can grasp a sense of the season in accordance with the period lowest temperature.

Since the temperature of the cabin 6 can be changed by the air conditioning device 9 while the vehicle 1 is in use, the control circuit 17 may exclude the temperatures measured while the vehicle 1 is in use when determining the lowest temperature in a predetermined period or the daily lowest temperature. The highest temperature in the cabin 6 may vary regardless of the season due to solar radiation. It is therefore desirable that the control circuit 17 grasps a sense of the season in accordance with the period lowest temperature.

The light emitting unit 15i can emit light with a predetermined color temperature and can change the color temperature of light emission. The control circuit 17 may change the color temperature of light emission by the light emitting unit 15i in accordance with the period lowest temperature and control the light emitting unit 15i to emit light at the changed color temperature.

In response to the control by the control circuit 17, when the period lowest temperature is a first temperature, the light emitting unit 15i emits light with the first color temperature. When the period lowest temperature is a second temperature, the light emitting unit 15i emits light with the second color temperature. The second temperature is greater than the first temperature. The second color temperature is different from the first color temperature.

Figure 11:
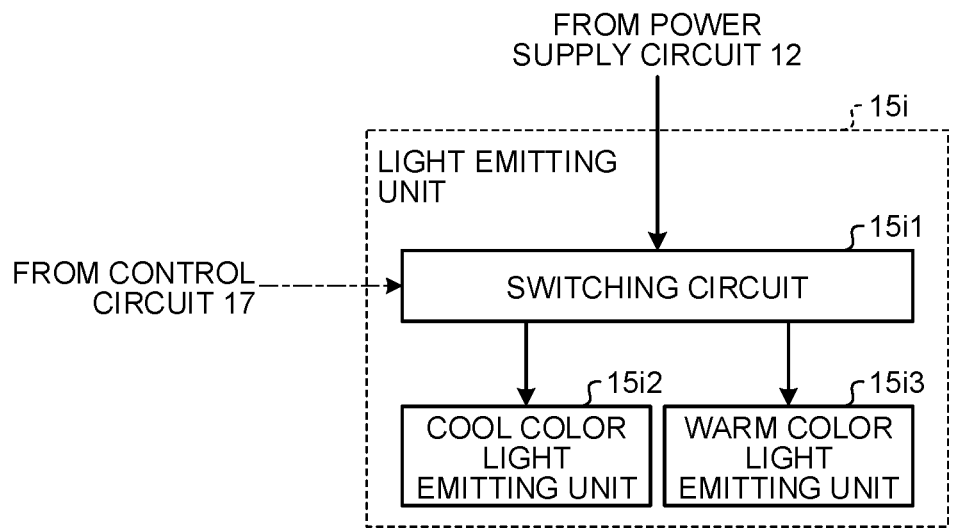
FIG. 11 is a block diagram illustrating a configuration of a light emitting unit in the first modification of the first embodiment.

For example, as illustrated in FIG. 11, the light emitting unit 15i may be configured to switch between light emission in a cool color and light emission in a warm color. FIG. 11 is a block diagram illustrating a configuration of the light emitting unit 15i in the first modification of the first embodiment. The light emitting unit 15i includes a switching circuit 15i1, a cool color light emitting unit 15i2, and a warm color light emitting unit 15i3. The cool color light emitting unit 15i2 has a cool light emission color and can emit light with a color temperature CT1. The warm color light emitting unit 15i3 has a warm light emission color and can emit light with a color temperature CT2. The color temperature CT2 is lower than the color temperature CT1. For example, the color temperature CT1 is approximately 4000 K and the color temperature CT2 is approximately 6000 K. The switching circuit 15i1 may have a preset threshold temperature Tth for switching for the period lowest temperature.

In response to the control by the control circuit 17, when the period lowest temperature is a temperature Tmin1 lower than the threshold temperature Tth, the switching circuit 15i1 selectively supplies the electric power from the power supply circuit 12 to the cool color light emitting unit 15i2 and selectively causes the cool color light emitting unit 15i2 to emit light. With this control, the light emitting unit 15i switches the color temperature of light emission to CT1 and emits light. When the period lowest temperature is a temperature Tmin2 higher than the threshold temperature Tth, the switching circuit 15i1 selectively supplies the electric power from the power supply circuit 12 to the warm color light emitting unit 15i3 and selectively causes the warm color light emitting unit 15i3 to emit light. With this control, the light emitting unit 15i switches the color temperature of light emission to CT2 and emits light.

Figure 12:
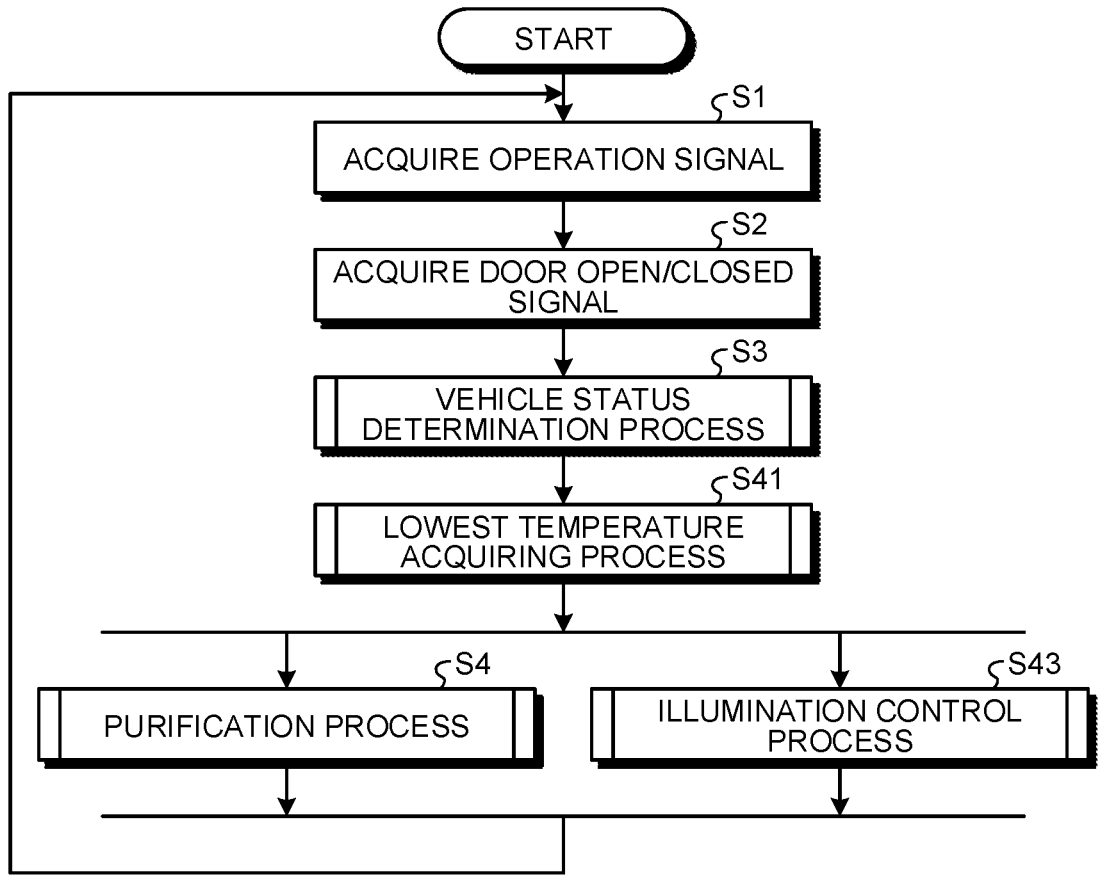
FIG. 12 is a flowchart illustrating the operation of the vehicle interior device according to the first modification of the first embodiment.

As illustrated in FIG. 12, the vehicle interior device 100i performs the operation different from that in the first embodiment in the following respects. FIG. 12 is a flowchart illustrating the operation of the vehicle interior device 100i according to the first modification of the first embodiment.

After performing the operation at S1 to S3, the vehicle interior device 100i performs a lowest temperature acquiring process (S41), sets time $t_w$, and sets the emission color in accordance with the period lowest temperature Tmin. The detail of the lowest temperature acquiring process (S41) will be described later. After the lowest temperature acquiring process (S41) is completed, the vehicle interior device 100i performs the purification process (S4) and an illumination control process (S43) in parallel in accordance with the settings corresponding to the period lowest temperature Tmin. The purification process (S4) uses time $t_w$ set at S41. The detail of the purification process (S4) will be described later. The illumination control process (S43) uses the setting of emission color set at S41. The detail of the illumination control process (S43) will be described later. When both the purification process (S4) and the illumination control process (S43) are completed, the vehicle interior device 100i returns to S1.

Figure 13:
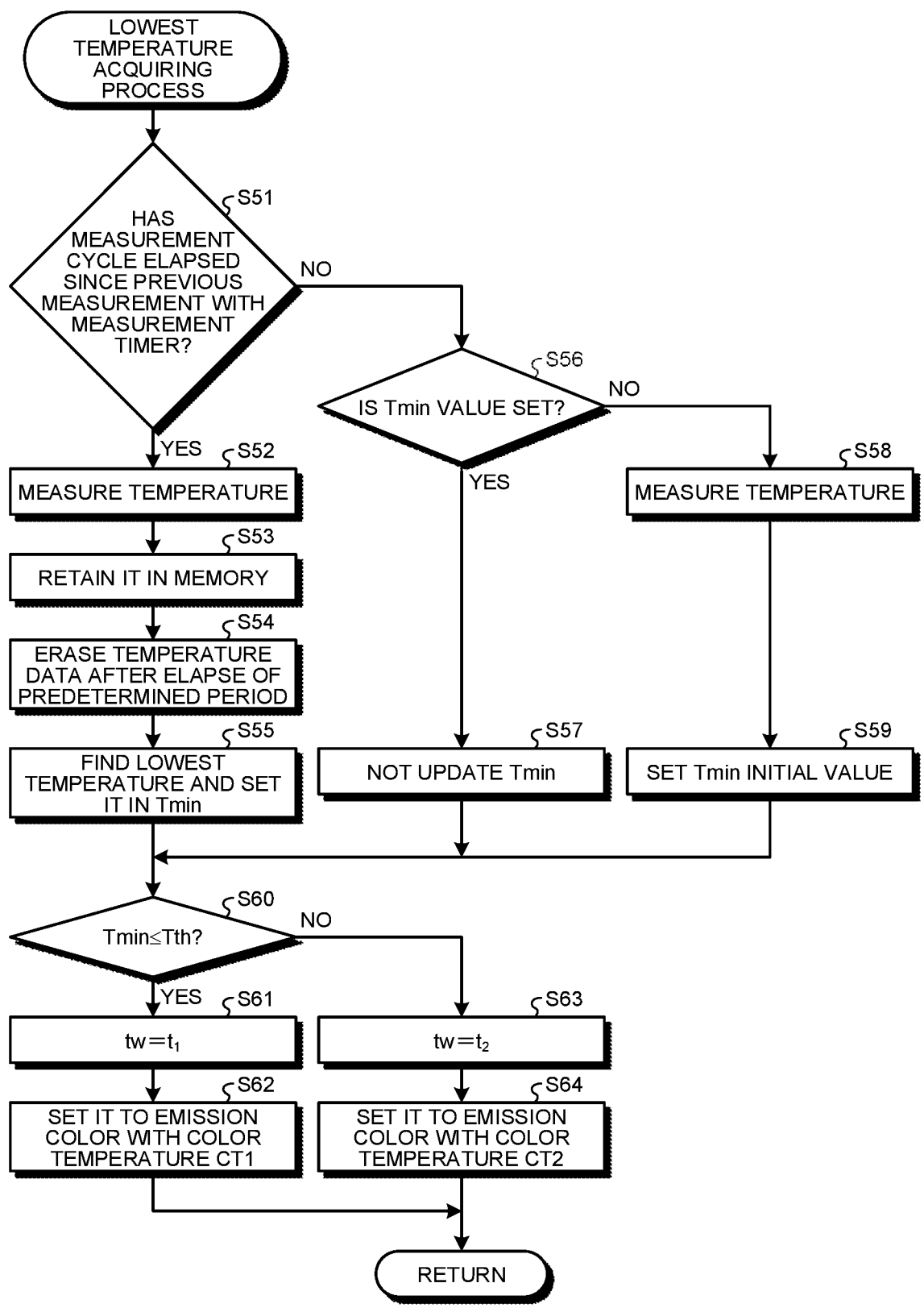
FIG. 13 is a flowchart illustrating a lowest temperature acquiring process in the first modification of the first embodiment.

FIG. 13 is a flowchart illustrating the lowest temperature acquiring process (S41) in the first modification of the first embodiment.

In the vehicle interior device 100i, the control circuit 17 starts a measurement timer if the measurement timer has not been started. The measurement timer is a timer for managing the timing when the measurement cycle in which the temperature should be measured has elapsed. The control circuit 17 determines whether the measurement cycle has elapsed since the previous measurement with the measurement timer (S51).

If the measurement cycle has elapsed (Yes at S51), the control circuit 17 causes the temperature sensor 21i to measure the temperature (S52), acquires temperature data as the measurement result from the temperature sensor 21i, and retains the temperature data into the memory 17a in association with the count time of the measurement timer (S53). The control circuit 17 erases the temperature data after the elapse of a predetermined period from the memory 17a, among the temperature data retained in the memory 17a (S54). The predetermined period may be two or more days and, for example, may be one week. The control circuit 17 sets the lowest one of the temperature data for a plurality of measurement cycles accumulated for the predetermined period retained in the memory 17a, as the period lowest temperature Tmin, stores period lowest temperature information indicating the period lowest temperature Tmin into the memory 17a (S55), and proceeds to S60.

If the measurement cycle has not elapsed (No at S51), the control circuit 17 determines whether a value is set for the period lowest temperature Tmin, for example, by checking whether the period lowest temperature information is stored in the memory 17a (S56).

If a value is set for the period lowest temperature Tmin (Yes at S56), the control circuit 17 does not update the period lowest temperature Tmin as it is (S57) and proceeds to S60.

If no value is set for the period lowest temperature Tmin (No at S56), the control circuit 17 causes the temperature sensor 21i to measure the temperature (S58), sets the temperature data as the measurement result as an initial value for the period lowest temperature Tmin, stores period lowest temperature information indicating the initial value Tmin into the memory 17a (S59), and proceeds to S60.

The control circuit 17 compares the period lowest temperature Tmin with a temperature threshold Tth and determines whether the period lowest temperature Tmin is equal to or lower than the temperature threshold Tth (S60).

Figure 14:
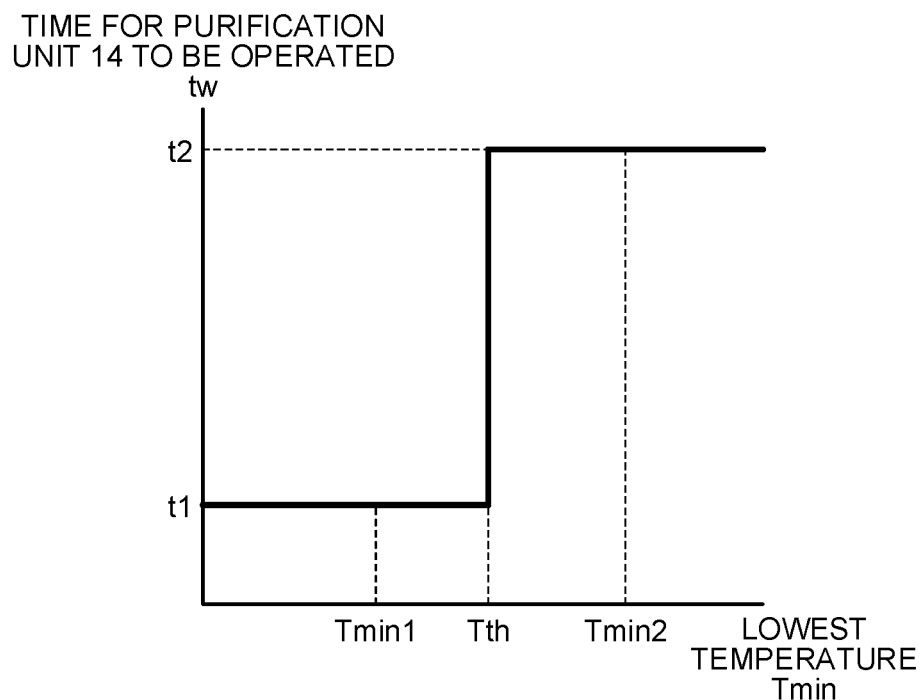
FIG. 14 is a diagram illustrating the relation between the lowest temperature and the time for a purification unit to operate in the first modification of the first embodiment.
Figure 15:
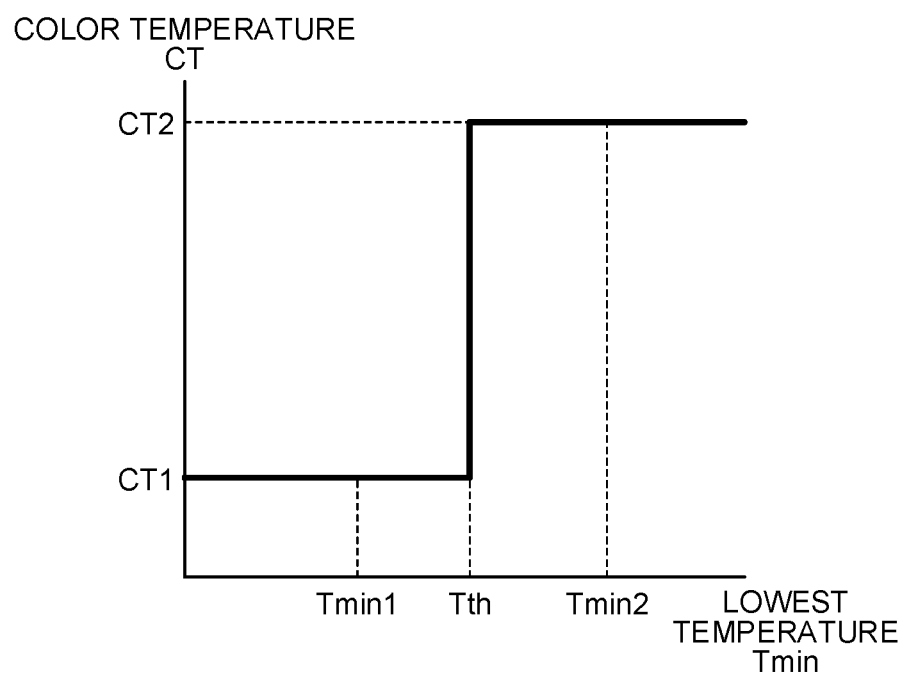
FIG. 15 is a diagram illustrating the relation between the lowest temperature and the color temperature of light emission by the light emitting unit in the first modification of the first embodiment.

If the period lowest temperature Tmin is equal to or lower than the temperature threshold Tth (Yes at S60), the control circuit 17 sets time $t_w$ for the purification unit 14 to be operated to $t_1$ (S61) as illustrated in FIG. 14, and sets the emission color of the light emitting unit 15i for illumination to the emission color with the color temperature CT1 (S62) as illustrated in FIG. 15. Time $t_1$ is, for example, 0 minutes. The color temperature CT1 is, for example, a warm color temperature at approximately 4000 K. FIG. 14 is a diagram illustrating the relation between the lowest temperature and the time for the purification unit 14 to operate in the first modification of the first embodiment. FIG. 15 is a diagram illustrating the relation between the lowest temperature and the color temperature of light emission by the light emitting unit 15i in the first modification of the first embodiment.

If the period lowest temperature Tmin is higher than the temperature threshold Tth (No at S60), the control circuit 17 sets time $t_w$ for the purification unit 14 to be operated to $t_2$ (>$t_1$) (S63) as illustrated in FIG. 14, and sets the emission color of the light emitting unit 15i for illumination to the emission color with the color temperature CT2 (>CT1) (S64) as illustrated in FIG. 15. Time $t_2$ is, for example, 30 minutes. The color temperature CT2 is, for example, a cool color temperature at approximately 6000 K.

As illustrated in FIG. 14, if the period lowest temperature Tmin is lower than the temperature threshold Tth (e.g., if Tmin=Tmin1), time $t_w$ for the purification unit 14 to operate is set to a relatively short time $t_1$, considering that the present time is a relatively cold season and the battery charge performance of the battery 4 is likely to decrease. If the period lowest temperature Tmin is higher than the temperature threshold Tth (e.g., if Tmin=Tmin2), time $t_w$ for the purification unit 14 to operate is set to a relatively long time $t_2$, considering that the present time is a relatively hot season and the battery charge performance of the battery 4 is unlikely to decrease. With this control, time $t_w$ for the purification unit 14 to operate can be set in a switchable manner, in consideration of seasonal variations in the battery charge performance of the battery 4.

As illustrated in FIG. 15, if the period lowest temperature Tmin is lower than the temperature threshold Tth (e.g., if Tmin=Tmin1), the color temperature of the light emitting unit 15i for illumination is set to the warm color temperature CT1 in order to produce the warmth by the emission color to ease the cold as the present time is a relatively cold season. If the period lowest temperature Tmin is higher than the temperature threshold Tth (e.g., if Tmin=Tmin2), the color temperature of the light emitting unit 15i for illumination is set to the cool color temperature CT2 in order to produce the cool by the emission color to ease the hotness as the present time is a relatively hot season. With this control, the emission color of the light emitting unit 15i for illumination can be set to produce a sense of the season.

The purification process (S4) is basically the same as in the first embodiment but differs from the first embodiment in that time $t_w$ set at S61 or S62 is used at S35 (see FIG. 7). This allows the purification unit 14 to operate for time $t_w$ in consideration of seasonal variations in the battery charge performance of the battery 4.

Figure 16:
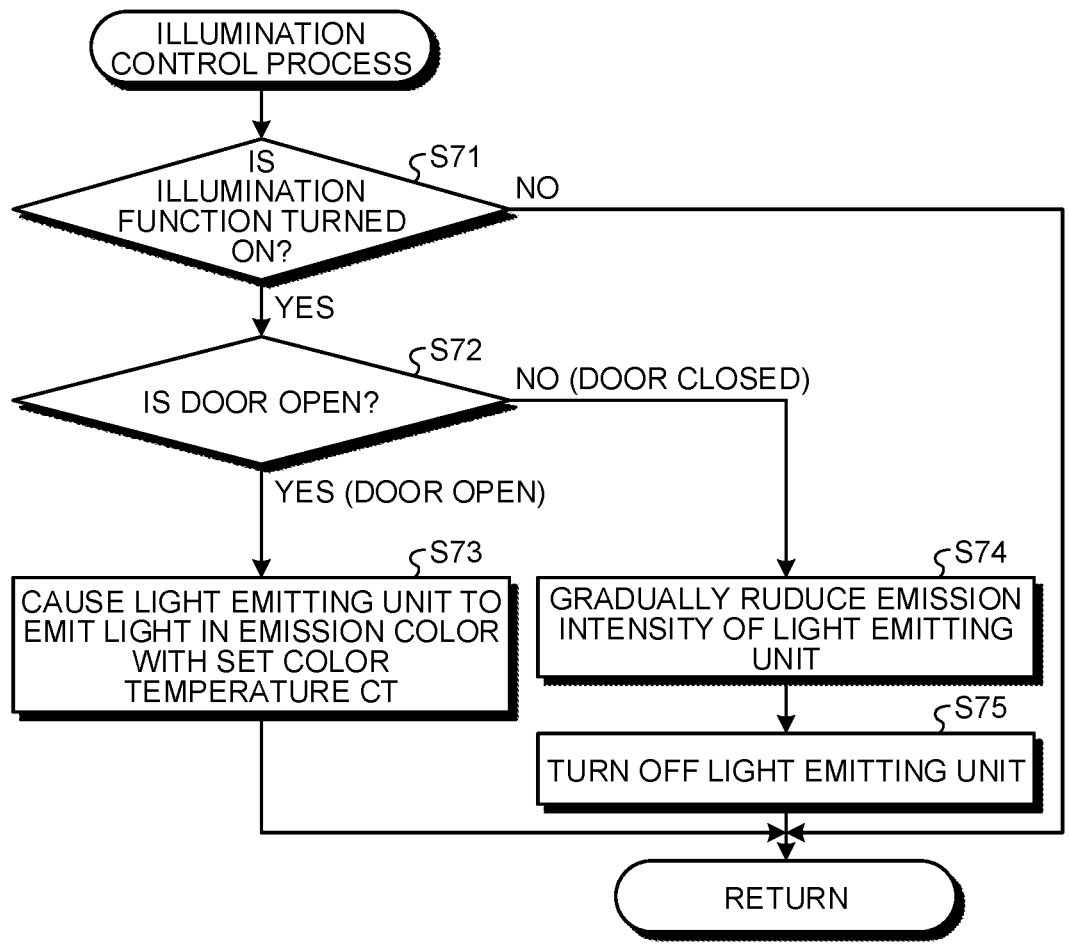
FIG. 16 is a flowchart illustrating an illumination control process in the first modification of the first embodiment.

FIG. 16 is a flowchart illustrating the illumination control process (S43) in the first modification of the first embodiment. The illumination control process (S43) relates to the control of the light emitting unit 15i for illumination.

In the vehicle interior device 100i, the control circuit 17 determines whether the illumination function is turned on in accordance with the operation signal acquired at S1 (see FIG. 12) (S71).

If the illumination function is not turned on and is kept off (No at S71), the control circuit 17 terminates the process.

If the illumination function is turned on (Yes at S71), the control circuit 17 determines whether the door 8 is open in accordance with the door open/closed signal $D_{OOR}$ acquired at S2 (see FIG. 12) (S72).

If the door 8 is open (Yes at S72), the control circuit 17 causes the light emitting unit 15i to emit light in an emission color with the color temperature CT set at S62 or S64 (S73). With this process, the light emitting unit 15i for illumination can emit light in an emission color with a color temperature corresponding to the season and produce a sense of the season by the emission color of the light emitting unit 15i.

If the door 8 is closed (No at S72), the control circuit 17 gradually reduces the emission intensity of the light emitting unit 15i (S74), and when time $t_{r1}$ (see FIG. 8) elapses since the door 8 is closed, the light emitting unit 15i turns off to turn off the light (S75).

In this way, in the first modification of the first embodiment, the vehicle interior device 100i can measure the temperature of the cabin 6, set the lowest one of the measured temperatures in a predetermined period as the period lowest temperature, and grasp the season in accordance with the period lowest temperature. Further, the grasped season can be used to perform control corresponding to the season, for example, by controlling the time for the purification unit 14 to operate or controlling the emission color of the light emitting unit 15i.

Figure 17:
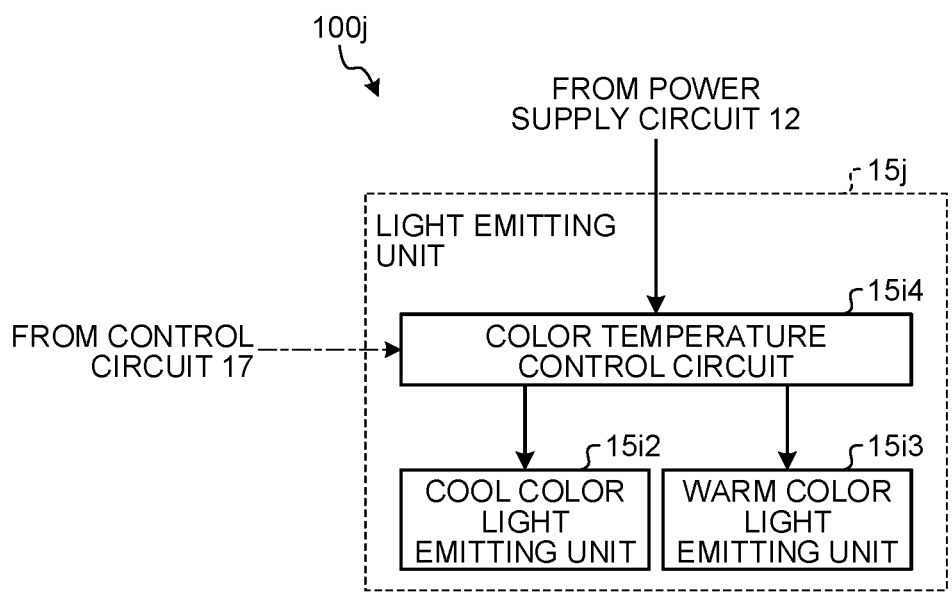
FIG. 17 is a block diagram illustrating a configuration of the light emitting unit in a second modification of the first embodiment.

As a second modification of the first embodiment, as illustrated in FIG. 17, a light emitting unit 15j in a vehicle interior device 100j may be configured to gradually change the emission color. FIG. 17 is a block diagram illustrating a configuration of the light emitting unit 15j in the second modification of the first embodiment.

The light emitting unit 15*j* includes a color temperature control circuit 15*i*4 instead of the switching circuit 15*i*1 (see FIG. 11). In response to the control by the control circuit 17, when the period lowest temperature is a temperature between the threshold temperature Tth1 and the threshold temperature Tth2 (>Tth1), the color temperature control circuit 15*i*4 may distribute the electric power from the power supply circuit 12 to the cool color light emitting unit 15*i*2 and the warm color light emitting unit 15*i*3 and cause the cool color light emitting unit 15*i*2 and the warm color light emitting unit 15*i*3 to emit light.

For example, the control circuit 17 may generate a color temperature control signal so that the color temperature of the light emitting unit 15*j* gradually increases as the period lowest temperature increases between the threshold temperature Tth1 and the threshold temperature Tth2. The control circuit 17 may generate a color temperature control signal so that the color temperature of the light emitting unit 15*j* increases stepwise as the period lowest temperature increases, or the control circuit 17 may generate a color temperature control signal so that the color temperature of the light emitting unit 15*j* increases continuously as the period lowest temperature increases. The control circuit 17 supplies the color temperature control signal to the color temperature control circuit 15*i*4.

The control circuit 17 may determine a color temperature CT3 when the period lowest temperature is Tmin3 according to the following equation 1 and supply a control signal indicating the color temperature CT3 to the color temperature control circuit 15*i*4.

$$CT3 = CT1 + \{(CT2-CT1)/(Tth2-Tth1)\} \times (Tmin3-Tth1) \qquad \text{equation 1}$$

When the electric power to be supplied to the cool color light emitting unit 15*i*2 is $P_{15i2}$ and the electric power to be supplied to the warm color light emitting unit 15*i*3 is $P_{15i3}$, the color temperature control circuit 15*i*4 may distribute the electric power from the power supply circuit 12 to the cool color light emitting unit 15*i*2 and the warm color light emitting unit 15*i*3 in the ratio indicated by the following equation 2.

$$P_{15i2}:P_{15i3} = (CT3-CT1):(CT2-CT3) \qquad \text{equation 2}$$

With this control, the color temperature of light emission by the light emitting unit 15*j* can be gradually changed between CT1 and CT2, in accordance with the value of the period lowest temperature Tmin.

Figure 18:
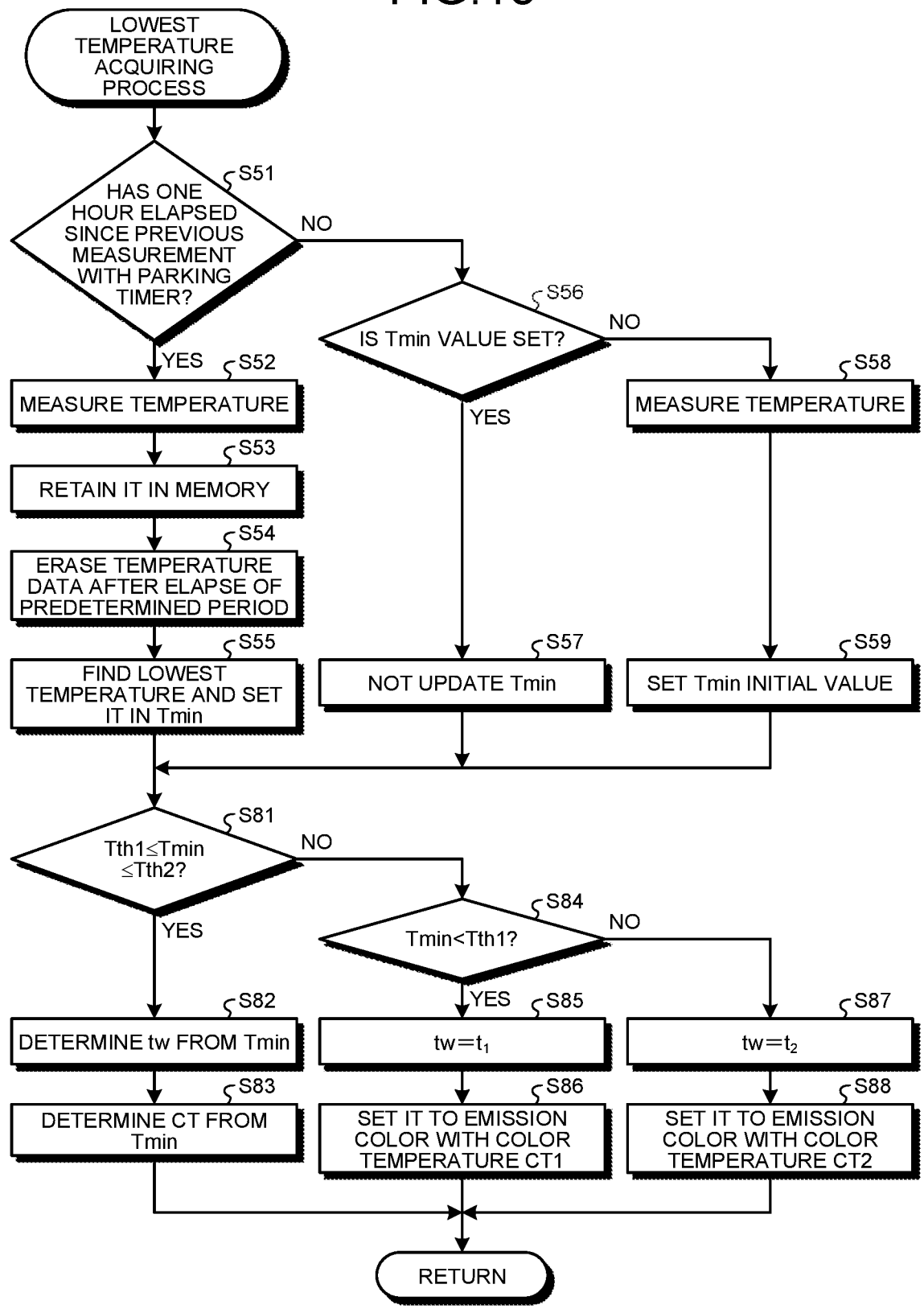
FIG. 18 is a flowchart illustrating a lowest temperature acquiring process in the second modification of the first embodiment.

Further, as illustrated in FIG. 18, the lowest temperature acquiring process (S41) differs from that in the first modification of the first embodiment in the following respects. FIG. 18 is a flowchart illustrating the lowest temperature acquiring process (S41) in the second modification of the first embodiment.

In the lowest temperature acquiring process, after S51 to S59 are performed, the control circuit 17 compares the period lowest temperature Tmin with each of the temperature thresholds Tth1 and Tth2 and determines whether the period lowest temperature Tmin falls within the range from the temperature threshold Tth1 to the temperature threshold Tth2 (S81).

Figure 19:
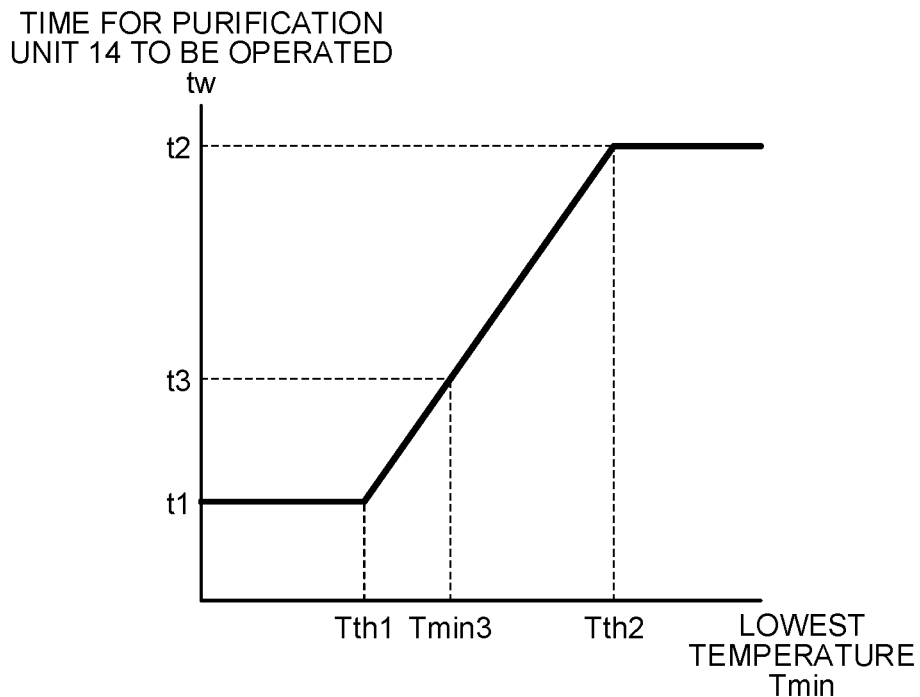
FIG. 19 is a diagram illustrating the relation between the lowest temperature and the time for the purification unit to operate in the second modification of the first embodiment.

If the period lowest temperature Tmin falls within the range from the temperature threshold Tth1 to the temperature threshold Tth2 (Yes at S81), the control circuit 17 sets time $t_w$ for the purification unit 14 to be operated to the time calculated from the period lowest temperature Tmin (S82), as illustrated in FIG. 19. FIG. 19 is a diagram illustrating the relation between the lowest temperature and the time for the purification unit 14 to be operated in the second modification of the first embodiment.

For example, the control circuit 17 may set time tw so that time $t_w$ for the purification unit 14 to be operated gradually increases as the period lowest temperature increases between the threshold temperature Tth1 and the threshold temperature Tth2. The control circuit 17 may set time $t_w$ so that time $t_w$ increases stepwise as the period lowest temperature increases, or the control circuit 17 may set time $t_w$ so that time $t_w$ increases continuously as the period lowest temperature increases.

The control circuit 17 may determine a value $t_3$ of time $t_w$ when the period lowest temperature is Tmin3, according to the following equation 3. With this control, time $t_w$ for the purification unit 14 to be operated can be set so as to continuously change between $t_1$ and $t_2$, in accordance with the value of the period lowest temperature Tmin.

$$t_3 = t_1 + \{(t_2-t_1)/(Tth2-Tth1)\} \times (Tmin3-Tth1) \qquad \text{equation 3}$$

Figure 20:
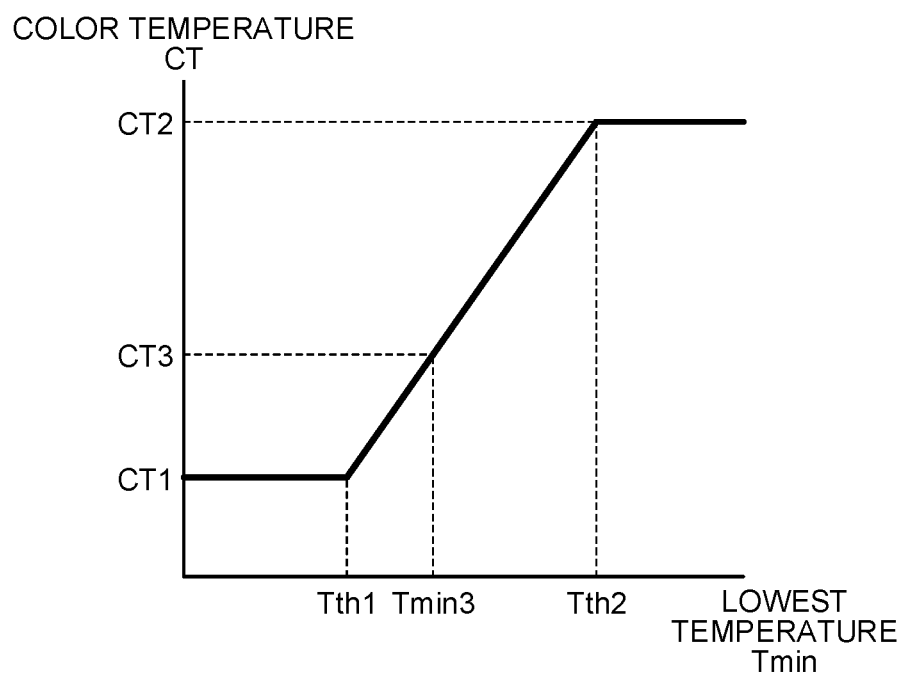
FIG. 20 is a diagram illustrating the relation between the lowest temperature and the color temperature of light emission by the light emitting unit in the second modification of the first embodiment.

As illustrated in FIG. 20, the control circuit 17 sets the emission color of the light emitting unit 15*j* for illumination to the emission color with the color temperature CT calculated from the period lowest temperature Tmin (S83). FIG. 20 is a diagram illustrating the relation between the lowest temperature and the color temperature of light emission by the light emitting unit 15*j* in the second modification of the first embodiment.

For example, the control circuit 17 may set the emission color of the light emitting unit 15*j* so that the color temperature of light emission by the light emitting unit 15*j* gradually increases as the period lowest temperature increases between the threshold temperature Tth1 and the threshold temperature Tth2. The control circuit 17 may set the emission color of the light emitting unit 15*j* so that the color temperature of light emission by the light emitting unit 15*j* increases stepwise as the period lowest temperature increases, or the control circuit 17 may set the emission color of the light emitting unit 15*j* so that the color temperature of light emission by the light emitting unit 15*j* increases continuously as the period lowest temperature increases.

The control circuit 17 may determine the color temperature CT3 when the period lowest temperature is Tmin3 according to equation 1. With this control, the emission color of the light emitting unit 15*j* can be set such that the color temperature of light emission by the light emitting unit 15*j* changes continuously between CT1 and CT2, in accordance with the value of the period lowest temperature Tmin.

If the period lowest temperature Tmin does not fall within the range from the temperature threshold Tth1 to the temperature threshold Tth2 (No at S81), the control circuit 17 determines whether the period lowest temperature Tmin is smaller than the temperature threshold Tth1 (S84).

If the period lowest temperature Tmin is lower than the temperature threshold Tth1 (Yes at S84), the control circuit 17 sets time $t_w$ for the purification unit 14 to be operated to t1 (S85) as illustrated in FIG. 19, and sets the emission color of the light emitting unit 15*j* for illumination to the emission color with the color temperature CT1 (S86) as illustrated in FIG. 20.

If the period lowest temperature Tmin is higher than the temperature threshold Tth2 (No at S84), the control circuit 17 sets time $t_w$ for the purification unit 14 to be operated to t2 (>t1) (S87) as illustrated in FIG. 19, and sets the emission color of the light emitting unit 15*j* for illumination to the emission color with the color temperature CT2 (>CT1) (S88) as illustrated in FIG. 20.

In this way, in the second modification of the first embodiment, in the vehicle interior device 100*j*, the season can be grasped in accordance with the period lowest temperature, and the grasped season can be used to gradually perform control corresponding to the season, for example, by gradually controlling the time for the purification unit 14 to operate or gradually controlling the emission color of the light emitting unit 15*j*.

As a third modification of the first embodiment, the correspondence between the magnitude of the period lowest temperature and the color temperature to be changed may be the opposite of the first modification of the first embodiment.

In this case, the light emitting unit 15*i* illustrated in FIG. 11 may operate as follows. In response to the control by the control circuit 17, when the period lowest temperature is a temperature Tmin1 lower than the threshold temperature Tth, the switching circuit 15*i*1 selectively supplies the electric power from the power supply circuit 12 to the warm color light emitting unit 15*i*3 and selectively causes the warm color light emitting unit 15*i*3 to emit light. With this control, the light emitting unit 15*i* switches the color temperature of light emission to CT2 and emits light. When the period lowest temperature is a temperature Tmin2 higher than the threshold temperature Tth, the switching circuit 15*i*1 selectively supplies the electric power from the power supply circuit 12 to the cool color light emitting unit 15*i*2 and selectively causes the cool color light emitting unit 15*i*2 to emit light. With this control, the light emitting unit 15*i* switches the color temperature of light emission to CT1 and emits light.

Figure 21:
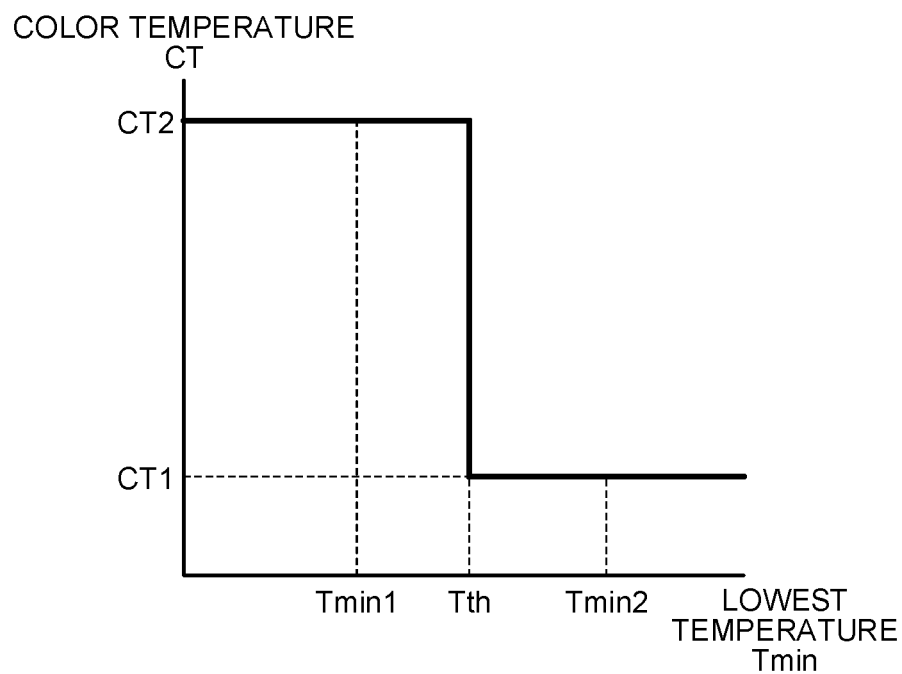
FIG. 21 is a diagram illustrating the relation between the lowest temperature and the color temperature of light emission by the light emitting unit in a third modification of the first embodiment.

As illustrated in FIG. 21, if the period lowest temperature Tmin is lower than the temperature threshold Tth (e.g., if Tmin=Tmin1), the color temperature of the light emitting unit 15*i* for illumination is set to the cool color temperature CT2 in order to produce the cold by the emission color as the present time is a relatively cold season. If the period lowest temperature Tmin is higher than the temperature threshold Tth (e.g., if Tmin=Tmin2), the color temperature of the light emitting unit 15*i* for illumination is set to the warm color temperature CT1 in order to produce the hotness by the emission color as the present time is a relatively hot season. With this control, the emission color of the light emitting unit 15*i* for illumination can be set to produce a sense of the season. FIG. 21 is a diagram illustrating the relation between the lowest temperature and the color temperature of light emission in the third modification of the first embodiment.

In the illumination control process illustrated in FIG. 16, at S73, the light emitting unit 15*i* emits light in the emission color with the color temperature CT set as illustrated in FIG. 21. With this process, the light emitting unit 15*i* for illumination can emit light in an emission color with a color temperature corresponding to the season and produce a sense of the season by the emission color of the light emitting unit 15*i*.

In this way, in the third modification of the first embodiment, in the vehicle interior device 100*i*, the control corresponding to the season can be performed even by controlling the color temperature of light emission by the light emitting unit 15*i* as illustrated in FIG. 21.

As a fourth modification of the first embodiment, the correspondence between the magnitude of the period lowest temperature and the color temperature to be changed may be the opposite of the second modification of the first embodiment.

In this case, the light emitting unit 15*j* illustrated in FIG. 17 may operate as follows. In response to the control by the control circuit 17, when the period lowest temperature is a temperature between the threshold temperature Tth1 and the threshold temperature Tth2 (>Tth1), the color temperature control circuit 15*i*4 may distribute the electric power from the power supply circuit 12 to the cool color light emitting unit 15*i*2 and the warm color light emitting unit 15*i*3 and cause the cool color light emitting unit 15*i*2 and the warm color light emitting unit 15*i*3 to emit light.

For example, the control circuit 17 may generate a color temperature control signal so that the color temperature of light emission by the light emitting unit 15*j* gradually decreases as the period lowest temperature increases between the threshold temperature Tth1 and the threshold temperature Tth2. The control circuit 17 may generate a color temperature control signal so that the color temperature of light emission by the light emitting unit 15*j* decreases stepwise as the period lowest temperature increases, or the control circuit 17 may generate a color temperature control signal so that the color temperature of light emission by the light emitting unit 15*j* decreases continuously as the period lowest temperature increases.

The control circuit 17 may determine a color temperature CT4 when the period lowest temperature is Tmin4 according to the following equation 4 and supply a control signal indicating the color temperature CT4 to the color temperature control circuit 15*i*4.

$$CT4=CT2+\{(CT1-CT2)/(Tth2-Tth1)\}\times(Tmin4-Tth1) \quad \text{equation 4}$$

When the electric power to be supplied to the cool color light emitting unit 15*i*2 is $P_{15i2}$ and the electric power to be supplied to the warm color light emitting unit 15*i*3 is $P_{15i3}$, the color temperature control circuit 15*i*4 may distribute the electric power from the power supply circuit 12 to the cool color light emitting unit 15*i*2 and the warm color light emitting unit 15*i*3 in the ratio indicated by the following equation 5.

$$P_{15i2}:P_{15i3}=(CT4-CT1):(CT2-CT4) \quad \text{equation 5}$$

With this control, the color temperature of light emission by the light emitting unit 15*j* can be gradually changed between CT1 and CT2, in accordance with the value of the period lowest temperature Tmin.

Figure 22:
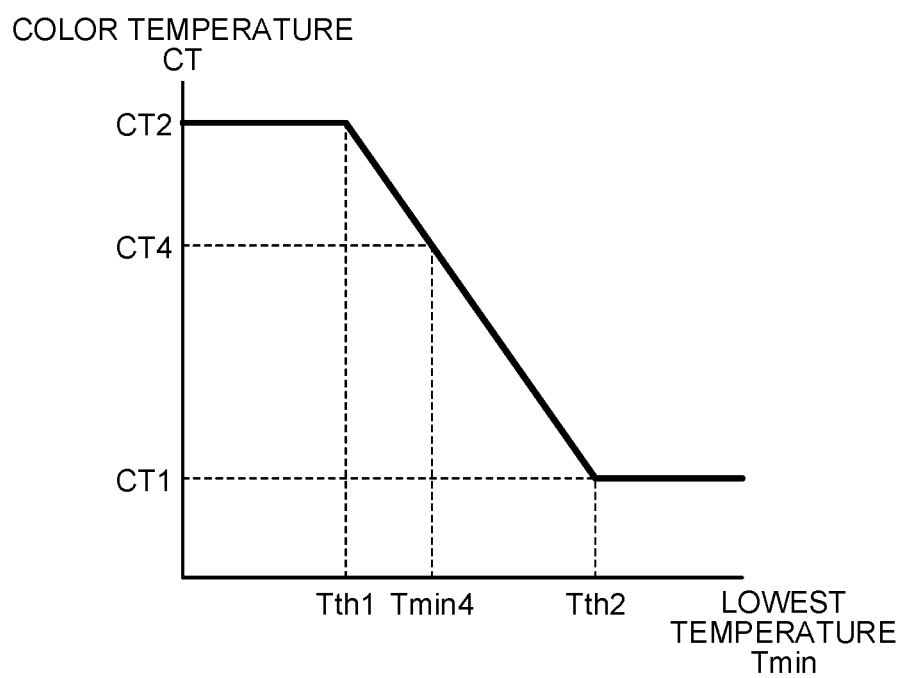
FIG. 22 is a diagram illustrating the relation between the lowest temperature and the color temperature of light emission by the light emitting unit in a fourth modification of the first embodiment.

In the lowest temperature acquiring process illustrated in FIG. 18, as illustrated in FIG. 22, at S83, the emission color of the light emitting unit 15*j* for illumination is set to the emission color with the color temperature CT calculated from the period lowest temperature Tmin. FIG. 22 is a diagram illustrating the relation between the lowest temperature and the color temperature of light emission by the light emitting unit 15*j* in the fourth modification of the first embodiment.

For example, the control circuit 17 may set the emission color of the light emitting unit 15*j* so that the color temperature of light emission by the light emitting unit 15*j* gradually decreases as the period lowest temperature increases between the threshold temperature Tth1 and the threshold temperature Tth2. The control circuit 17 may set the emission color of the light emitting unit 15*j* so that the color temperature of light emission by the light emitting unit 15*j* decreases stepwise as the period lowest temperature increases, or the control circuit 17 may set the emission color of the light emitting unit 15*j* so that the color temperature of light emission by the light emitting unit 15*j* decreases continuously as the period lowest temperature increases.

The control circuit 17 may determine the color temperature CT4 when the period lowest temperature is Tmin4 according to equation 4. With this control, the emission color can be set such that the color temperature of light emission by the light emitting unit 15j continuously changes between CT1 and CT2, in accordance with the value of the period lowest temperature Tmin.

In this way, in the fourth modification of the first embodiment, in the vehicle interior device 100j, the control corresponding to the season can be gradually performed even by gradually controlling the color temperature of light emission by the light emitting unit 15j as illustrated in FIG. 22.

As a fifth modification of the first embodiment, as illustrated in FIG. 23, a vehicle interior device 100k may be installed on the ceiling 6a of the cabin 6. FIG. 23A to FIG. 23C are diagrams illustrating an installation sequence of the vehicle interior device according to the fifth modification of the first embodiment.

For example, as illustrated in FIG. 23A, an existing device 200 is already installed on the ceiling 6a of the cabin 6. The existing device 200 is, for example, a room lamp. A base BS200 is fixed to a surface on the +Z side of a housing 213 of the existing device 200. The base BS200 has locking parts 220 and 230. The locking parts 220 and 230 have a structure that can be locked to the ceiling 6a. The locking parts 220 and 230 have a structure that can protrude in the XY direction on the side surfaces.

The base BS200 has not-illustrated three terminals protruding between the locking parts 220 and 230 in the X direction. The socket SC is attached to the existing device 200 such that three terminals TM11 to TM13 of the socket SC mate with the three terminals. The roof 3a has a space between an outer wall and an inner wall that forms the ceiling 6a. The cable CB extends in the space in the roof 3a of the body 3 from the +Z side of the socket SC.

The ceiling 6a has a recess 6a2 corresponding to the base BS200. A plurality of holes 6a21 to 6a23 are formed in a bottom surface (surface on the +Z side) of the recess 6a2. Among the holes 6a21 to 6a23, the hole 6a21 corresponds to the socket SC and the cable CB, and the socket SC and the cable CB are inserted into the hole 6a21. The hole 6a22 corresponds to the locking part 220 and has the locking part 220 locked therein. The hole 6a23 corresponds to the locking part 230 and has the locking part 230 locked therein.

Next, as illustrated in FIG. 23B, the existing device 200 is removed. In other words, the socket SC is pulled out of the base BS200, the locking of the locking parts 220 and 230 in the holes 6a22 and 6a23 is released, and the existing device 200 is removed from the recess 6a2.

The vehicle interior device 100k is then prepared. The vehicle interior device 100k has locking parts 22 and 23. The locking parts 22 and 23 are disposed on the base BS. The locking parts 22 and 23 have a structure that can be locked to the ceiling 6a. The locking parts 22 and 23 have a structure that can protrude in the XY direction on the side surfaces.

Next, as illustrated in FIG. 23C, the vehicle interior device 100k is installed in the recess 6a2 in the ceiling 6a. In doing so, the positions where the locking parts 22 and 23 are disposed in the base BS correspond to the positions where the locking parts 220 and 230 are disposed in the base BS200. The hole 6a22 corresponds to the locking part 22 and has the locking part 22 locked therein. The hole 6a23 corresponds to the locking part 23 and has the locking part 23 locked therein. With this configuration, the locking parts 22 and 23 lock the housing 13 to the ceiling 6a with the base BS interposed.

The base BS has three terminals TM1, TM2, and TM3 (see FIG. 3) protruding between the locking parts 22 and 23 in the X direction. The socket SC is attached to the vehicle interior device 100k such that the three terminals TM11 to TM13 of the socket SC mate with the three terminals TM1, TM2, and TM3.

The locking parts 22 and 23 may have any structure that can lock the housing 13 to the ceiling 6a with the base BS interposed. For example, as illustrated in FIG. 24A, the locking parts 22 and 23 may be members removable from the base BS.

The locking part 22 has a threaded portion 221, a top portion 222, and a folding portion 223. The folding portion 223 has a threaded hole in the center, and the threaded portion 221 is inserted into the threaded hole. The top portion 222 is fixed to an end on the −Z side of the threaded portion 221. The folding portion 223 has a configuration that opens in the XY direction when the threaded portion 221 is rotated such that the top portion 222 comes closer, and closes and folds in the XY direction when the threaded portion 221 is rotated such that the top portion 222 goes away. The XY dimensions of the threaded portion 221 are slightly smaller than the XY dimensions of the hole 6a22 in the ceiling 6a. The XY dimensions of the top portion 222 are slightly larger than the XY dimensions of the hole 6a22 in the ceiling 6a.

The locking part 23 has a threaded portion 231, a top portion 232, and a folding portion 233. The folding portion 233 has a threaded hole in the center, and the threaded portion 231 is inserted into the threaded hole. The top portion 232 is fixed to an end on the −Z side of the threaded portion 231. The folding portion 233 has a configuration that opens in the XY direction when the threaded portion 231 is rotated such that the top portion 232 comes closer, and closes and folds in the XY direction when the threaded portion 231 is rotated such that the top portion 232 goes away. The XY dimensions of the threaded portion 231 are slightly smaller than the XY dimensions of the hole 6a23 in the ceiling 6a. The XY dimensions of the top portion 232 are slightly larger than the XY dimensions of the hole 6a23 in the ceiling 6a.

The base BS has a box-shaped configuration with the −Z side open and has holes corresponding to the holes in the ceiling 6a on a wall on the +Z side. The locking parts 22 and 23 are inserted into the holes in the base BS and the holes in the ceiling 6a from the −Z side, with the folding portions 223 and 233 being folded (see the locking part 23 in FIG. 24A). The threaded portions 221 and 231 are then rotated such that the top portions 222 and 232 come closer to the folding portion 223. With this operation, the folding portions 223 and 233 of the locking parts 22 and 23 are opened in the XY direction, so that the housing 13 is locked to the ceiling 6a with the base BS interposed.

The base BS has three terminals TM1, TM2, and TM3 (see FIG. 3) protruding between the locking parts 22 and 23 in the X direction. The socket SC is attached to the vehicle interior device 100k such that the three terminals TM11 to TM13 of the socket SC mate with the three terminals TM1, TM2, and TM3.

Alternatively, the vehicle interior device 100k may have locking parts 24 and 25 as illustrated in FIG. 24B instead of the locking parts 22 and 23. The locking parts 24 and 25 may be members fixed to the base BS.

The locking part 24 has a columnar portion 241 and a pawl portion 242. The columnar portion 241 has a generally columnar shape with its axis in the Z direction. The pawl portion 242 protrudes from the side surface of the columnar portion 241 and has elasticity. The pawl portion 242 may be formed of an elastic material, or may be made of any material (e.g., resin, metal, etc.) and shaped into a leaf spring to impart elasticity.

The locking part 25 has a columnar portion 251 and a pawl portion 252. The columnar portion 251 has a substantially columnar shape with its axis in the Z direction. The pawl portion 252 protrudes from the side surface of the columnar portion 251 and has elasticity. The pawl portion 252 may be formed of an elastic material, or may be made of any material (e.g., resin, metal, etc.) and shaped into a leaf spring to impart elasticity. FIG. 24B illustrates a configuration in which the pawl portion 252 is a plate-like member having both ends fixed to the side surface of the columnar portion 251, and a portion between both ends in the pawl portion 252 protrudes in the shape of an arc outward in the XY direction from the side surface of the columnar portion 251.

The XY dimensions of the columnar portions 241 and 251 are slightly smaller than the XY dimensions of the holes 6a22 and 6a23 in the ceiling 6a. The locking parts 24 and 25 are inserted into the holes 6a22 and 6a23, respectively. The pawl portions 242 and 252 are pushed by the edges of the holes 6a22 and 6a23 to contract inward in the XY direction when passing through the holes 6a22 and 6a23, and expand outward in the XY direction after passing through the holes 6a22 and 6a23. With this configuration, the locking parts 24 and 25 lock the housing 13 to the ceiling 6a with the base BS interposed.

The base BS has three terminals TM1, TM2, and TM3 (see FIG. 3) protruding between the locking parts 24 and 25 in the X direction. The socket SC is attached to the vehicle interior device 100k such that the three terminals TM11 to TM13 of the socket SC mate with the three terminals TM1, TM2, and TM3.

In this way, in the fifth modification of the first embodiment, the vehicle interior device 100k has the locking parts 22 and 23 (or the locking parts 24 and 25). With this configuration, the housing 13 can be locked to the ceiling 6a with the base BS interposed, and the vehicle interior device 100k can be installed on the ceiling 6a.

Second Embodiment

A vehicle interior device according to a second embodiment will now be described. In the following, parts different from those in the first embodiment will be described.

In the first embodiment, an exemplary configuration in which the vehicle interior device blows out the air in the Z direction and sucks the air in the XY direction is described, whereas in the second embodiment, an exemplary configuration in which the vehicle interior device blows out the air in the X direction and sucks the air in the Z direction will be described.

For example, as indicated by dashed-dotted lines in FIG. 25, an airflow can be formed that is blown out from a vehicle interior device 100p generally in the +X direction, moves along the ceiling 6a in the +X direction, circulates inside the cabin 6, and returns to the vehicle interior device 100p in the +Z direction. An airflow can be formed that is blown out from the vehicle interior device 100p generally in the −X direction, moves along the ceiling 6a in the −X direction, circulates inside the cabin 6, and returns to the vehicle interior device 100p in the +Z direction. This configuration can effectively purify the air in the cabin 6.

Figure 26:
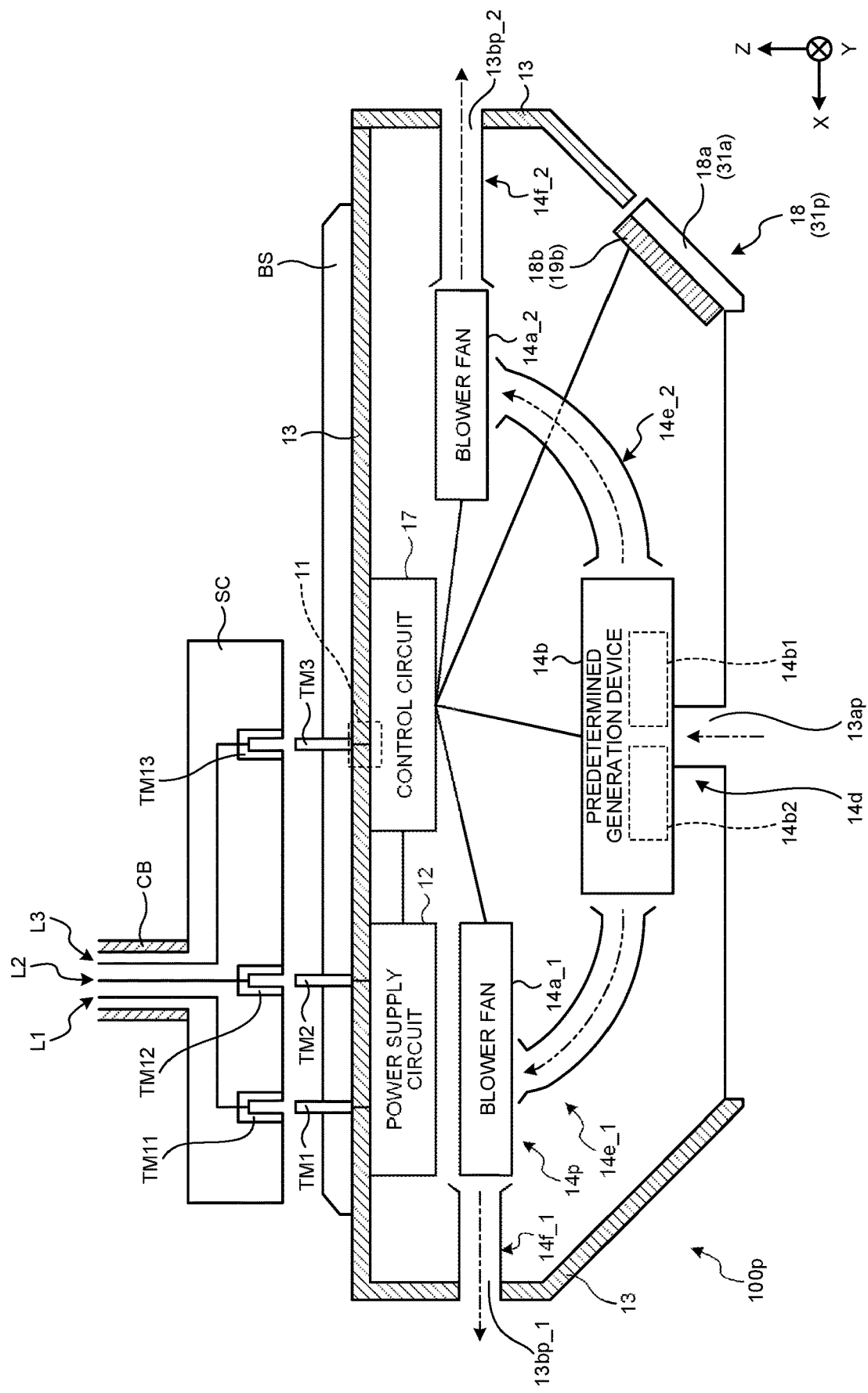
FIG. 26 is a diagram illustrating a configuration of the vehicle interior device according to the second embodiment.
Figure 27:
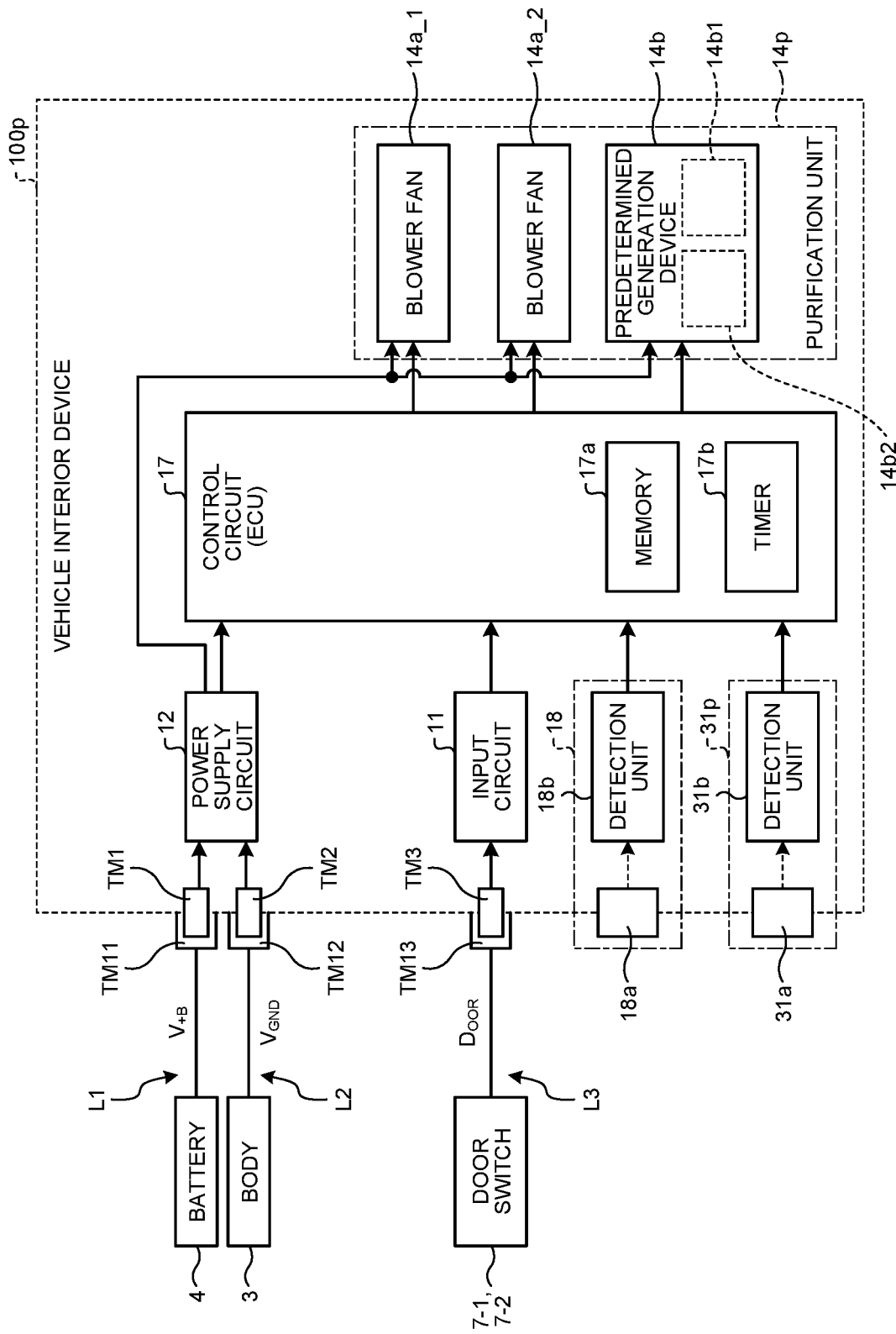
FIG. 27 is a block diagram illustrating a configuration of the vehicle interior device according to the second embodiment.

FIG. 26 is an XZ cross-sectional view illustrating a configuration of the vehicle interior device 100p. FIG. 27 is a block diagram illustrating a configuration of the vehicle interior device 100p. In FIG. 26, the hardware configuration of the vehicle interior device 100p is schematically illustrated, and the size and position of each component in the XZ cross section may differ from the actual one. This is applicable to cross sections in other directions (e.g., YZ cross section) in the same way as in the XZ cross section. In FIG. 27, the functional configuration of the vehicle interior device 100p is illustrated.

The vehicle interior device 100p includes a purification unit 14p instead of the purification unit 14 (see FIG. 3 and FIG. 4) and further includes an operation unit 31p, and the optical member 20, the light emitting unit 15, the light emitting unit 16, and the operation unit 19 are omitted. In the vehicle interior device 100p, the air cleaning function is mainly provided by the purification unit 14p.

The operation unit 31p is disposed at an operable position in the housing 13, and a part of its configuration is exposed. The operation unit 31p can accept an instruction on the fan. For example, the operation unit 31p has a button 31a, and the button 31a is disposed in proximity to the edge on the −Z side in the housing 13. The operation unit 31p may be disposed at a position (see FIG. 2) adjacent to the operation unit 18 in the circumferential direction at the edge on the −Z side of the housing 13.

The purification unit 14p is installed inside the housing 13. The purification unit 14p sucks the air in the cabin 6, purifies the sucked air, and blows out the purified air to the cabin 6. The purification unit 14p includes a plurality of blower fans 14a_1 and 14a_2, a predetermined generation device 14b, a ventilation channel 14d, ventilation channels 14e_1 and 14e_2, and ventilation channels 14f_1 and 14f_2. The blower fans 14a_1 and 14a_2 are installed inside the housing 13. The predetermined generation device 14b is installed inside the housing 13.

The predetermined generation device 14b is disposed between an inlet 13ap of the housing 13 and the blower fan 14a_1, and between the inlet 13ap of the housing 13 and the blower fan 14a_2. The predetermined generation device 14b may be disposed between the blower fan 14a_1 and the blower fan 14a_2. The blower fan 14a_1 is disposed between the predetermined generation device 14b and an outlet 13bp_1 of the housing 13. The blower fan 14a_2 is disposed between the predetermined generation device 14b and the outlet 13bp_2 of the housing 13.

The inlet 13ap is communicatively connected to an air inlet port of the predetermined generation device 14b through the ventilation channel 14d.

A discharge port of the predetermined generation device 14b is communicatively connected to the inlet of the blower fan 14a_1 through the ventilation channel 14e_1. The outlet of the blower fan 14a_1 is communicatively connected to the outlet 13bp_1 through the ventilation channel 14f_1.

The discharge port of the predetermined generation device 14b is communicatively connected to the inlet of the blower fan 14a_2 through the ventilation channel 14e_2. The outlet of the blower fan 14a_2 is communicatively connected to the outlet 13bp_2 through the ventilation channel 14f_2.

This configuration forms a first flow path of the inlet 13ap→the predetermined generation device 14b→the blower fan 14a_1→the outlet 13bp_1 and a second flow path of the inlet 13ap→the predetermined generation device 14b→the blower fan 14a_2→the outlet 13bp_2. The first flow path and the second flow path have a common part from the inlet 13ap to the predetermined generation device 14b.

This configuration can make the first flow path and the second flow path in a compact size.

The blower fan 14a_1 and the blower fan 14a_2 only need to have substantially the same blowing performance and may have the same or different structures such as shapes and sizes. The blower fan 14a_1 and the blower fan 14a_2 may be of the same type or may be of different types.

The ventilation channel 14e_1 and the ventilation channel 14e_2 only need to have substantially the same ventilation performance and may be different, for example, in cross section. The ventilation channel 14f_1 and the ventilation channel 14f_2 only need to have substantially the same ventilation performance and may be different, for example, in cross section.

The outlet 13bp_1 and the outlet 13bp_2 of the housing 13 are set to be arranged along the direction of travel of a vehicle 1p. The outlet 13bp_1 is the outlet for an airflow delivered by the blower fan 14a_1. The outlet 13bp_2 is the outlet for an airflow delivered by the blower fan 14a_2.

Figure 28:
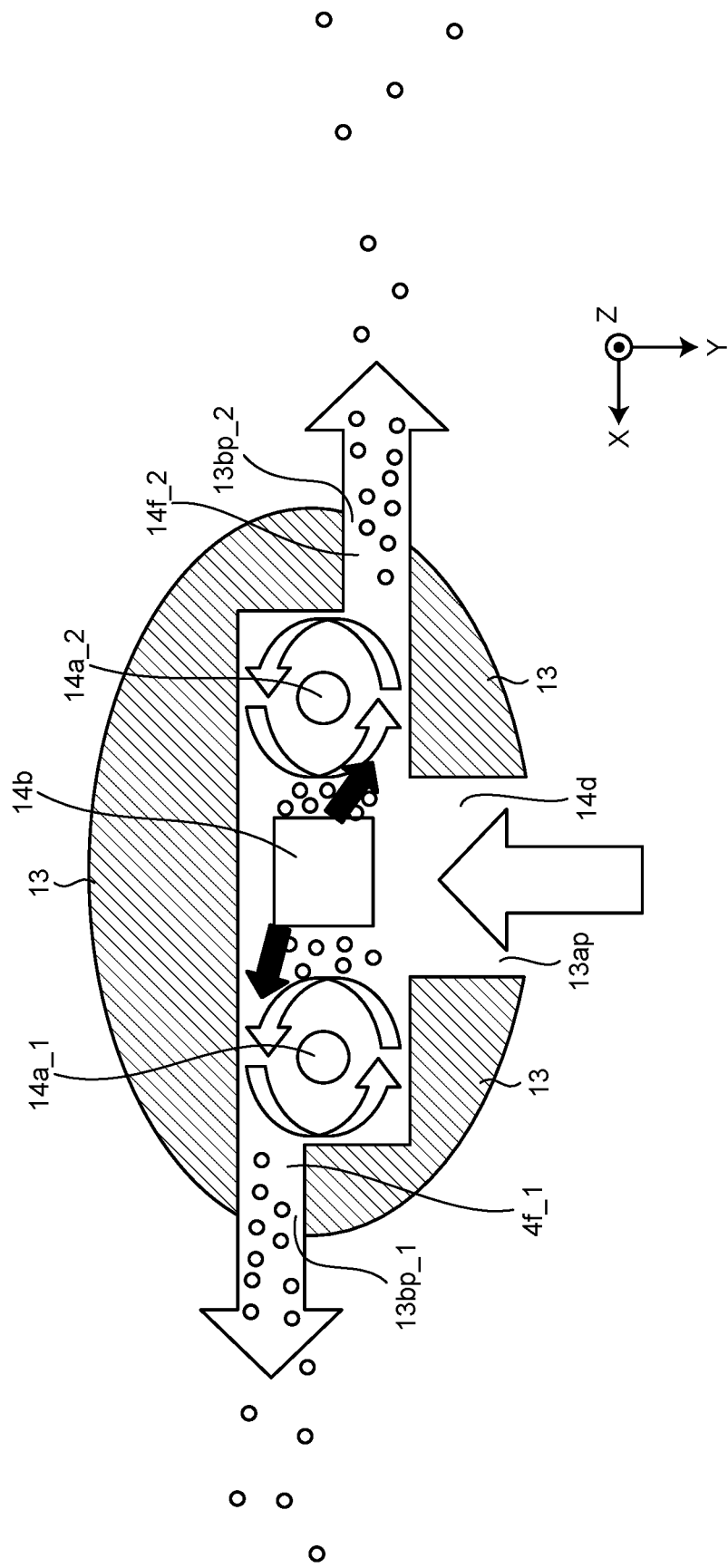
FIG. 28 is a diagram illustrating a configuration example of an air intake port, a predetermined generation device, a first outlet, and a second outlet in the second embodiment.
Figure 29:
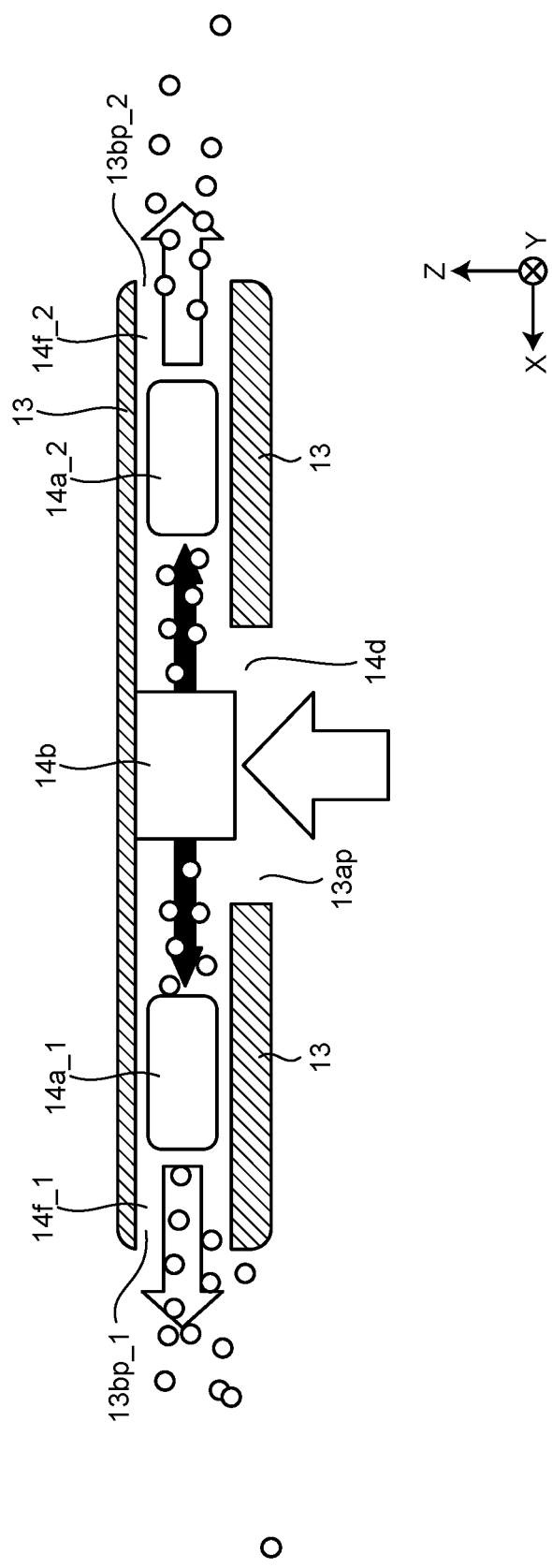
FIG. 29 is a diagram illustrating another configuration example of the air intake port, the predetermined generation device, the first outlet, and the second outlet in the second embodiment.
Figure 30:
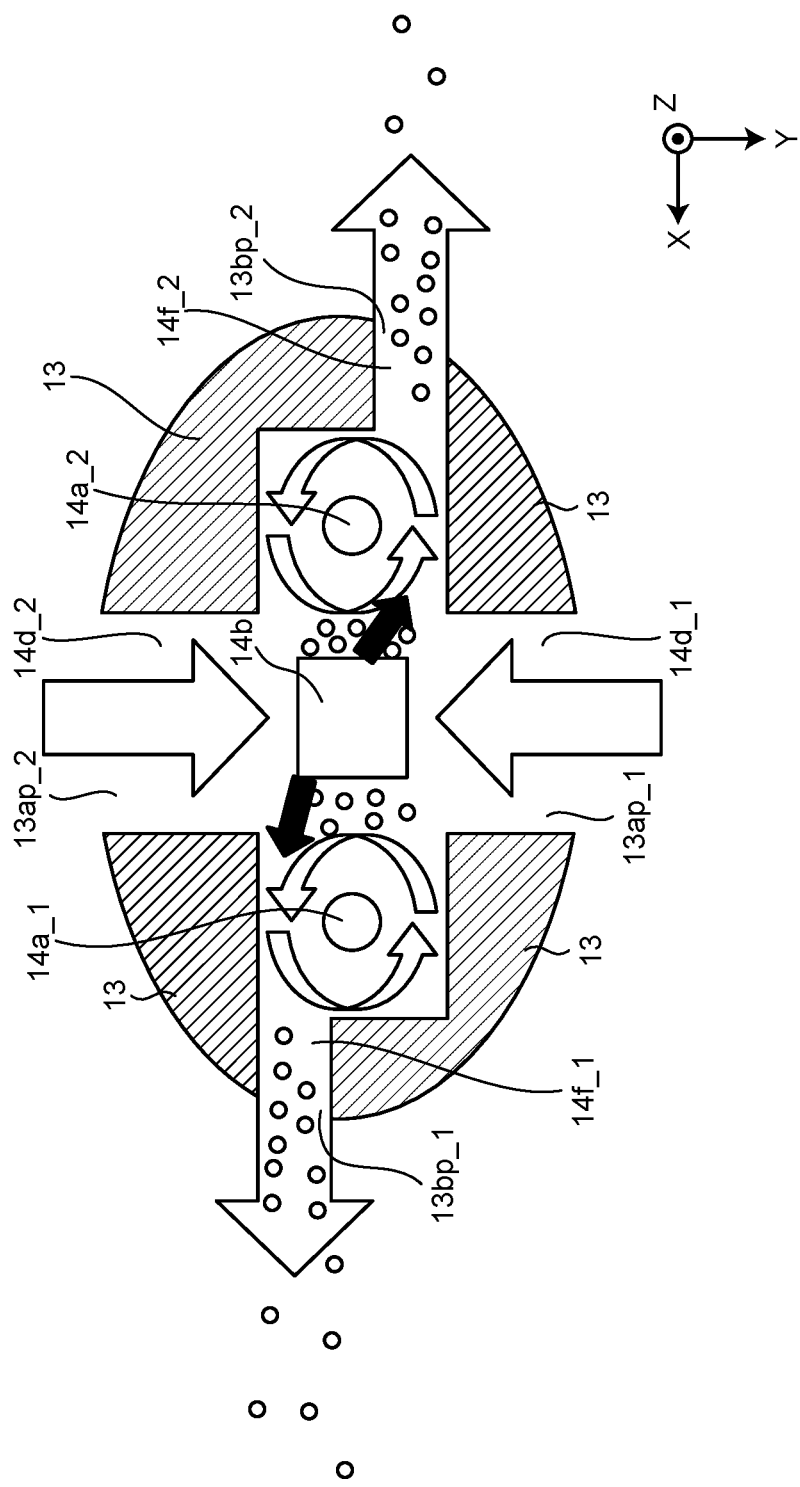
FIG. 30 is a diagram illustrating yet another configuration example of the air intake port, the predetermined generation device, the first outlet, and the second outlet in the second embodiment.

For example, as illustrated in FIG. 28 to FIG. 30, the outlet 13bp_1 may be provided on a side surface on the +X side of the housing 13, and the outlet 13bp_2 may be provided on a side surface on the −X side of the housing 13.

FIG. 28 is a diagram illustrating a configuration example of an air intake port, a predetermined generation device, a first outlet, and a second outlet in the second embodiment. FIG. 29 is a diagram illustrating another configuration example of the air intake port, the predetermined generation device, the first outlet, and the second outlet in the second embodiment. FIG. 30 is a diagram illustrating yet another configuration example of the air intake port, the predetermined generation device, the first outlet, and the second outlet in the second embodiment.

In FIG. 28 to FIG. 30, an airflow serving as a main flow among airflows blown out from the outlets 13bp_1 and 13bp_2 is indicated by a white arrow, and the predetermined particles added to the airflow are indicated by white circles. The airflow sent by the blower fan 14a_1 from the predetermined generation device 14b to the outlet 13bp_1 is blown out with the predetermined particles mainly in the +X direction. The airflow sent by the blower fan 14a_2 from the predetermined generation device 14b to the outlet 13bp_2 is blown out with the predetermined particles mainly in the −X direction.

With the configuration illustrated in FIG. 28 to FIG. 30, the blow of air with the predetermined particles in two directions (+X direction and −X direction) can be achieved in a compact configuration.

The inlet 13ap can be provided at any position spaced apart from the outlet 13bp_1 and the outlet 13bp_2 in the housing 13. It is the inlet of an airflow to be delivered to the predetermined generation device 14b.

The inlet 13ap may be provided on a side surface on the +Y side of the housing 13 as illustrated in FIG. 28 or may be provided on a bottom surface on the −Z side of the housing 13 as illustrated in FIG. 29. Alternatively, a plurality of inlets 13ap may be provided. As illustrated in FIG. 30, the inlet 13ap_1 may be provided on a side surface on the +Y side of the housing 13, and the inlet 13ap_2 may be provided on a side surface on the −Y side of the housing 13. In FIG. 28 to FIG. 30, an airflow serving as a main flow among airflows sucked into the inlet 13ap is indicated by a white arrow.

Figures 31, 32:
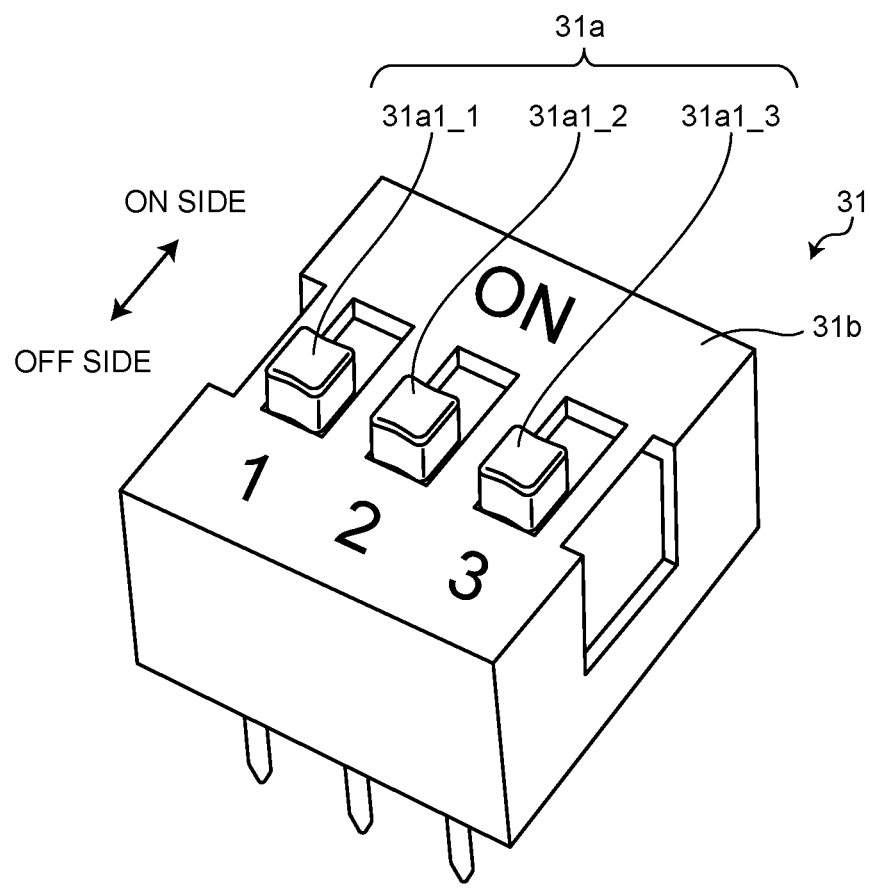
FIG. 31 is a table illustrating the settings of rotational speed of blower fans in the second embodiment.
FIG. 32 is a diagram illustrating a configuration of an operation unit in the second embodiment.

As illustrated in FIG. 31, the rotational speed CN1 of the blower fan 14a_1 and the rotational speed CN2 of the blower fan 14a_2 can be set to different rotational speeds. The control circuit 17 can control the rotational speed CN1 of the blower fan 14a_1 and the rotational speed CN2 of the blower fan 14a_2 to different rotational speeds, in accordance with the setting of different rotational speeds.

The settings illustrated in FIG. 31 may be implemented by software or may be implemented by hardware. FIG. 31 is a table illustrating the settings of rotational speeds of blower fans in the second embodiment.

For example, when the settings are implemented by software, a plurality of switches SW1 to SW3 listed in FIG. 31 each may be a functional module constructed on the memory 17a in the control circuit 17 illustrated in FIG. 27. An operation unit 31 has a detection unit 31b in addition to the button 31a. The detection unit 31b can detect an operation of the button 31a (e.g., press operation, touch operation). When the detection unit 31b detects an operation of the button 31a, the detection unit 31b transmits an operation signal to the control circuit 17. The control circuit 17 may recognize an operation pattern, for example, depending on a combination of the number of times of operation of the button 31a and/or the operation time, in accordance with the operation signal. The control circuit 17 may select one of the switches SW1 to SW3 in accordance with the operation pattern of the button 31a and turn on or off the selected switch SW.

Alternatively, when the settings are implemented by hardware, the button 31a of the operation unit 31 may include a plurality of operation pieces 31a1_1, 31a1_2, and 31a1_3 and a main body 31b as illustrated in FIG. 32. FIG. 32 is a diagram illustrating a configuration of the operation unit 31 in the second embodiment. A plurality of operation pieces 31a1_1, 31a1_2, and 31a1_3 each protrude from the main body 31b and can be operated to the on side and the off side on the opposite side along a direction parallel to the surface of the main body 31b. The operation pieces 31a1_1, 31a1_2, and 31a1_3 correspond to the switches SW1, SW2, and SW3. The switch SW1 is turned on when the operation piece 31a1_1 is operated to the on side, and the switch SW1 is turned off when the operation piece 31a1_1 is operated to the off side. The switch SW2 is turned on when the operation piece 31a1_2 is operated to the on side, and the switch SW2 is turned off when the operation piece 31a1_2 is operated to the off side. The switch SW3 is turned on when the operation piece 31a1_3 is operated to the on side, and the switch SW3 is turned off when the operation piece 31a1_3 is operated to the off side.

The control circuit 17 may perform the settings as illustrated in FIG. 31 in accordance with the on/off of the switches SW1 to SW3.

As illustrated in FIG. 31, when the switches SW1, SW2, and SW3 are turned on, off, and off, the rotational speed CN1 of the blower fan 14a_1 is set to "high", the rotational speed CN2 of the blower fan 14a_2 is set to "low", and the "in-use linkage" is set to "NO (off)", respectively. "Low" represents the rotational speed of the blower fan such that the air blow volume is relatively low. When "in-use linkage" is "NO (off)", it means that the in-use linkage is turned off and the control linked to the vehicle status "in use" is not performed.

Figure 33A:
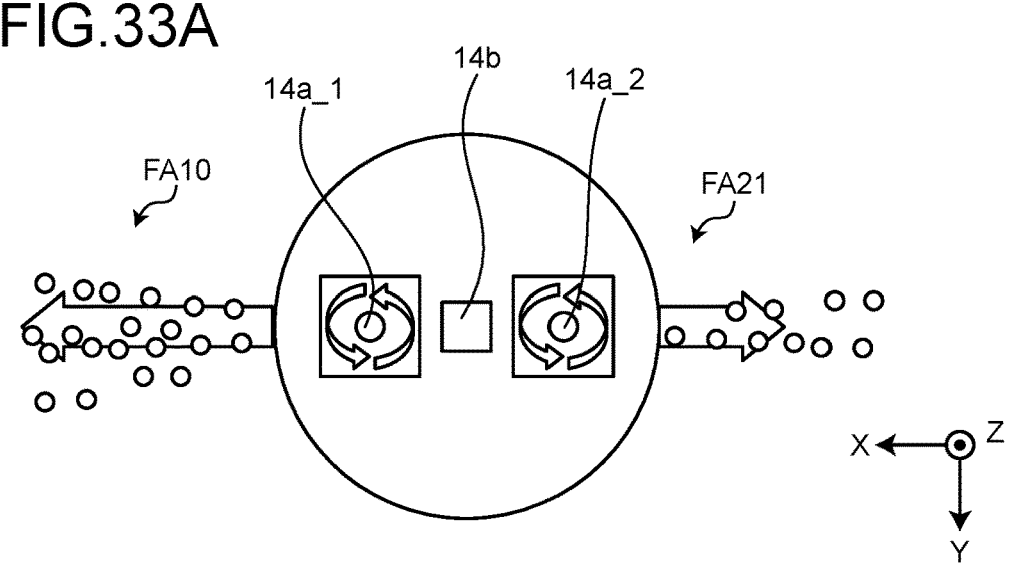
FIG. 33A to FIG. 33C are diagrams illustrating the operation of the blower fans in the second embodiment.
Figure 33B:
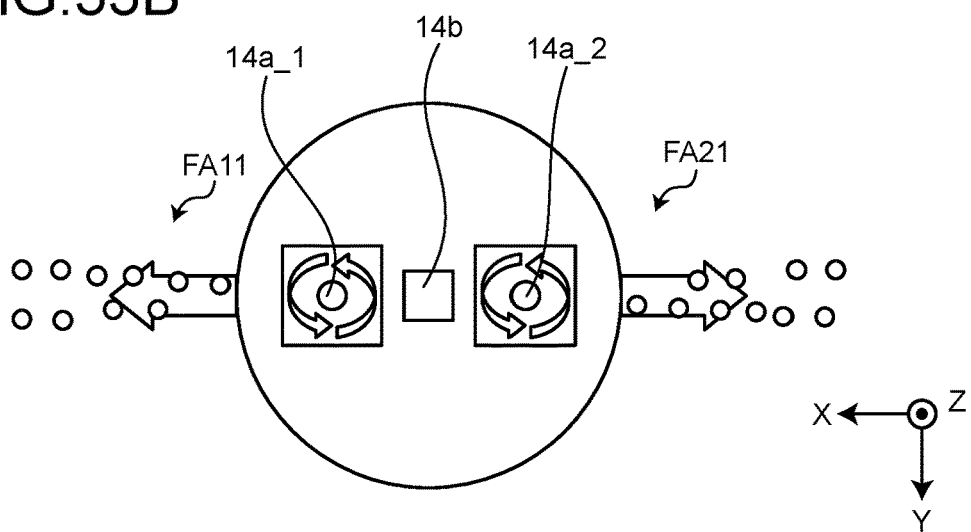
Figure 33C:
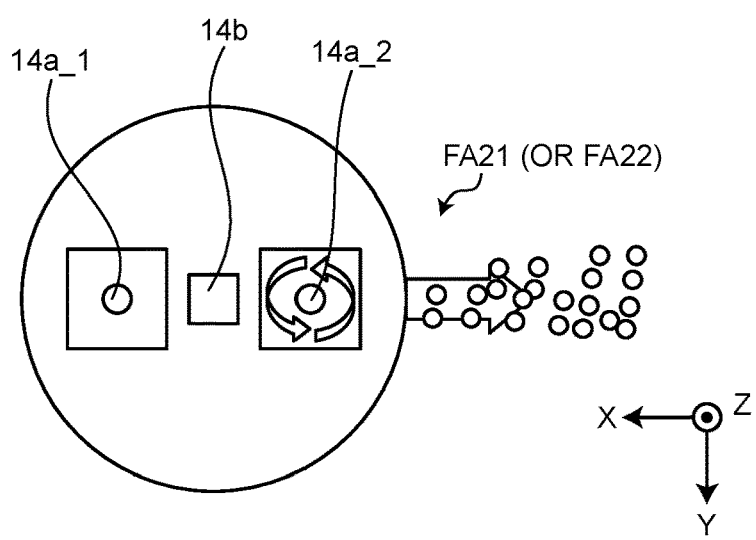
Figure 35A:
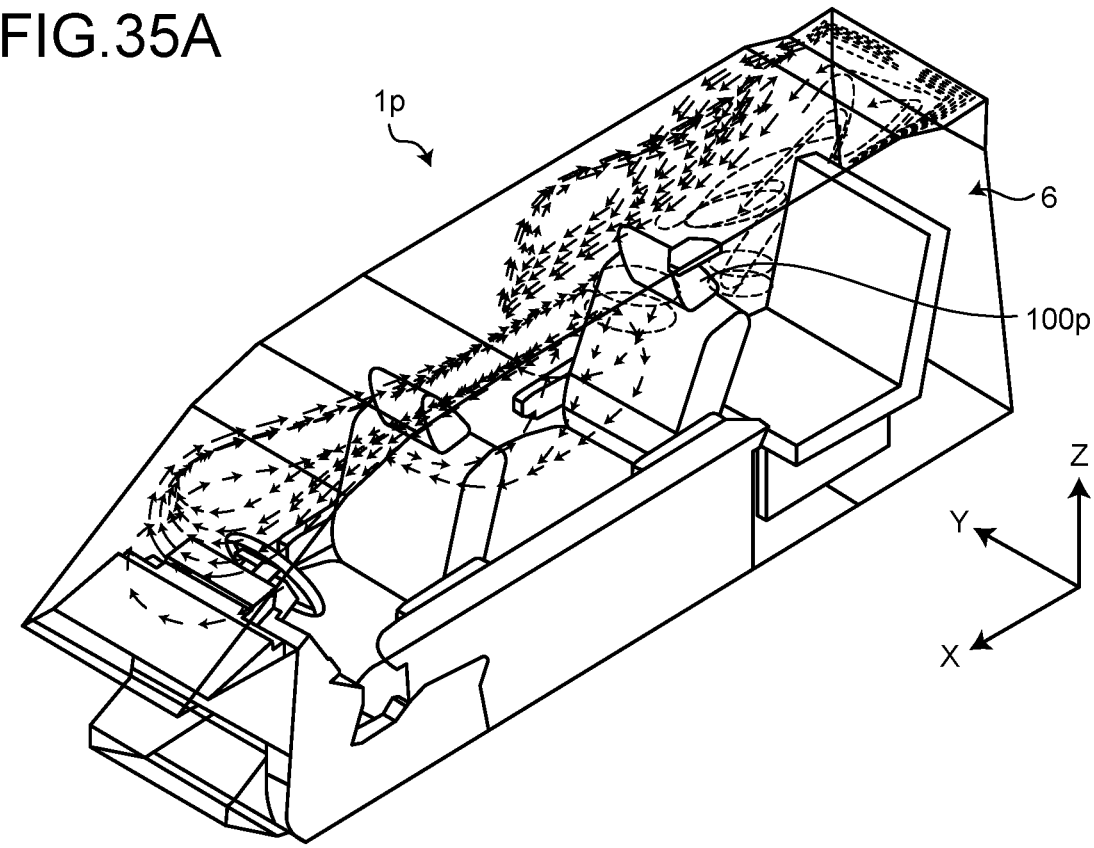
FIG. 35A and FIG. 35B are diagrams illustrating airflows in the cabin in the second embodiment.
Figure 35B:
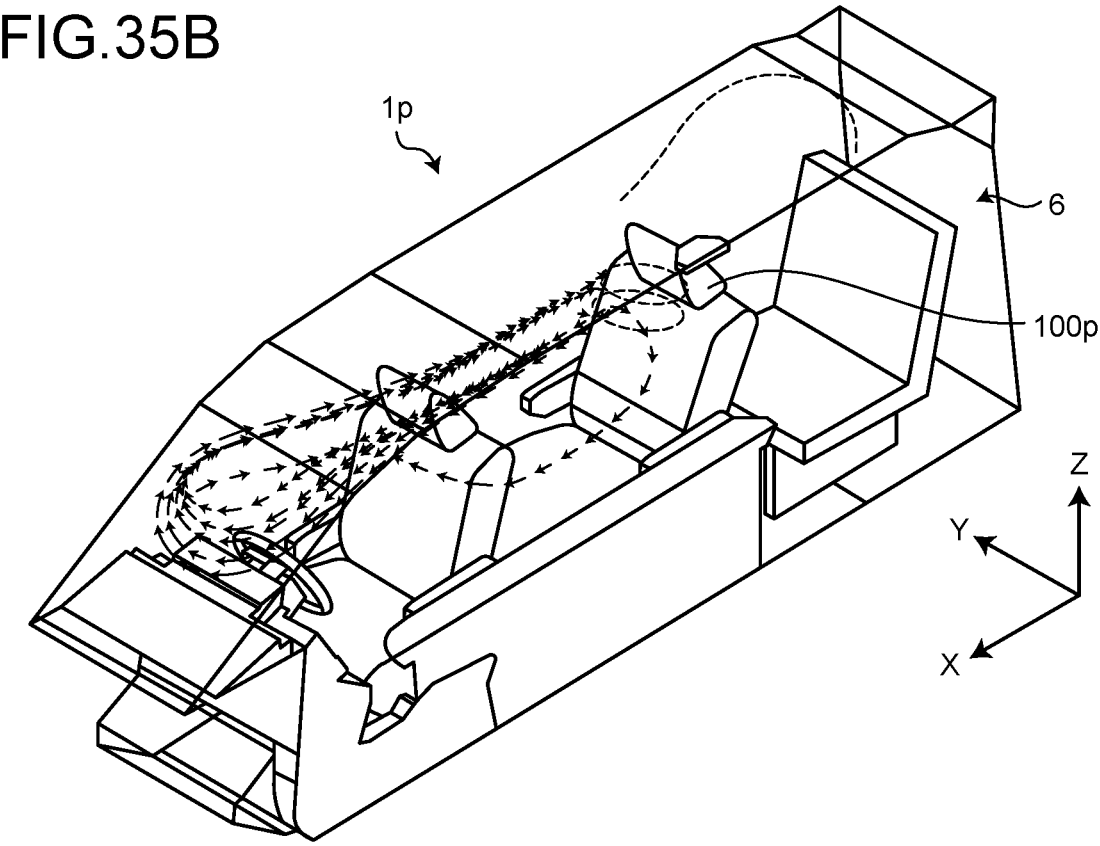
Figure 36A:
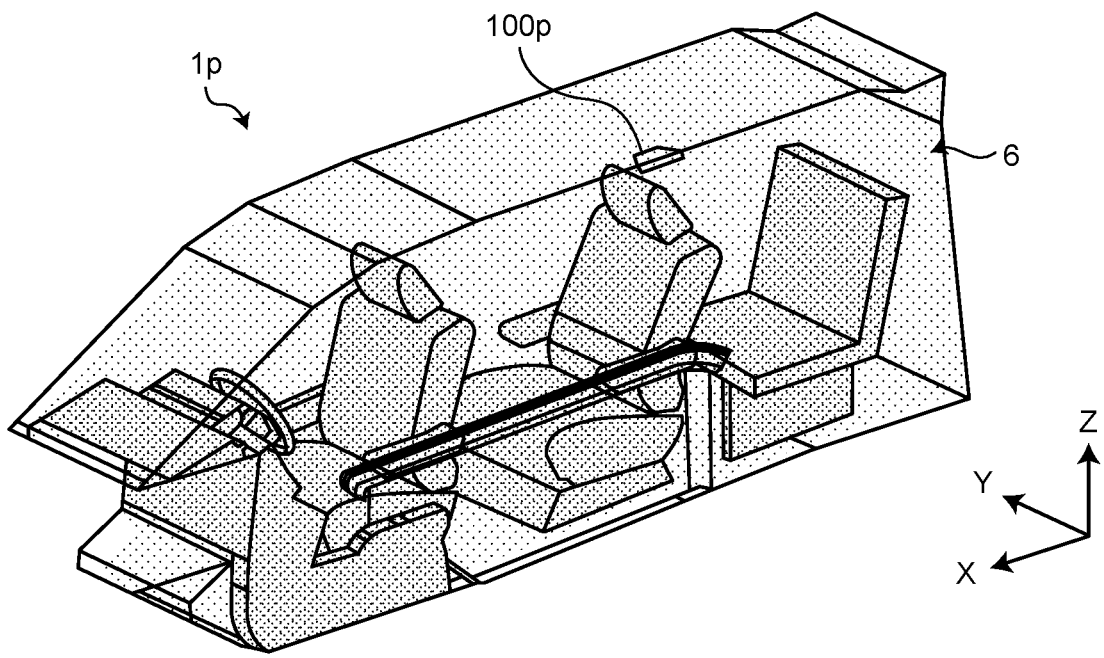
FIG. 36A and FIG. 36B are diagrams illustrating a distribution of predetermined particles in the cabin in the second embodiment.
Figure 36B:
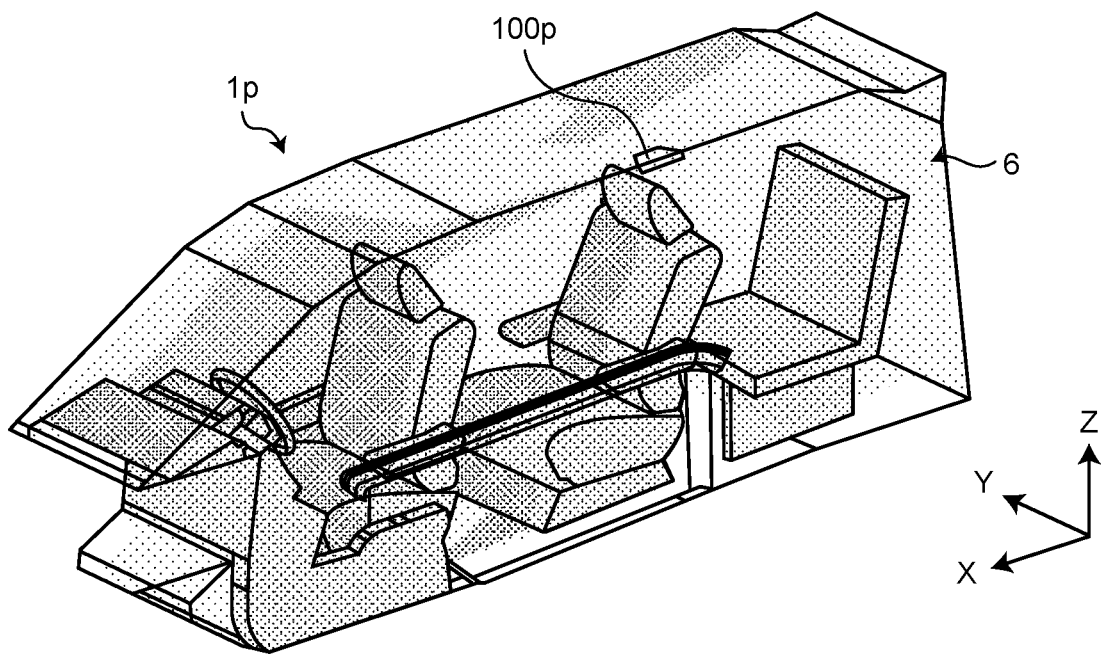

In accordance with this setting, the control circuit 17 controls the rotational speed CN1 of the blower fan 14a_1 and the rotational speed CN2 of the blower fan 14a_2, regardless of the vehicle status. The control circuit 17 controls the rotational speed of the blower fan 14a_1 to CN1="high" and controls the rotational speed of the blower fan 14a_2 to CN2="low". "High" represents the rotational speed of the blower fan such that the air blow volume is relatively high. "High" represents a rotational speed greater than "low". Accordingly, as illustrated in FIG. 33A, the air blow volume of the blower fan 14a_1 becomes FA1=FA10 and the air blow volume of the blower fan 14a_2 becomes FA2=FA21. FIG. 33A to FIG. 33C are diagrams illustrating the air blow volume of the blower fans 14a_1 and 14a_2 in the second embodiment. In FIG. 33A, an airflow serving as a main flow is indicated by a white arrow, and the volume of the airflow is indicated by the length of the arrow. Here, FA10>FA21.

With this configuration, the predetermined particles can be sent out in the +X direction and the −X direction, so that the predetermined particles can be spread uniformly in the cabin.

As illustrated in FIG. 31, when the switches SW1, SW2, and SW3 are turned off, off, and on, the rotational speed CN1 of the blower fan 14a_1 is set to "low", the rotational speed CN1 of the blower fan 14a_2 is set to "low," and the "in-use linkage" is set to "YES (on)", respectively. When "in-use linkage" is "YES (on)", it means that the in-use linkage is turned on and the control linked to the vehicle status "in use" is performed.

In accordance with this setting, the control circuit 17 changes the operation mode to the parking mode if the vehicle status is "parked". In the parking mode, the control circuit 17 controls the rotational speed CN1 of the blower fan 14a_1 and the rotational speed CN2 of the blower fan 14a_2. The control circuit 17 controls the rotational speed of the blower fan 14a_1 to CN1="low" and controls the rotational speed of the blower fan 14a_2 to CN2="low". Accordingly, as illustrated in FIG. 33B, the air blow volume of the blower fan 14a_1 becomes FA1=FA11 and the air blow volume of the blower fan 14a_2 becomes FA2=FA21. In FIG. 33B, an airflow serving as a main flow is indicated by a white arrow, and the volume of the airflow is indicated by the length of the arrow. Here, FA11≈FA21.

With this configuration, the predetermined particles can be sent out in the +X direction and the −X direction, so that the predetermined particles can be spread uniformly in the cabin 6.

With the in-use linkage turned on, the control circuit 17 changes the operation mode to the in-use mode if the vehicle status is "in use". The rotational speed of each of the blower fans 14a_1 and 14a_2 in the in-use mode is preset as a setting in the in-use mode.

For example, the control circuit 17 may set the rotational speed CN1 of the blower fan 14a_1 to zero and the rotational speed CN2 of the blower fan 14a_2 to "low", in accordance with the setting in the in-use mode. Accordingly, the air blow volume of the blower fan 14a_1 becomes FA1≈0 and the air blow volume of the blower fan 14a_2 becomes FA2=FA21.

Alternatively, the control circuit 17 may set the rotational speed CN1 of the blower fan 14a_1 to zero and the rotational speed CN2 of the blower fan 14a_2 to "very low", in accordance with the setting in the in-use mode. "Very low" represents the rotational speed of the blower fan such that the air blow volume is extremely low. "Very low" represents the rotational speed smaller than "low". Accordingly, as illustrated in FIG. 33C, the air blow volume of the blower fan 14a_1 becomes FA1≈0 and the air blow volume of the blower fan 14a_2 becomes FA2=FA22 (<FA21). In FIG. 33C, an airflow serving as a main flow is indicated by a white arrow, and the volume of the airflow is indicated by the length of the arrow.

In other words, if the vehicle status is "in use", the air conditioning device 9 (see FIG. 25) is circulating the air in the cabin, and the predetermined particles can be spread in the cabin 6 by the air blow in one direction as illustrated in FIG. 33C.

The operation of the vehicle interior device 100p will now be described with reference to FIG. 5. FIG. 5, which is a flowchart illustrating the operation of the vehicle interior device 100, is used as a flowchart illustrating the operation of the vehicle interior device 100p.

When the operation unit 18, 31p is operated, the control circuit 17 acquires an operation signal from the operation unit 18, 31p in the vehicle interior device 100p (S1). The control circuit 17 may turn on or off the switches SW1 to SW3, in accordance with an operation signal of the operation unit 31p.

When the door 8-1, 8-2 is opened or closed, the control circuit 17 acquires a door open/closed signal $D_{OOR}$ from the door switch 7-1, 7-2 (S2). S1 and S2 may be performed in parallel.

The vehicle interior device 100p performs a vehicle status determination process to determine a status of the vehicle 1 (S3). For example, in the vehicle interior device 100p, as illustrated in FIG. 6, the control circuit 17 may determine a vehicle status (e.g., in use or parked) from the +B voltage $V_{+B}$ transmitted through the +B power line L1. With this process, the vehicle status can be determined to be "parked" or "in use".

The vehicle interior device 100p performs a purification process to purify the air in the cabin 6 (S4). For example, the vehicle interior device 100p may perform the purification process through the operation illustrated in FIG. 34.

FIG. 34 is a flowchart illustrating the purification process (S4). In the vehicle interior device 100p, the control circuit 17 determines whether the air cleaning function is turned on in accordance with the operation signal acquired from the operation unit 18 at S1 (S101).

If the air cleaning function is not turned on and is kept off (No at S101), the control circuit 17 turns off the blower fan 14a and turns off the predetermined generation device 14b (S102).

If the air cleaning function is turned on (Yes at S101), the control circuit 17 checks the status of the switch SW3 in accordance with the operation signal acquired from the operation unit 31p at S1 and determines whether the in-use linkage is turned on (S103).

If the switch SW3 is turned off, the control circuit 17 determines that the in-use linkage is turned off (NO at S103) and checks the status of the switches SW1 and SW2 turned on or off at S1. The control circuit 17 controls the blower fans 14a_1 and 14a_2 at the air volume set by the status of the switches SW1 and SW2 in accordance with the operation signal acquired from the operation unit 31p at S1, and turns on the predetermined generation device 14b (S104).

For example, when the switches SW1 and SW2 are turned on and off, the control circuit 17 controls the rotational speed of the blower fan 14a_1 to CN1="high" and controls the rotational speed of the blower fan 14a_2 to CN2="low". Accordingly, the control circuit 17 drives each blower fan 14a at a rotational speed in accordance with the setting. As a result, as illustrated in FIG. 33A, the air blow volume of the blower fan 14a_1 becomes FA1=FA10 and the air blow volume of the blower fan 14a_2 becomes FA2=FA21.

Alternatively, when the switches SW1 and SW2 are turned off and off, the control circuit 17 controls the rotational speed of the blower fan 14a_1 to CN1="low" and controls the rotational speed of the blower fan 14a_2 to CN2="low". Accordingly, the control circuit 17 drives each blower fan 14a at a rotational speed in accordance with the setting. As a result, as illustrated in FIG. 33B, the air blow volume of the blower fan 14*a*_1 becomes FA1=FA11 and the air blow volume of the blower fan 14*a*_2 becomes FA2=FA21.

With this control, the predetermined particles can be sent out at in the +X direction and the −X direction each at an appropriate air volume, so that the predetermined particles can be spread uniformly in the cabin 6.

If the switch SW3 is turned on, the control circuit 17 determines that the in-use linkage is turned on (YES at S103) and determines whether the vehicle 1 is in use (S105). The control circuit 17 refers to the vehicle status information stored in the memory 17*a* and determines that the vehicle 1 is in use if the vehicle status information indicates "in use" and determines that the vehicle 1 is parked if the vehicle status information indicates "parked".

If the vehicle 1 is parked (No at S105), the control circuit 17 changes the operation mode to the parking mode and performs the process at S104.

If the vehicle 1 is in use (Yes at S105), the control circuit 17 changes the operation mode to the in-use mode, controls the blower fans 14*a*_1 and 14*a*_2 at the air volume set for the in-use mode, and turns on the predetermined generation device 14*b* (S106). The air volume set for the in-use mode is preset for the control circuit 17.

For example, the control circuit 17 may set the rotational speed CN1 of the blower fan 14*a*_1 to zero and the rotational speed CN2 of the blower fan 14*a*_2 to "low". Accordingly, the control circuit 17 drives each blower fan 14*a* at a rotational speed in accordance with the setting. As a result, as illustrated in FIG. 33C, the air blow volume of the blower fan 14*a*_1 becomes FA1≈0 and the air blow volume of the blower fan 14*a*_2 becomes FA2=FA21.

Alternatively, the control circuit 17 may set the rotational speed CN1 of the blower fan 14*a*_1 to zero and the rotational speed CN2 of the blower fan 14*a*_2 to "very low". Accordingly, the control circuit 17 drives each blower fan 14*a* at a rotational speed in accordance with the setting. As a result, as illustrated in FIG. 33C, the air blow volume of the blower fan 14*a*_1 becomes FA1≈0 and the air blow volume of the blower fan 14*a*_2 becomes FA2=FA22 (<FA21).

This control takes advantage of the vehicle status "in use" and the air conditioning device 9 (see FIG. 25) circulating the air in the cabin 6 to uniformly spread the predetermined particles in the cabin 6 by the air blow in one direction at an appropriate air volume.

The relation between the blowing direction of the air with predetermined particles and the distribution of the predetermined particles in the cabin 6 will now be examined.

When the air conditioning device 9 is not in operation and the air with predetermined particles is sent out in one direction, an airflow serving as a main flow among airflows blown out from the outlet 13*bp* tends to be concentrated in a specific space in the cabin 6.

For example, when the air with predetermined particles is blown out in the +X direction from the vehicle interior device 100*p*, the airflows flow as indicated by dotted arrows in FIG. 35B. FIG. 35A and FIG. 35B are diagrams illustrating airflows in the cabin 6 in the second embodiment. FIG. 35B illustrates the result of a simulation of airflows in the cabin 6 in a case where the air with predetermined particles is sent out in one direction. In FIG. 35B, the number of arrows represents the air blow volume. In the simulation result illustrated in FIG. 35B, the airflows flow in a concentrated manner in the space on the +X side in the cabin 6.

When the airflows are concentrated in a specific space in the cabin 6, the concentration distribution of the predetermined particles tends to be more uneven in the cabin 6.

For example, when the airflows flow as illustrated in FIG. 35B, the concentration distribution of the predetermined particles is as illustrated in FIG. 36B. FIG. 36B illustrates the result of a simulation of the concentration distribution of predetermined particles in a case where the air with predetermined particles is sent out in one direction. In FIG. 36B, the higher density of dots in dot shading indicates a higher concentration. In the simulation result illustrated in FIG. 36B, the distribution concentration of predetermined particles in the space on the +X side in the cabin 6 is higher than the distribution concentration of predetermined particles in the space on the −X side in the cabin 6, indicating that the concentration distribution is more uneven.

On the other hand, when the air with predetermined particles is sent out in two directions, an airflow serving as a main flow among airflows blown out from the outlet 13*bp* can flow uniformly in the cabin 6. The two directions to send out the air may be two directions depending on the shape of the vehicle 1*p*. When the longitudinal direction of the vehicle 1*p* is the X direction, the two directions to send out the air are set to the +X direction and the −X direction whereby the airflow can flow in the cabin 6 effectively.

For example, when the air with predetermined particles is blown out in the +X direction and the −X direction from the vehicle interior device 100*p* with the air conditioning device 9 not in operation, the airflows flow as indicated by dotted arrows in FIG. 35A. FIG. 35A illustrates the result of a simulation of airflows in the cabin 6 in a case where the air with predetermined particles is sent out in two directions. In FIG. 35A, the number of arrows represents the air blow volume. In the simulation result illustrated in FIG. 35A, the airflows flow generally uniformly in the space on the +X side and in the space on the −X side in the cabin 6.

When the airflows flow generally uniformly in the cabin 6, the concentration distribution of the predetermined particles is likely to be uniform in the cabin 6.

For example, when the airflows flow as illustrated in FIG. 35A, the concentration distribution of the predetermined particles is as illustrated in FIG. 36A. FIG. 36A illustrates the result of a simulation of the concentration distribution of predetermined particles in a case where the air with predetermined particles is sent out in two directions (e.g., +X direction and −X direction). In FIG. 36A, the higher density of dots in dot shading indicates a higher concentration. In the simulation result illustrated in FIG. 36A, the distribution concentration of predetermined particles is generally uniform in the cabin 6. This result demonstrates that the predetermined particles are sent out in the +X direction and the −X direction whereby the predetermined particles can be spread uniformly in the cabin 6.

For example, when the installation position of the vehicle interior device 100*p* is on the −X side with respect to the center of the cabin 6, the rotational speed CN1 of the blower fan 14*a*_1 may be greater than the rotational speed CN2 of the blower fan 14*a*_2. With this setting, as illustrated in FIG. 33A, the air blow volume FA1=FA10 of the blower fan 14*a*_1 is greater than the air blow volume FA2=FA21 of the blower fan 14*a*_2. Thus, as illustrated in FIG. 35A, the air with predetermined particles can be blown out at an air volume corresponding to the volume of the shared space in each of the +X direction and the −X direction of the vehicle interior device 100*p*. As a result, as illustrated in FIG. 36A, the blower fan 14a_1 and the blower fan 14a_2 can effectively spread the predetermined particles uniformly in the cabin 6.

As described above, in the second embodiment, in the vehicle interior device 100p, the outlet 13bp_1 and the outlet 13bp_2 of the housing 13 are set to be arranged along the direction of travel of the vehicle 1p. The rotational speed CN1 of the blower fan 14a_1 and the rotational speed CN2 of the blower fan 14a_2 can be set to different rotational speeds. With this configuration, the air with predetermined particles can be blown out in two directions along the direction of travel of the vehicle 1p, depending on the overall shape of the cabin 6 and the volume of space shared by each blower fan 14a. As a result, the predetermined particles can be effectively spread uniformly in the cabin 6.

In the second embodiment, the vehicle interior device 100p has the parking mode and the in-use mode. For example, in the vehicle interior device 100p in the parking mode, the blower fan 14a_1 rotates at a rotational speed CN1="high" and the blower fan 14a_2 rotates at a rotational speed CN2="low". In the vehicle interior device 100p in the in-use mode, the blower fan 14a_2 can rotate at a rotational speed CN2="very low". With this configuration, the predetermined particles can be spread uniformly in the cabin 6 in the parking mode, whereas the air blow volume is reduced using the conditioned air in the in-use mode thereby achieving lower power consumption and quiet operation.

In the second embodiment, the vehicle interior device 100p does not rotate the blower fan 14a_1 in the in-use mode. With this configuration, the air blow volume is reduced using the conditioned air thereby achieving lower power consumption and quiet operation in the in-use mode.

In the second embodiment, the vehicle interior device 100p operates in the parking mode when the signal $D_{OOR}$ on the door open/closed signal line L3 indicates open and then indicates closed, and the potential difference ΔV of the +B voltage line L1 relative to the potential $V_{GND}$ on the ground voltage line L2 becomes smaller than the threshold voltage Vth1. The vehicle interior device 100p operates in the in-use mode when the signal $D_{OOR}$ on the door open/closed signal line L3 indicates closed, and the potential difference ΔV of the +B voltage line L1 relative to the potential $V_{GND}$ on the ground voltage line L2 becomes greater than the threshold voltage Vth1. With this configuration, each of the blower fans 14a 1 and 14a 2 can be controlled at the air volume and direction suitable for the vehicle status.

In the second embodiment, the vehicle interior device 100p is arranged, for example, behind the center in the front-to-rear direction in the cabin 6 of the vehicle 1p. The rotational speed CN1 of the blower fan 14a_1 corresponding to the outlet 13bp_1 oriented forward can be preset to be greater than the rotational speed CN2 of the blower fan 14a_2 corresponding to the outlet 13bp_2 oriented backward. With this configuration, the air with predetermined particles can be blown out into the cabin 6 at the air volume depending on the overall shape of the cabin 6 and the volume of space shared by each blower fan 14a. As a result, the predetermined particles can be effectively spread uniformly in the cabin 6.

The switching of rotational speed of the blower fan 14a by the switches SW1 and SW2 is not limited to two levels "high" and "low" but may be performed in three or more levels.

The switches for changing the air volume of the blower fans 14a_1 and 14a_2 and the on/off of the in-use linkage may be a multi-level switch SW11 as illustrated in FIG. 37. FIG. 37 is a table illustrating the settings of rotational speed of the blower fans 14a_1 and 14a_2 in a modification of the second embodiment. In FIG. 37, the settings by the switch SW11 switchable in 16 values from 0 to E are illustrated. The settings illustrated in FIG. 37 may be implemented by software or may be implemented by hardware.

For example, when the settings are implemented by software, the switch SW11 illustrated in FIG. 37 may be a functional module constructed on the memory 17a in the control circuit 17 illustrated in FIG. 27. The operation unit 31 has a detection unit 31b in addition to the button 31a. The detection unit 31b can detect an operation of the button 31a (e.g., press operation, touch operation). When the detection unit 31b detects an operation of the button 31a, the detection unit 31b transmits an operation signal to the control circuit 17. The control circuit 17 may recognize an operation pattern, for example, depending on a combination of the number of times of operation of the button 31a and/or the operation time, in accordance with the operation signal. The control circuit 17 may select one of the 16 values in accordance with the operation pattern of the button 31a and switch the switch SW11 to the selected value.

Figure 38:
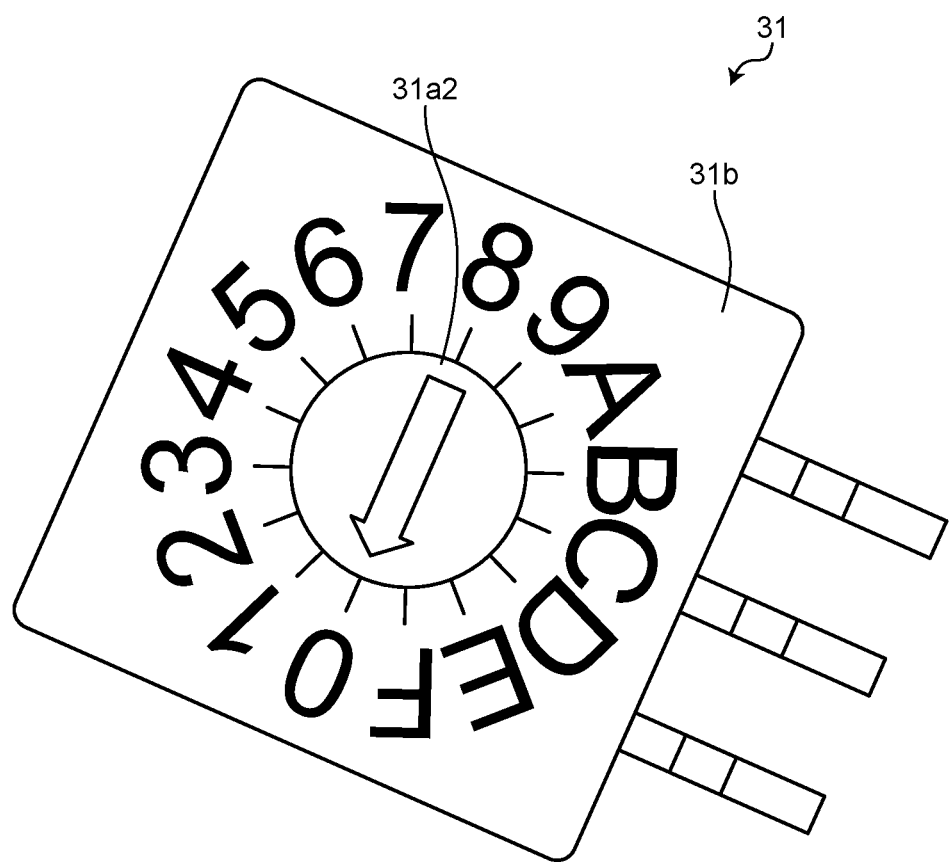
FIG. 38 is a diagram illustrating a configuration of the operation unit in a modification of the second embodiment.

Alternatively, when the setting are implemented by hardware, the button 31a of the operation unit 31 may include a rotating piece 31a2 and a main body 31b as illustrated in FIG. 38. FIG. 38 is a diagram illustrating a configuration of the operation unit 31 in a modification of the second embodiment. The rotating piece 31a2 is rotatable relative to the main body 31b and can be operated to any one of 16 rotational positions along the direction of rotation. The rotating piece 31a2 corresponds to the switch SW11. The value of the switch SW11 is set to "0" when the rotating piece 31a2 is operated to the rotational position "0". The value of the switch SW11 is set to "1" when the rotating piece 31a2 is operated to the rotational position "1". The value of the switch SW11 is set to "E" when the rotating piece 31a2 is operated to the rotational position "E". The rotational position "F" is not used in the operation unit 31.

The control circuit 17 may perform the settings as illustrated in FIG. 37 in accordance with the value of the switch SW11. FIG. 37 illustrates a configuration in which the value of the switch SW11 is switched in accordance with a combination of the type of the vehicle 1p to be set and/or the installation position of the vehicle interior device 100p and the on/off of the in-use linkage.

As illustrated in FIG. 37, in a case of the vehicle 1p of a "small car" type, when the value of the switch SW11 is set to "0", the rotational speed CN1 of the blower fan 14a_1 is set to "low", the rotational speed CN2 of the blower fan 14a_2 is set to "low", and the "in-use linkage" is set to "NO (off)".

In accordance with this setting, the control circuit 17 controls the rotational speed of the blower fan 14a_1 to CN1="low" and controls the rotational speed of the blower fan 14a_2 to CN2="low", regardless of the vehicle status. Accordingly, as illustrated in FIG. 33B, the air blow volume of the blower fan 14a_1 becomes FA1=FA11 (<FA10) and the air blow volume of the blower fan 14a_2 becomes FA2=FA21.

Here, since the vehicle 1p is a "small car" type, the volume of the cabin 6 is relatively small, and the airflow can flow uniformly in the cabin 6 at a relatively low air volume. With this configuration, the predetermined particles can be spread uniformly in the cabin while the air blow volume is reduced thereby achieving lower power consumption and quiet operation.

Alternatively, when the value of the switch SW11 is set to "8", the rotational speed CN1 of the blower fan 14a_1 is set to "low", the rotational speed CN1 of the blower fan 14a_2 is set to "low," and the "in-use linkage" is set to "YES (on)".

In accordance with this setting, the control circuit 17 changes the operation mode to the parking mode if the vehicle status is "parked". In the parking mode, the control circuit 17 controls the rotational speed of the blower fan 14a_1 to CN1="low" and controls the rotational speed of the blower fan 14a_2 to CN2="low". Accordingly, the air blow volume of the blower fan 14a_1 becomes FA1=FA11 (<FA10) and the air blow volume of the blower fan 14a_2 becomes FA2=FA21.

Here, since the vehicle 1p is a "small car" type, the volume of the cabin 6 is relatively small, and the airflow can flow uniformly in the cabin 6 at a relatively low air volume. With this configuration, the predetermined particles can be spread uniformly in the cabin while the air blow volume is reduced thereby achieving lower power consumption and quiet operation.

Alternatively, the control circuit 17 changes the operation mode to the in-use mode if the vehicle status is "in use". The rotational speed of each of the blower fans 14*a*_1 and 14*a*_2 in the in-use mode is preset as a setting in the in-use mode.

For example, the control circuit 17 may set the rotational speed CN1 of the blower fan 14*a*_1 to zero and the rotational speed CN2 of the blower fan 14*a*_2 to "low", in accordance with the setting in the in-use mode. Accordingly, as illustrated in FIG. 33C, the air blow volume of the blower fan 14*a*_1 becomes FA1≈0 and the air blow volume of the blower fan 14*a*_2 becomes FA2=FA21.

In other words, if the vehicle status is "in use", the air conditioning device 9 (see FIG. 25) is circulating the air in the cabin 6, and the predetermined particles can be spread in the cabin 6 by the air blow in one direction.

As illustrated in FIG. 37, in a case of the vehicle 1*p* of a "sedan" type, when the value of the switch SW11 is set to "1", the same settings as when the value of the switch SW11 is "0" and the corresponding control are performed.

Alternatively, when the value of the switch SW11 is set to "9", the same settings as when the value of the switch SW11 is "8" and the corresponding control are performed.

As illustrated in FIG. 37, in a case of the vehicle 1*p* of a "small one-box" type, when the value of the switch SW11 is set to "2", the same settings as when the value of the switch SW11 is "0" and the corresponding control are performed.

Alternatively, when the value of the switch SW11 is set to "A", the same settings as when the value of the switch SW11 is "8" and the corresponding control are performed.

As illustrated in FIG. 37, when the vehicle 1*p* is a "medium one-box" type and the installation position of the vehicle interior device 100*p* is near the center of the vehicle 1*p* as illustrated in FIG. 39A, the value of the switch SW11 is set to "3". With this setting, the rotational speed CN1 of the blower fan 14*a*_1 is set to "middle", the rotational speed CN2 of the blower fan 14*a*_2 is set to "middle", and the "in-use linkage" is set to "NO (off)". "Medium" represents the rotational speed of the blower fan such that the air blow volume is intermediate. "Medium" represents a rotational speed greater than "low" and smaller than "high".

In accordance with this setting, the control circuit 17 controls the rotational speed of the blower fan 14*a*_1 to CN1="middle" and controls the rotational speed of the blower fan 14*a*_2 to CN2="middle", regardless of the vehicle status. Accordingly, as illustrated in FIG. 39B, the air blow volume of the blower fan 14*a*_1 becomes FA1=FA13 and the air blow volume of the blower fan 14*a*_2 becomes FA2=FA23.

Here, FA11<FA13<FA10

FA21<FA23<FA20. FA20 is the air blow volume corresponding to the rotational speed of the blower fan 14*a*_2 set to CN2="high".

Since the vehicle 1*p* is a "medium one-box" type, the volume of the cabin 6 is intermediate, and the airflow can flow uniformly in the cabin 6 at an intermediate air volume. With this configuration, the predetermined particles can be spread uniformly in the cabin while the air blow volume is reduced thereby achieving lower power consumption and quiet operation.

Alternatively, when the value of the switch SW11 is set to "B", the rotational speed CN1 of the blower fan 14*a*_1 is set to "middle", the rotational speed CN1 of the blower fan 14*a*_2 is set to "middle", and the "in-use linkage" is set to "YES (on)".

In accordance with this setting, the control circuit 17 changes the operation mode to the parking mode if the vehicle status is "parked". In the parking mode, the control circuit 17 controls the rotational speed of the blower fan 14*a*_1 to CN1="middle" and controls the rotational speed of the blower fan 14*a*_2 to CN2="middle". Accordingly, as illustrated in FIG. 39B, the air blow volume of the blower fan 14*a*_1 becomes FA1=FA13 and the air blow volume of the blower fan 14*a*_2 becomes FA2=FA23.

Here, since the vehicle 1*p* is a "medium one-box" type, the volume of the cabin 6 is intermediate, and the airflow can flow uniformly in the cabin 6 at an intermediate air volume. With this configuration, the predetermined particles can be spread uniformly in the cabin while the air blow volume is reduced thereby achieving lower power consumption and quiet operation.

Alternatively, the control circuit 17 changes the operation mode to the in-use mode if the vehicle status is "in use". The rotational speed of each of the blower fans 14*a*_1 and 14*a*_2 in the in-use mode is preset as a setting in the in-use mode.

For example, the control circuit 17 may set the rotational speed CN1 of the blower fan 14*a*_1 to zero and the rotational speed CN2 of the blower fan 14*a*_2 to "middle", in accordance with the setting in the in-use mode. Accordingly, the air blow volume of the blower fan 14*a*_1 becomes FA1≈0 and the air blow volume of the blower fan 14*a*_2 becomes FA2=FA23.

In other words, if the vehicle status is "in use", the air conditioning device 9 (see FIG. 25) is circulating the air in the cabin, and the predetermined particles can be spread in the cabin 6 by the air blow in one direction.

As illustrated in FIG. 37, when the vehicle 1*p* is a "large one-box" type and the installation position of the vehicle interior device 100*p* is near the rear of the vehicle 1*p* as illustrated in FIG. 40A, the value of the switch SW11 is set to "4". With this setting, the rotational speed CN1 of the blower fan 14*a*_1 is set to "high", the rotational speed CN2 of the blower fan 14*a*_2 is set to "middle", and the "in-use linkage" is set to "NO (on)".

In accordance with this setting, the control circuit 17 controls the rotational speed of the blower fan 14*a*_1 to CN1="high" and controls the rotational speed of the blower fan 14*a*_2 to CN2="middle", regardless of the vehicle status. Accordingly, as illustrated in FIG. 40B, the air blow volume of the blower fan 14*a*_1 becomes FA1=FA10 and the air blow volume of the blower fan 14*a*_2 becomes FA2=FA23.

Here, since the vehicle $1p$ is a "large one-box" type, the volume of the cabin 6 is relatively large. In addition, since the vehicle interior device $100p$ is installed near the rear of the vehicle $1p$, the volume of space to be shared by the blower fan $14a\_1$ is larger than the volume of space to be shared by the blower fan $14a\_2$. Accordingly, the airflow can flow uniformly in the cabin 6 with the air blow volume that satisfies the relation:

$$FA10 > FA23$$

while the air volume is relatively large. As a result, the predetermined particles can be effectively spread uniformly in the cabin 6.

Alternatively, when the value of the switch SW11 is set to "C", the rotational speed CN1 of the blower fan $14a\_1$ is set to "high", the rotational speed CN1 of the blower fan $14a\_2$ is set to "middle," and the "in-use linkage" is set to "YES (on)".

Figure 40A:
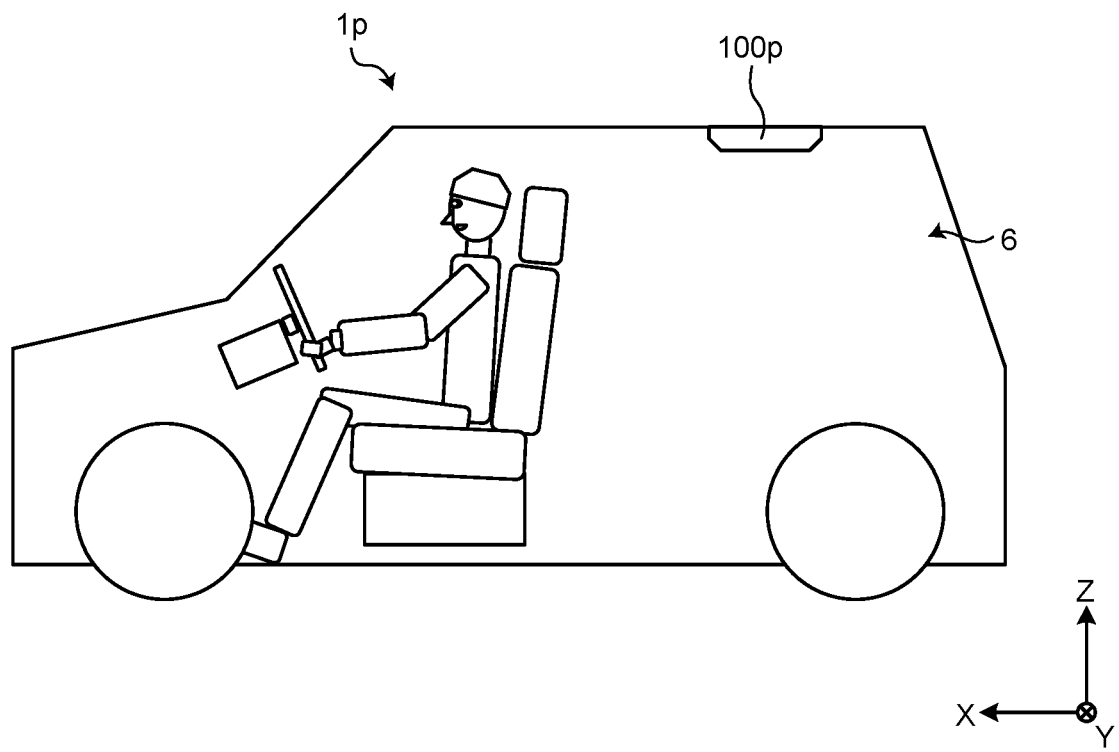
FIG. 40A and FIG. 40B are diagrams illustrating the air blow volume of the first blower fan and the air blow volume of the second blower fan in a modification of the second embodiment.
Figure 40B:
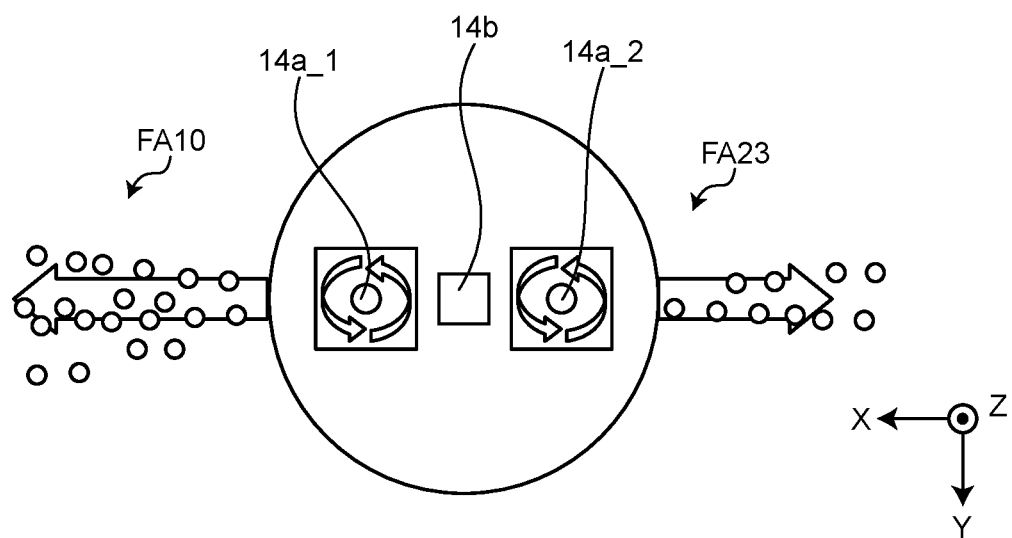

In accordance with this setting, the control circuit 17 changes the operation mode to the parking mode if the vehicle status is "parked". In the parking mode, the control circuit 17 controls the rotational speed of the blower fan $14a\_1$ to CN1="high" and controls the rotational speed of the blower fan $14a\_2$ to CN2="middle". Accordingly, as illustrated in FIG. 40B, the air blow volume of the blower fan $14a\_1$ becomes FA1=FA10 and the air blow volume of the blower fan $14a\_2$ becomes FA2=FA23.

Here, since the vehicle $1p$ is a "large one-box" type, the volume of the cabin 6 is relatively large. In addition, since the vehicle interior device $100p$ is installed near the rear of the vehicle $1p$, the volume of space to be shared by the blower fan $14a\_1$ is larger than the volume of space to be shared by the blower fan $14a\_2$. Accordingly, the airflow can flow uniformly in the cabin 6 with the air blow volume that satisfies the relation:

$$FA10 > FA23$$

while the air volume is relatively large. As a result, the predetermined particles can be effectively spread uniformly in the cabin 6.

Alternatively, the control circuit 17 changes the operation mode to the in-use mode if the vehicle status is "in use". The rotational speed of each of the blower fans $14a\_1$ and $14a\_2$ in the in-use mode is preset as a setting in the in-use mode.

For example, the control circuit 17 may set the rotational speed CN1 of the blower fan $14a\_1$ to zero and the rotational speed CN2 of the blower fan $14a\_2$ to "middle", in accordance with the setting in the in-use mode. Accordingly, the air blow volume of the blower fan $14a\_1$ becomes FA10 and the air blow volume of the blower fan $14a\_2$ becomes FA2=FA23.

In other words, if the vehicle status is "in use", the air conditioning device 9 (see FIG. 25) is circulating the air in the cabin, and the predetermined particles can be spread in the cabin 6 by the air blow in one direction.

Figure 39A:
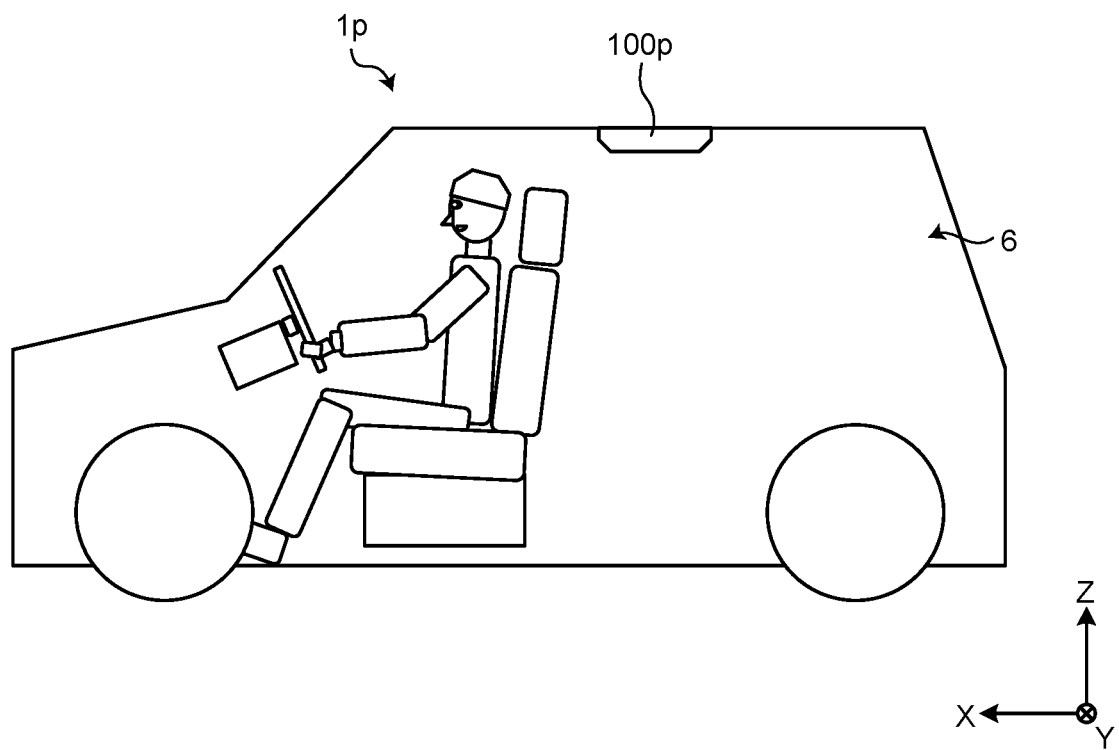
FIG. 39A and FIG. 39B are diagrams illustrating the air blow volume of a first blower fan and the air blow volume of a second blower fan in a modification of the second embodiment.
Figure 39B:
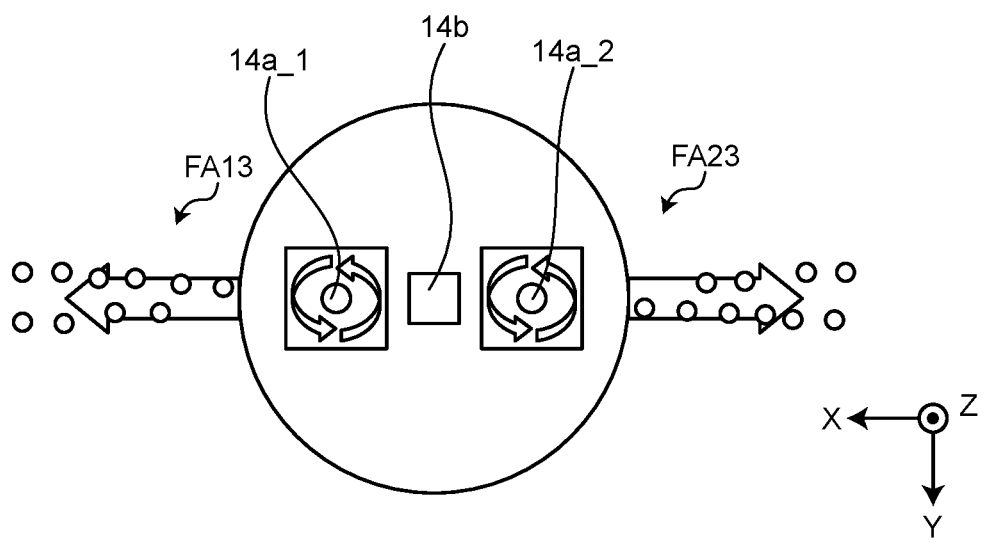

As illustrated in FIG. 37, in the case where the vehicle $1p$ is a "large one-box" type and the installation position of the vehicle interior device $100p$ is near the center of the vehicle $1p$ as illustrated in FIG. 39A, when the value of the switch SW11 is set to "5", the same settings as when the value of the switch SW11 is "3" and the corresponding control are performed.

Alternatively, when the value of the switch SW11 is set to "D", the same settings as when the value of the switch SW11 is "B" and the corresponding control are performed.

Figure 41A:
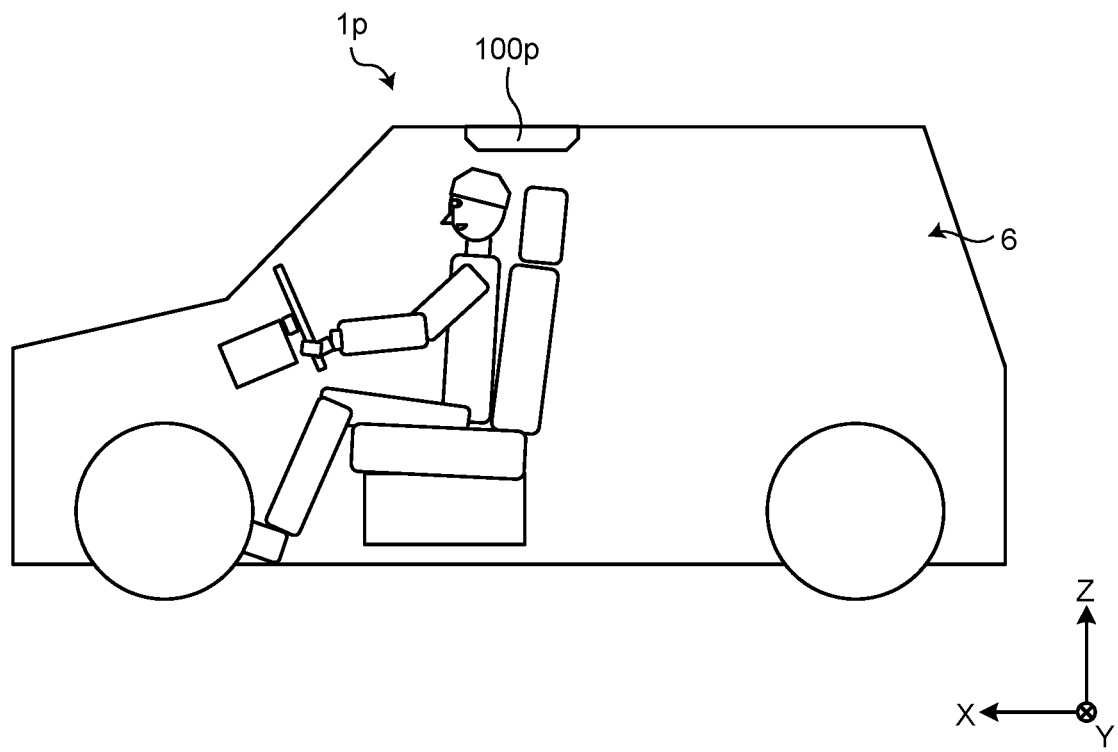
FIG. 41A and FIG. 41B are diagrams illustrating the air blow volume of the first blower fan and the air blow volume of the second blower fan in a modification of the second embodiment.

As illustrated in FIG. 37, when the vehicle $1p$ is a "large one-box" type and the installation position of the vehicle interior device $100p$ is near the front of the vehicle $1p$ as illustrated in FIG. 41A, the value of the switch SW11 is set to "6". With this setting, the rotational speed CN1 of the blower fan $14a\,1$ is set to "middle", the rotational speed CN2 of the blower fan $14a\_2$ is set to "high", and the "in-use linkage" is set to "NO (off)".

Figure 41B:
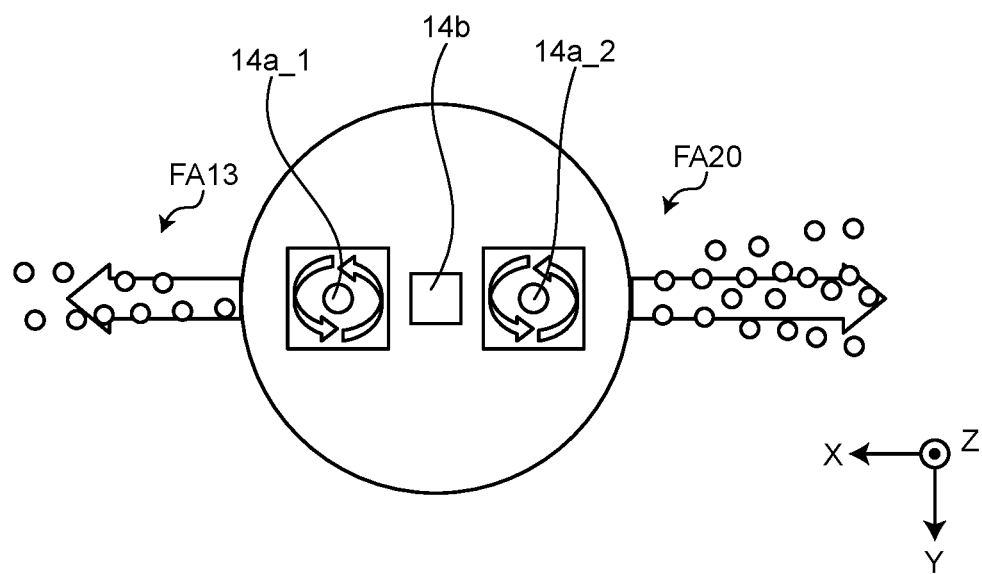

In accordance with this setting, the control circuit 17 controls the rotational speed of the blower fan $14a\_1$ to CN1="middle" and controls the rotational speed of the blower fan $14a\_2$ to CN2="high", regardless of the vehicle status. Accordingly, as illustrated in FIG. 41B, the air blow volume of the blower fan $14a\_1$ becomes FA1=FA13 and the air blow volume of the blower fan $14a\_2$ becomes FA2=FA20.

Here, since the vehicle $1p$ is a "large one-box" type, the volume of the cabin 6 is relatively large. In addition, since the vehicle interior device $100p$ is installed near the rear of the vehicle $1p$, the volume of space to be shared by the blower fan $14a\_1$ is smaller than the volume of space to be shared by the blower fan $14a\_2$. Accordingly, the airflow can flow uniformly in the cabin 6 at the air blow volume that satisfies the relation:

$$FA13 < FA20$$

while the air volume is relatively large. As a result, the predetermined particles can be effectively spread uniformly in the cabin 6.

Alternatively, when the value of the switch SW11 is set to "E", the rotational speed CN1 of the blower fan $14a\_1$ is set to "middle", the rotational speed CN1 of the blower fan $14a\_2$ is set to "high", and the "in-use linkage" is set to "YES (on)".

In accordance with this setting, the control circuit 17 changes the operation mode to the parking mode if the vehicle status is "parked". In the parking mode, the control circuit 17 controls the rotational speed of the blower fan $14a\_1$ to CN1="middle" and controls the rotational speed of the blower fan $14a\_2$ to CN2="high". Accordingly, as illustrated in FIG. 41B, the air blow volume of the blower fan $14a\_1$ becomes FA1=FA13 and the air blow volume of the blower fan $14a\_2$ becomes FA2=FA20.

Here, since the vehicle $1p$ is a "large one-box" type, the volume of the cabin 6 is relatively large. In addition, since the vehicle interior device $100p$ is installed near the rear of the vehicle $1p$, the volume of space to be shared by the blower fan $14a\_1$ is smaller than the volume of space to be shared by the blower fan $14a\_2$. Accordingly, the airflow can flow uniformly in the cabin 6 at the air blow volume that satisfies the relation:

$$FA13 < FA20$$

while the air volume is relatively large. As a result, the predetermined particles can be effectively spread uniformly in the cabin 6.

Alternatively, the control circuit 17 changes the operation mode to the in-use mode if the vehicle status is "in use". The rotational speed of each of the blower fans $14a\_1$ and $14a\_2$ in the in-use mode is preset as a setting in the in-use mode.

For example, the control circuit 17 may set the rotational speed CN1 of the blower fan $14a\_1$ to zero and the rotational speed CN2 of the blower fan $14a\_2$ to "middle", in accordance with the setting in the in-use mode. Accordingly, the air blow volume of the blower fan $14a\_1$ becomes FA1≈0 and the air blow volume of the blower fan $14a\_2$ becomes FA2=FA23.

In other words, if the vehicle status is "in use", the air conditioning device 9 (see FIG. 25) is circulating the air in the cabin, and the predetermined particles can be spread in the cabin 6 by the air blow in one direction.

In this way, in the modification of the second embodiment, when the vehicle interior device 100*p* is arranged behind the center in the front-to-back direction in the cabin 6 of the vehicle 1*p* (see FIG. 40A), the rotational speed CN1 of the blower fan 14*a*_1 corresponding to the outlet 13*bp*_1 oriented forward can be preset to be greater than the rotational speed CN2 of the blower fan 14*a*_2 corresponding to the outlet 13*bp*_2 oriented backward. With this configuration, the air with predetermined particles can be blown out into the cabin 6 at an appropriate air volume depending on the overall shape of the cabin 6 and the volume of space shared by each blower fan 14*a*. As a result, the predetermined particles can be effectively spread uniformly in the cabin 6.

In the modification of the second embodiment, when the vehicle interior device 100*p* is arranged in front of the center in the front-to-back direction in the cabin 6 of the vehicle 1*p* (see FIG. 41A), the rotational speed CN2 of the blower fan 14*a*_2 corresponding to the outlet 13*bp*_2 oriented backward can be preset to be greater than the rotational speed CN1 of the blower fan 14*a*_1 corresponding to the outlet 13*bp*_1 oriented forward. With this configuration, the air with predetermined particles can be blown out into the cabin 6 at an appropriate air volume depending on the overall shape of the cabin 6 and the volume of space shared by each blower fan 14*a*. As a result, the predetermined particles can be effectively spread uniformly in the cabin 6.

Note 1.

A vehicle interior illumination device set to be installed at a ceiling in an interior of a vehicle, the vehicle interior illumination device comprising:
- a power supply circuit connected to a +B voltage line and a ground voltage line;
- a housing;
- a temperature sensor installed inside the housing; and
- a light emitting unit installed in the housing and capable of emitting light with a predetermined color temperature, the light emitting unit illuminating the interior of the vehicle based on electric power supplied from the power supply circuit, wherein
- the temperature sensor detects a period lowest temperature that is lowest in a predetermined period,
- when the period lowest temperature is a first temperature, the light emitting unit emits light with a first color temperature, and when the period lowest temperature is a second temperature higher than the first temperature, the light emitting unit emits light with a second color temperature different from the first color temperature.

Note 2.

The vehicle interior illumination device according to Note 1, wherein the predetermined period is at least 24 hours.

Note 3.

The vehicle interior illumination device according to Note 1, wherein the predetermined period is two or more days, and daily lowest temperatures are determined, and an average of the daily lowest temperatures is used as the period lowest temperature.

Note 4.

The vehicle interior illumination device according to Note 1, further comprising an input circuit connected to a door open/closed signal line of the vehicle, wherein when a signal on the door open/closed signal line is open, the light emitting unit emits light with the predetermined color temperature.

Note 5.

The vehicle interior illumination device according to Note 4, wherein when a signal on the door open/closed signal line is closed, the light emitting unit does not emit light.

Note 6.

The vehicle interior illumination device according to Note 1, further comprising a first operation unit, wherein light emission by the light emitting unit is changed by an operation of the first operation unit.

Note 7.

The vehicle interior illumination device according to Note 1, further comprising a control circuit.

Note 8.

The vehicle interior illumination device according to Note 1, further comprising a locking part configured to lock the housing to the ceiling.

Note 9.

The vehicle interior illumination device according to Note 1, wherein the first color temperature is higher than the second color temperature.

Note 10.

The vehicle interior illumination device according to Note 1, wherein the first color temperature is lower than the second color temperature.

Note 11.

The vehicle interior illumination device according to Note 1, further comprising:

a blower fan installed inside the housing;

an electrostatic atomization unit installed inside the housing and configured to add predetermined particles to an airflow delivered by the blower fan; and a second operation unit, wherein at least one of operation of the blower fan and operation of the electrostatic atomization unit is changed by an operation of the second operation unit.

Note 12.

The vehicle interior illumination device according to Note 11, wherein the housing has an outlet of an airflow delivered by the blower fan.

Technique 1

A vehicle interior purification device set to be installed at a ceiling in an interior of a vehicle, the vehicle interior purification device comprising:

an input circuit connected to a door open/closed signal line of the vehicle;

a power supply circuit connected to a +B voltage line and a ground voltage line;

a housing;

a blower fan installed inside the housing;

an ionizer installed inside the housing and configured to generate at least either of positive ions and negative ions for an airflow delivered by the blower fan;

a first light emitting unit installed in the housing and configured to illuminate the interior of the vehicle based on electric power supplied from the power supply circuit; and a second light emitting unit installed in the housing and having an emission intensity smaller than an emission intensity of the first light emitting unit, wherein when a potential difference of the +B voltage line relative to a potential on the ground voltage line becomes smaller than a first voltage within a first time after the second light emitting unit emits light for a second time after a signal on the door open/closed signal line indicates open and then indicates closed, and when a signal on the door open/closed signal line indicates closed, the blower fan operates for a third time longer than the second time.

Technique 2.

The vehicle interior purification device according to Technique 1, wherein
when a signal on the door open/closed signal line indicates open, the first light emitting unit emits light,
after a signal on the door open/closed signal line indicates open and then indicates closed, the second light emitting unit emits light for the second time, and
before the second light emitting unit stops emitting light, the first light emitting unit stops emitting light.

Technique 3.

The vehicle interior purification device according to Technique 1, wherein
the blower fan has at least an air blow mode with a first intensity and an air blow mode with a second intensity higher than the first intensity,
when a potential difference of the +B voltage line relative to a potential on the ground voltage line is greater than the first voltage and when a signal on the door open/closed signal line indicates closed, the blower fan is set to the air blow mode with the first intensity,
when a potential difference of the +B voltage line relative to a potential on the ground voltage line is smaller than the first voltage and greater than a second voltage within a first time after a signal on the door open/closed signal line indicates open and then indicates closed, and when a signal on the door open/closed signal line indicates closed, the blower fan is set to the air blow mode with the second intensity,
when a potential difference of the +B voltage line relative to a potential on the ground voltage line becomes smaller than the second voltage and when a signal on the door open/closed signal line indicates closed, the blower fan stops, and
the second voltage is lower than the first voltage.

Technique 4.

The vehicle interior purification device according to Technique 3, further comprising a temperature sensor installed inside the housing, wherein
the temperature sensor detects a 24-hour lowest temperature that is lowest in at least 24 hours,
when the 24-hour lowest temperature is a first temperature, the second time is a first value, and
when the 24-hour lowest temperature is a second temperature lower than the first temperature, the second time is a second value smaller than the first value.

Technique 5.

The vehicle interior purification device according to Technique 1, further comprising a control circuit.

Technique 6.

The vehicle interior purification device according to Technique 1, further comprising a locking part configured to lock the housing to the ceiling.

Technique 7.

The vehicle interior purification device according to Technique 1, further comprising a first operation unit, wherein
light emission by the first light emitting unit is changed by an operation of the first operation unit.

Technique 8.

The vehicle interior purification device according to Technique 1, further comprising a second operation unit, wherein at least one of operation of the blower fan and operation of an electrostatic atomization unit is changed by an operation of the second operation unit.

Technique 9.

The vehicle interior purification device according to Technique 1, wherein the housing has an outlet of an airflow delivered by the blower fan.

Technique 10.

The vehicle interior purification device according to Technique 1, wherein the ionizer is an electrostatic atomization unit configured to add at least either of positively ionized particles and negatively ionized particles.

The vehicle interior purification device according to the present disclosure can appropriately purify the air in the interior of a vehicle.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicle interior purification device configured to be installed at a ceiling in an interior of a vehicle, the vehicle interior purification device comprising:
   a housing;
   a first outlet disposed in the housing;
   a second outlet disposed in the housing;
   a first blower fan corresponding to the first outlet and disposed inside the housing;
   a second blower fan corresponding to the second outlet and disposed inside the housing; and
   a generation device for an airflow delivered from the first outlet and the second outlet, the generation device being disposed inside the housing, wherein
   the generation device includes at least one of an electrostatic atomization device that generates a mist containing charged water particles and an ozone/ion generation device that generates ozone and negative ions by corona discharge,
   the first outlet and the second outlet are configured to be disposed along a direction of travel of the vehicle, and
   when the vehicle interior purification device is disposed behind a center in a front-to-rear direction in the interior of the vehicle, a first rotational speed of the first blower fan corresponding to the first outlet oriented forward is presettable to be greater than a second rotational speed of the second blower fan corresponding to the second outlet oriented backward.

2. The vehicle interior purification device according to claim 1, wherein the vehicle interior purification device has:
   a first mode in which the first blower fan rotates at the first rotational speed and the second blower fan rotates at the second rotational speed; and
   a second mode in which at least the second blower fan rotates at a third rotational speed equal to or lower than the second rotational speed.

3. The vehicle interior purification device according to claim 2, wherein in the second mode, the first blower fan does not rotate.

4. The vehicle interior purification device according to claim 2, further comprising:

an input circuit connected to a door open/closed signal line of the vehicle; and a power supply circuit connected to a +B voltage line and a ground voltage line, wherein when a signal on the door open/closed signal line indicates open and then indicates closed, and a potential difference of the +B voltage line relative to a potential on the ground voltage line becomes smaller than a voltage, the vehicle interior purification device operates in the first mode, and when the signal on the door open/closed signal line indicates closed and the potential difference of the +B voltage line relative to the potential on the ground voltage line is greater than the voltage, the vehicle interior purification device operates in the second mode.

5. The vehicle interior purification device according to claim 4, further comprising a control circuit.

6. A vehicle interior purification device configured to be installed at a ceiling in an interior of a vehicle, the vehicle interior purification device comprising:

a housing;

a first outlet disposed in the housing;

a second outlet disposed in the housing;

a first blower fan corresponding to the first outlet and disposed inside the housing;

a second blower fan corresponding to the second outlet and disposed inside the housing; and a generation device for an airflow delivered from the first outlet and the second outlet, the generation device being disposed inside the housing, wherein the generation device includes at least one of an electrostatic atomization device that generates a mist containing charged water particles and an ozone/ion generation device that generates ozone and negative ions by corona discharge, the first outlet and the second outlet are configured to be disposed along a direction of travel of the vehicle, and when the vehicle interior purification device is disposed in front of a center in a front-to-rear direction in a cabin of the vehicle, a first rotational speed of the first blower fan corresponding to the first outlet oriented forward is presettable to be smaller than a second rotational speed of the second blower fan corresponding to the second outlet oriented backward.

7. The vehicle interior purification device according to claim 1, wherein the housing includes an air intake, the generation device is disposed between the first blower fan and the second blower fan, and an airflow entering from the air intake is delivered from the second outlet through the generation device and the second blower fan.

8. The vehicle interior purification device according to claim 1, further comprising a locking part that locks the housing to the ceiling.

9. The vehicle interior purification device according to claim 6, wherein the vehicle interior purification device has:

a first mode in which the first blower fan rotates at the first rotational speed and the second blower fan rotates at the second rotational speed; and a second mode in which at least the second blower fan rotates at a third rotational speed equal to or lower than the second rotational speed.

10. The vehicle interior purification device according to claim 6, wherein in the second mode, the first blower fan does not rotate.

11. The vehicle interior purification device according to claim 6, further comprising:

an input circuit connected to a door open/closed signal line of the vehicle; and a power supply circuit connected to a +B voltage line and a ground voltage line, wherein when a signal on the door open/closed signal line indicates open and then indicates closed, and a potential difference of the +B voltage line relative to a potential on the ground voltage line becomes smaller than a voltage, the vehicle interior purification device operates in the first mode, and when the signal on the door open/closed signal line indicates closed and the potential difference of the +B voltage line relative to the potential on the ground voltage line is greater than the voltage, the vehicle interior purification device operates in the second mode.

12. The vehicle interior purification device according to claim 11, further comprising a control circuit.

13. The vehicle interior purification device according to claim 6, wherein the housing includes an air intake, the generation device is disposed between the first blower fan and the second blower fan, and an airflow entering from the air intake is delivered from the second outlet through the generation device and the second blower fan.

14. The vehicle interior purification device according to claim 6, further comprising a locking part that locks the housing to the ceiling.

* * * * *